(12) United States Patent
Gelman et al.

(10) Patent No.: US 12,481,243 B2
(45) Date of Patent: Nov. 25, 2025

(54) METHOD AND SYSTEM FOR DISPLAYING HOLOGRAPHIC IMAGES WITHIN A REAL OBJECT

(71) Applicant: Real View Imaging Ltd., Yokneam (IL)

(72) Inventors: Shaul Alexander Gelman, Raanana (IL); Carmel Rotschild, Ganei-Tikva (IL); Elchanan Bruckheimer, Zikhron-Yaakov (IL); Aviad Kaufman, Zikhron-Yaakov (IL); Dalia Dickman, Moshav Manof (IL)

(73) Assignee: Real View Imaging Ltd., Yokneam (IL)

( * ) Notice: Subject to any disclaimer, the term of this patent is extended or adjusted under 35 U.S.C. 154(b) by 104 days.

(21) Appl. No.: 18/226,285

(22) Filed: Jul. 26, 2023

(65) Prior Publication Data

US 2023/0384734 A1 Nov. 30, 2023

Related U.S. Application Data

(63) Continuation of application No. 17/015,126, filed on Sep. 9, 2020, now Pat. No. 11,754,971, which is a
(Continued)

(51) Int. Cl.
*G03H 1/00* (2006.01)
*G02B 27/01* (2006.01)
(Continued)

(52) U.S. Cl.
CPC ......... *G03H 1/0005* (2013.01); *G02B 27/017* (2013.01); *G06T 19/006* (2013.01);
(Continued)

(58) Field of Classification Search
CPC ... G03H 1/0005; G02B 27/017; G06T 19/006
See application file for complete search history.

(56) References Cited

U.S. PATENT DOCUMENTS 3,800,298 A 3/1974 Ogura et al.
4,978,952 A 12/1990 Irwin
(Continued)

FOREIGN PATENT DOCUMENTS

GB 2472773 3/2011
GB 2507462 5/2014
(Continued)

OTHER PUBLICATIONS

Advisory Action Dated Aug. 23, 2022 From U.S. Appl. No. 16/487,867. (3 Pages).
(Continued)

*Primary Examiner* — Mishawn N. Hunter

(57) ABSTRACT

A system for displaying a holographic image of an object behind a real object surface, including a computing unit for computing data for displaying a three-dimensional image of an object, a location measurement unit for measuring a location of a surface of a real object, a display for displaying the three dimensional image of the object, wherein the computing unit is adapted to compute data to display the three-dimensional image of the object at least partly behind the surface of the real object. Related apparatus and methods are also described.

20 Claims, 25 Drawing Sheets

Related U.S. Application Data continuation of application No. 16/078,639, filed as application No. PCT/IL2017/050225 on Feb. 22, 2017, now Pat. No. 10,788,791.

(60) Provisional application No. 62/353,718, filed on Jun. 23, 2016, provisional application No. 62/298,070, filed on Feb. 22, 2016.

(51) Int. Cl.
  *G06T 19/00* (2011.01)
  *G03H 1/22* (2006.01)

(52) U.S. Cl.
  CPC ........... *G02B 2027/0138* (2013.01); *G02B 2027/0174* (2013.01); *G03H 2001/0061* (2013.01); *G03H 2001/2236* (2013.01); *G03H 2001/2284* (2013.01); *G03H 2226/05* (2013.01); *G03H 2227/02* (2013.01); *G03H 2270/55* (2013.01); *G09G 2340/12* (2013.01)

(56) References Cited

U.S. PATENT DOCUMENTS

| | | | |
|---|---|---|---|
| 5,334,991 A | 8/1994 | Wells et al. | |
| 5,369,511 A | 11/1994 | Amos | |
| 5,673,146 A | 9/1997 | Kelly | |
| 5,844,709 A | 12/1998 | Rabinovich et al. | |
| 5,883,743 A | 3/1999 | Sloan | |
| 6,101,007 A | 8/2000 | Yamasaki et al. | |
| 6,876,878 B2 | 4/2005 | Zhdanov | |
| 6,906,836 B2 | 6/2005 | Parker et al. | |
| 7,259,898 B2 | 8/2007 | Khazova et al. | |
| 7,522,344 B1 | 4/2009 | Curatu et al. | |
| 7,639,208 B1 | 12/2009 | Ha et al. | |
| 7,675,684 B1 | 3/2010 | Weissman et al. | |
| 8,159,733 B2 | 4/2012 | Christmas et al. | |
| 8,213,064 B2 | 7/2012 | Yona et al. | |
| 8,243,133 B1 | 8/2012 | Northcott et al. | |
| 8,500,284 B2 | 8/2013 | Rotschild et al. | |
| 8,570,656 B1 | 10/2013 | Weissman | |
| 8,576,276 B2 | 11/2013 | Bar-Zeev et al. | |
| 8,976,170 B2 | 3/2015 | Lee et al. | |
| 8,982,471 B1 | 3/2015 | Starner et al. | |
| 9,164,588 B1 | 10/2015 | Johnson et al. | |
| 9,223,152 B1 | 12/2015 | Kress et al. | |
| 9,225,969 B2 | 12/2015 | Aguirre-Valencia | |
| 10,335,572 B1* | 7/2019 | Kumar | G06F 3/015 |
| 10,656,720 B1 | 5/2020 | Holz | |
| 2003/0197933 A1 | 10/2003 | Sudo et al. | |
| 2004/0047013 A1 | 3/2004 | Cai et al. | |
| 2004/0066547 A1 | 4/2004 | Parker et al. | |
| 2004/0150888 A1 | 8/2004 | Domjan et al. | |
| 2004/0174605 A1 | 9/2004 | Olsson | |
| 2005/0013005 A1 | 1/2005 | Rogers | |
| 2006/0176242 A1 | 8/2006 | Jaramaz et al. | |
| 2007/0177275 A1 | 8/2007 | McGuire | |
| 2007/0258624 A1 | 11/2007 | Mochida | |
| 2007/0273798 A1 | 11/2007 | Silverstein et al. | |
| 2008/0013793 A1 | 1/2008 | Hillis et al. | |
| 2008/0174659 A1 | 7/2008 | McDowall | |
| 2009/0002787 A1 | 1/2009 | Cable et al. | |
| 2009/0164930 A1 | 6/2009 | Chen et al. | |
| 2009/0237759 A1 | 9/2009 | Maschke | |
| 2009/0238060 A1 | 9/2009 | Yasuda et al. | |
| 2010/0067077 A1 | 3/2010 | Kroll et al. | |
| 2010/0110368 A1 | 5/2010 | Chaum | |
| 2010/0110386 A1 | 5/2010 | Handschy et al. | |
| 2010/0133424 A1 | 6/2010 | Lindsay | |
| 2010/0238270 A1 | 9/2010 | Bjelkhagen et al. | |
| 2011/0128555 A1 | 6/2011 | Rotschild et al. | |
| 2011/0157667 A1 | 6/2011 | Lacoste et al. | |
| 2012/0052946 A1 | 3/2012 | Yun | |
| 2012/0068913 A1 | 3/2012 | Bar-Zeev et al. | |
| 2012/0139817 A1 | 6/2012 | Freeman | |
| 2012/0140038 A1 | 6/2012 | Bi et al. | |
| 2012/0188619 A1 | 7/2012 | Song et al. | |
| 2012/0224062 A1 | 9/2012 | Lacoste et al. | |
| 2013/0016413 A1 | 1/2013 | Saeedi et al. | |
| 2013/0137076 A1 | 5/2013 | Perez et al. | |
| 2013/0222384 A1 | 8/2013 | Futterer | |
| 2013/0265622 A1 | 10/2013 | Christmas et al. | |
| 2013/0278631 A1* | 10/2013 | Border | G06F 3/04842 345/633 |
| 2013/0300728 A1 | 11/2013 | Reichow et al. | |
| 2013/0326364 A1 | 12/2013 | Latta et al. | |
| 2014/0002367 A1 | 1/2014 | Glückstad et al. | |
| 2014/0002444 A1 | 1/2014 | Bennett et al. | |
| 2014/0022283 A1* | 1/2014 | Chan | H04N 9/3185 345/633 |
| 2014/0033052 A1 | 1/2014 | Kaufman et al. | |
| 2014/0081659 A1* | 3/2014 | Nawana | G16H 10/20 705/3 |
| 2014/0146394 A1 | 5/2014 | Tout et al. | |
| 2014/0152676 A1 | 6/2014 | Rohn et al. | |
| 2014/0160543 A1 | 6/2014 | Putilin et al. | |
| 2014/0282008 A1* | 9/2014 | Verard | G03H 1/0005 715/728 |
| 2014/0372944 A1 | 12/2014 | Mulcahy et al. | |
| 2015/0016777 A1 | 1/2015 | Abovitz et al. | |
| 2015/0051617 A1* | 2/2015 | Takemura | A61B 6/12 606/130 |
| 2015/0153572 A1 | 6/2015 | Miao et al. | |
| 2015/0168914 A1 | 6/2015 | Gelman et al. | |
| 2015/0187119 A1* | 7/2015 | Masumoto | A61B 6/503 345/424 |
| 2015/0206350 A1 | 7/2015 | Gardes et al. | |
| 2015/0234095 A1 | 8/2015 | Schowengerdt | |
| 2015/0250450 A1 | 9/2015 | Thomas et al. | |
| 2015/0317834 A1 | 11/2015 | Poulos et al. | |
| 2015/0332508 A1 | 11/2015 | Jovanovic | |
| 2015/0346685 A1 | 12/2015 | Ito et al. | |
| 2015/0378080 A1 | 12/2015 | Georgiou et al. | |
| 2016/0018639 A1 | 1/2016 | Spitzer et al. | |
| 2016/0026253 A1 | 1/2016 | Bradski et al. | |
| 2016/0033771 A1 | 2/2016 | Tremblay et al. | |
| 2016/0077344 A1 | 3/2016 | Burns | |
| 2016/0143528 A1 | 5/2016 | Wilf et al. | |
| 2016/0147308 A1 | 5/2016 | Gelman et al. | |
| 2016/0148430 A1 | 5/2016 | Lin et al. | |
| 2016/0216515 A1 | 7/2016 | Bouchier et al. | |
| 2016/0223986 A1 | 8/2016 | Archambeau et al. | |
| 2016/0225192 A1* | 8/2016 | Jones | G06F 3/017 |
| 2016/0260441 A1 | 9/2016 | Muehlhausen et al. | |
| 2016/0343164 A1 | 11/2016 | Urbach et al. | |
| 2016/0360187 A1 | 12/2016 | Smithwick et al. | |
| 2016/0366399 A1 | 12/2016 | Tempel et al. | |
| 2016/0379606 A1 | 12/2016 | Kollin et al. | |
| 2017/0052373 A1 | 2/2017 | Memmott et al. | |
| 2017/0078651 A1 | 3/2017 | Russell | |
| 2017/0078652 A1 | 3/2017 | Hua et al. | |
| 2017/0082976 A1 | 3/2017 | Schwerdtner | |
| 2017/0115489 A1 | 4/2017 | Hu et al. | |
| 2017/0123204 A1 | 5/2017 | Sung et al. | |
| 2017/0161893 A1* | 6/2017 | Carnes | G06T 11/008 |
| 2017/0185037 A1 | 6/2017 | Lee et al. | |
| 2018/0267323 A1 | 9/2018 | Tsurumi | |
| 2019/0004478 A1 | 1/2019 | Gelman et al. | |
| 2019/0049899 A1 | 2/2019 | Gelman et al. | |
| 2019/0056693 A1 | 2/2019 | Gelman et al. | |
| 2019/0155033 A1 | 5/2019 | Gelman et al. | |
| 2019/0257992 A1 | 8/2019 | Seo et al. | |
| 2020/0184865 A1 | 6/2020 | Loevsky et al. | |
| 2020/0201038 A1 | 6/2020 | Gelman et al. | |
| 2020/0409306 A1 | 12/2020 | Gelman et al. | |
| 2021/0003969 A1 | 1/2021 | Gelman et al. | |
| 2022/0155601 A1 | 5/2022 | Gelman et al. | |

FOREIGN PATENT DOCUMENTS

| | | |
|---|---|---|
| WO | WO 2005/045531 | 5/2005 |
| WO | WO 2006/008734 | 1/2006 |
| WO | WO 2009/126264 | 10/2009 |

(56) References Cited

FOREIGN PATENT DOCUMENTS

| | | |
|---|---|---|
| WO | WO 2009/156752 | 12/2009 |
| WO | WO 2011/018655 | 2/2011 |
| WO | WO 2012/062681 | 5/2012 |
| WO | WO 2012/166593 | 12/2012 |
| WO | WO 2013/112705 | 8/2013 |
| WO | WO 2013/163347 | 10/2013 |
| WO | WO 2014/106823 | 7/2014 |
| WO | WO 2014/155288 | 10/2014 |
| WO | WO 2014/186620 | 11/2014 |
| WO | WO 2015/004670 | 1/2015 |
| WO | WO 2015/164402 | 10/2015 |
| WO | WO 2016/010289 | 1/2016 |
| WO | WO 2016/105281 | 6/2016 |
| WO | WO 2016/105282 | 6/2016 |
| WO | WO 2016/105285 | 6/2016 |
| WO | WO 2016/144459 | 9/2016 |
| WO | WO 2016/156614 | 10/2016 |
| WO | WO 2007/145156 | 8/2017 |
| WO | WO 2017/145154 | 8/2017 |
| WO | WO 2017/145155 | 8/2017 |
| WO | WO 2017/145156 | 8/2017 |
| WO | WO 2017/145158 | 8/2017 |
| WO | WO 2018/154564 | 8/2018 |
| WO | WO 2018/211494 | 11/2018 |

OTHER PUBLICATIONS

Communication Pursuant to Article 94(3) EPC Dated Feb. 8, 2021 From the European Patent Office Re. Application No. 17714566.1. (6 Pages).
Communication Pursuant to Article 94(3) EPC Dated Oct. 11, 2022 From the European Patent Office Re. Application No. 17712554.9. (4 Pages).
Communication Pursuant to Article 94(3) EPC Dated Jul. 19, 2019 From the European Patent Office Re. Application No. 17714566.1. (5 Pages).
Communication Pursuant to Article 94(3) EPC Dated Sep. 22, 2022 From the European Patent Office Re. Application No. 17714566.1. (6 Pages).
Communication Pursuant to Article 94(3) EPC Dated Mar. 25, 2021 From the European Patent Office Re. Application No. 17712554.9. (5 Pages).
Communication Pursuant to Article 94(3) EPC Dated Mar. 27, 2020 From the European Patent Office Re. Application No. 17714566.1. (5 Pages).
Communication Pursuant to Article 94(3) EPC Dated Apr. 28, 2020 From the European Patent Office Re. Application No. 17712554.9. (5 Pages).
Communication Pursuant to Article 94(3) EPC Dated Jul. 30, 2019 From the European Patent Office Re. Application No. 17712554.9. (5 Pages).
Communication Relating to the Results of the Partial International Search and Provisional Opinion Dated May 8, 2017 From the International Searching Authority Re. Application No. PCT/IL2017/050226. (16 Pages).
Communication Relating to the Results of the Partial International Search and the Provisional Opinion Dated May 15, 2017 From the International Searching Authority Re. Application No. PCT/IL2017/050228. (14 Pages).
Final Official Action Dated Aug. 3, 2021 from U.S. Appl. No. 16/487,867. (18 pages).
Final Official Action Dated May 9, 2022 from U.S. Appl. No. 16/487,867. (20 pages).
International Preliminary Report on Patentability Dated Sep. 6, 2019 From the International Bureau of WIPO Re. Application No. PCT/IL2018/050186. (11 Pages).
International Preliminary Report on Patentability Dated Sep. 7, 2018 From the International Bureau of WIPO Re. Application No. IL2017/050228. (11 Pages).
International Preliminary Report on Patentability Dated Sep. 7, 2018 From the International Bureau of WIPO Re. Application No. PCT/IL2017/050225. (10 Pages).
International Preliminary Report on Patentability Dated Sep. 7, 2018 From the International Bureau of WIPO Re. Application No. PCT/IL2017/050226. (14 Pages).
International Preliminary Report on Patentability Dated Nov. 28, 2019 From the International Bureau of WIPO Re. Application No. PCT/IL2018/050509. (16 Pages).
International Search Report and the Written Opinion Dated May 4, 2017 From the International Searching Authority Re. Application No. PCT/IL2017/050225. (16 Pages).
International Search Report and the Written Opinion Dated Sep. 7, 2017 From the International Searching Authority Re. Application No. PCT/IL2017/050226. (21 Pages).
International Search Report and the Written Opinion Dated Jul. 9, 2018 From the International Searching Authority Re. Application No. PCT/IL2018/050186. (19 Pages).
International Search Report and the Written Opinion Dated Aug. 10, 2017 From the International Searching Authority Re. Application No. IL2017/050228. (17 Pages).
International Search Report and the Written Opinion Dated Sep. 25, 2018 From the International Searching Authority Re. Application No. PCT/IL2018/050509. (24 Pages).
International Search Report and the Written Opinion Dated Apr. 26, 2017 From the International Searching Authority Re. Application No. PCT/IL2017/050224. (14 Pages).
International Search Report and the Written Opinion Dated Jun. 29, 2017 From the International Searching Authority Re. Application No. PCT/IL2017/050226. (20 Pages).
Interview Summary Dated Oct. 18, 2022 From U.S. Appl. No. 16/613,442. (2 Pages).
Interview Summary Dated Oct. 22, 2021 From U.S. Appl. No. 16/487,867. (2 Pages).
Interview Summary Dated Mar. 23, 2020 from U.S. Appl. No. 16/078,638. (3 pages).
Interview Summary Dated Oct. 5, 2020 from U.S. Appl. No. 16/078,653. (3 pages).
Notice of Allowance Dated May 1, 2023 from U.S. Appl. No. 17/015,126. (10 pages).
Notice of Allowance Dated Sep. 6, 2022 from U.S. Appl. No. 17/023,443. (16 pages).
Notice of Allowance Dated Jun. 1, 2020 from U.S. Appl. No. 16/078,638. (6 pages).
Notice of Allowance Dated May 12, 2020 from U.S. Appl. No. 16/078,639. (15 pages).
Notice of Allowance Dated Aug. 24, 2020 from U.S. Appl. No. 16/106,249. (12 pages).
Notice of Allowance Dated Jan. 24, 2023 from U.S. Appl. No. 16/487,867. (10 pages).
Office Action Dated May 30, 2022 From the Israel Patent Office Re. Application No. 268831. (4 Pages).
Official Action Dated Mar. 3, 2021 From U.S. Appl. No. 16/487,867. (40 Pages).
Official Action Dated Feb. 13, 2023 from U.S. Appl. No. 17/589,940. (108 pages).
Official Action Dated Jul. 14, 2022 from U.S. Appl. No. 16/613,442. (56 pages).
Official Action Dated Feb. 15, 2022 From U.S. Appl. No. 17/015,126. (40 Pages).
Official Action Dated Apr. 16, 2020 from U.S. Appl. No. 16/106,249. (39 pages).
Official Action Dated Feb. 16, 2021 From U.S. Appl. No. 16/078,653. (22 Pages).
Official Action Dated Mar. 16, 2022 from U.S. Appl. No. 17/023,443. (52 pages).
Official Action Dated Nov. 2, 2020 from U.S. Appl. No. 16/078,653. (51 pages).
Official Action Dated Dec. 22, 2021 from U.S. Appl. No. 16/487,867. (16 pages).
Official Action Dated Jul. 23, 2021 from U.S. Appl. No. 16/078,653. (22 pages).

(56) References Cited

OTHER PUBLICATIONS

Official Action Dated Sep. 23, 2022 from U.S. Appl. No. 16/487,867. (8 pages).
Official Action Dated Dec. 27, 2019 From U.S. Appl. No. 16/078,638. (32 pages).
Official Action Dated Jun. 27, 2023 from U.S. Appl. No. 17/589,940. (19 pages).
Official Action Dated Oct. 28, 2019 From U.S. Appl. No. 16/078,639. (29 Pages).
Official Action Dated Sep. 29, 2022 from U.S. Appl. No. 17/015,126. (27 pages).
Official Action Dated Mar. 31, 2023 from U.S. Appl. No. 16/613,442. (14 pages).
Restriction Official Action Dated Mar. 4, 2022 From U.S. Appl. No. 16/613,442. (7 Pages).
Restriction Official Action Dated May 18, 2020 from U.S. Appl. No. 16/078,653. (8 pages).
Restriction Official Action Dated Oct. 6, 2020 from U.S. Appl. No. 16/487,867. (6 pages).
Bimber "Holographics Combining Holograms With Interactive Computer Graphics", Retrieved From Holographer.org, 32 P., Apr. 2004.
Bimber "HoloGraphics: Combining Holograms With Interactive Computer Graphics", Retrieved From Holographer.org, p. 1-9, Apr. 2004.
Bimber "Merging Graphics and Holograms", Journal of Holography and Speckle , 3(2): 1-7, Dec. 2006.
Bimber et al. "Interacting With Augmented Holograms", Integrated Optoelectronic Devices, 2005: 41-54, Apr. 21, 2005.
Duchowski et al. "Measuring Gaze Depth With An Eye Tracker During Stereoscopic Display", Proceeding of the ACM SIGGRAPH Symposium on Applied Perception in Graphics and Visualization, APGV'11, Toulouse, France, Aug. 27- 28, 2011, p. 15-22, Aug. 27, 2011.
Galeotti et al. "In-Situ Visualization of Medical Images Using Holographic Optics", Proceedings of the Augmented Environments for Medical Imaging Including Augmented Reality in Computer-Aided Surgery (AMI ARCS), at Medical Image Computing and Computer-Assisted Intervention (MICCAI), New York City, p. 93-103, Sep. 10, 2008.
Goodman "Computer-Generated Holograms", Introduction to Fourier Optics, 3rd Ed., Chap.9.9: 355-359, 2005.
Jud et al. "Motion Tracking Systems. An Overview of Motion Tracking Methods", Studies on Mechatronics, Swiss Federal Institute of Technology Zurich, Switzerland, ETH, Chap. 1-5: 1-81, Spring 2011.
Liao et al. "3-D Augmented Reality for MRI-Guided Surgery Using Integral Videography Autostereoscopic Image Overlay", IEEE Transactions on Biomedical Engineering, XP011343257, 57(6): 1476-1486, Jun. 2010.
Moon et al. "Holographic Head-Mounted Display With RGB Light Emitting Diode Light Source", Optics Express, 22(6): 6526-6534, Published Online Mar. 13, 2014.
Nicolau et al. "An Augmented Reality System for Liver Thermal Ablation: Design and Evaluation on Clinical Cases", Medical Image Analysis, 13(3): 494-506, Available Online Feb. 20, 2009.
Nicolau et al. "Augmented Reality in Laparoscopic Surgical Oncology", Surgical Oncology, 20(3): 189-201, Sep. 2011.
Yeh "Optics of Periodic Layered Media: Bragg Reflectors", Optical Waves in Layered Media, Chap.6.3: 128-134, Feb. 2005.
Communication Pursuant to Article 94(3) EPC Dated Sep. 25, 2025 From the European Patent Office Re. Application No. 17714566.1 (6 Pages).

* cited by examiner

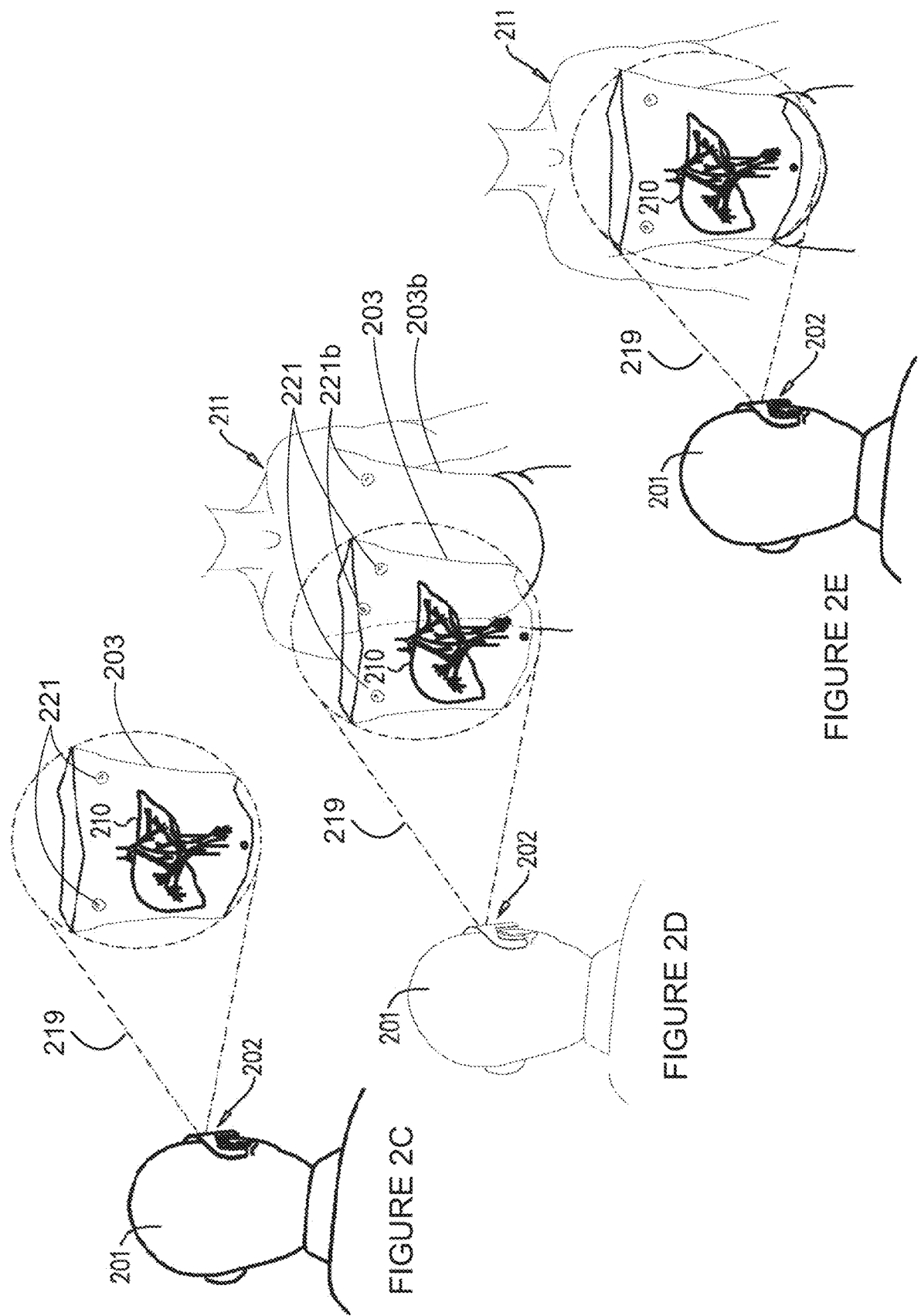

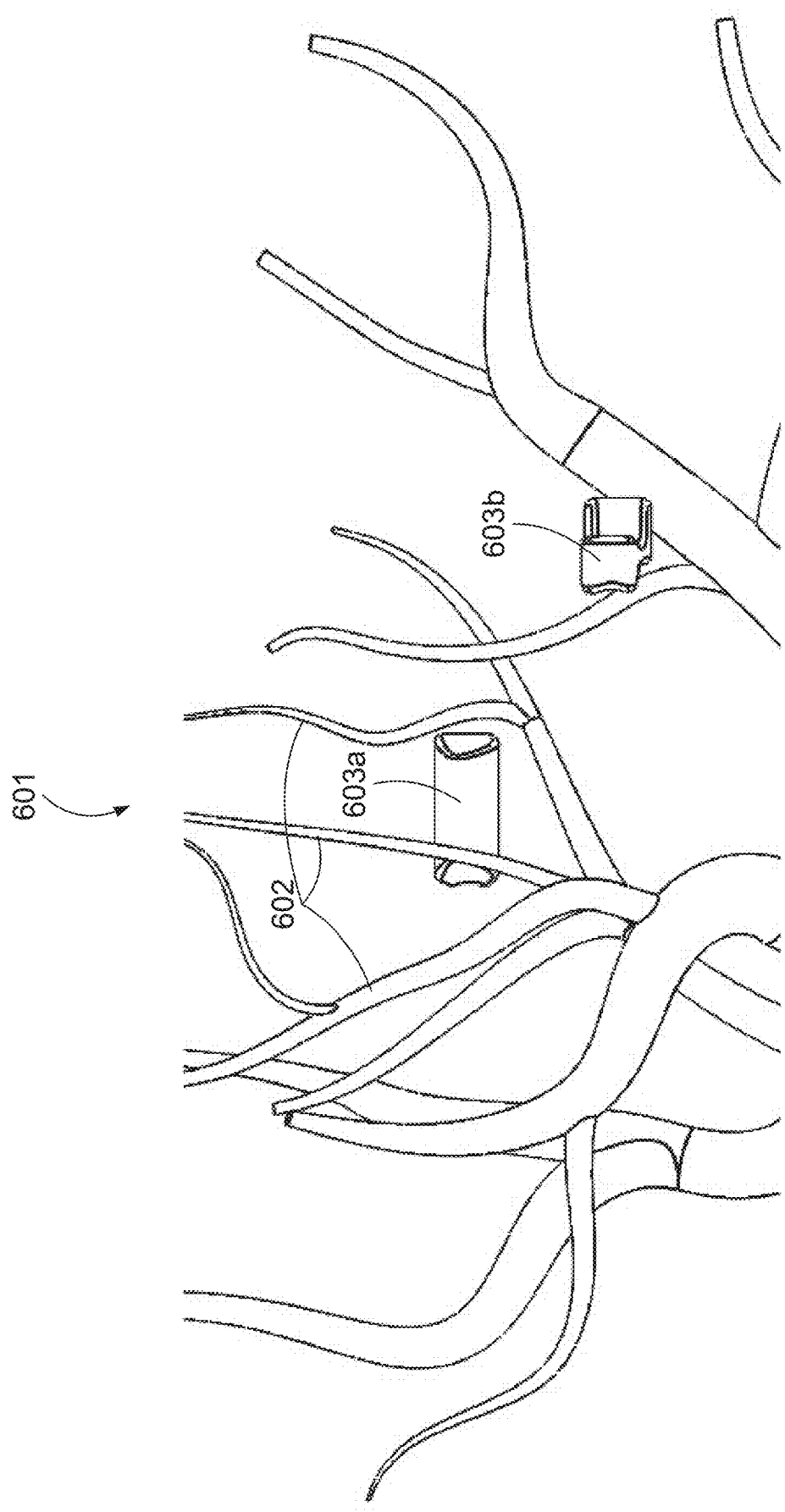

METHOD AND SYSTEM FOR DISPLAYING HOLOGRAPHIC IMAGES WITHIN A REAL OBJECT

RELATED APPLICATIONS

This application is a continuation of U.S. patent application Ser. No. 17/015,126 filed on Sep. 9, 2020, which is continuation of U.S. patent application Ser. No. 16/078,639 filed on Aug. 22, 2018, now U.S. Pat. No. 10,788,791, which is a National Phase of PCT Patent Application No. PCT/IL2017/050225 having International Filing Date of Feb. 22, 2017, which claims the benefit of priority under 35 USC § 119(e) of U.S. Provisional Patent Application Nos. 62/353,718 filed on Jun. 23, 2016 and 62/298,070 filed on Feb. 22, 2016. The contents of the above applications are all incorporated by reference as if fully set forth herein in their entirety.

FIELD AND BACKGROUND OF THE INVENTION

The present invention, in some embodiments thereof, relates to a display method and system which provides a 3D see-through vision view and, more particularly, but not exclusively, to a computer generated holographic (CGH) image display method and system which provides a 3D see-through vision view, and even more particularly, but not exclusively, to a CGH image display method and system which provides a display of a CGH image of a real object with every point in the CGH image of the real object aligned with its corresponding point in the real object in 3D space. Additional Background Art Includes:

U.S. Pat. No. 8,576,276 to Bar-Zeev et al; and
U.S. Patent Application Publication No. 2006/0176242 of Jaramaz et al.

The disclosures of all references mentioned above and throughout the present specification, as well as the disclosures of all references mentioned in those references, are hereby incorporated herein by reference.

SUMMARY OF THE INVENTION

The present invention, in some embodiments thereof, relates to a display method and system which provides a 3D see-through vision view and, more particularly, but not exclusively, to a computer generated holographic image display method and system which provides a 3D see-through vision view.

In some embodiments, a see-through vision display is provided of a first object within or behind a second object. In some embodiments, a holographic display system acquires and/or receives a 3D structure of the first object, including a location of a first marker on or in the first object, and the 3D structure of the second object and a second marker on or in the second object, and a relative position of the first marker relative to the second marker. The holographic display system projects an image of the first object inside or behind the second object based on detecting the markers and positioning the markers correctly relative to each other. In some embodiments the positions of the markers of the image of the first object are made to coincide with markers on the second object. In some embodiments the positions of the markers of the image of the first object are made to be shifted by a known distance and/or angle relative to markers on the second object.

The holographic image of an object provides both eye focus accommodation and eye convergence for a viewer, as natural distance/depth cues for a viewer's eye. The eye focus accommodation and eye convergence depth cues of a holographic image are the same as provided by a real object.

According to an aspect of some embodiments of the present invention there is provided a method for displaying a holographic image of a body organ at a correct location of the body organ, including obtaining a first three-dimensional dataset including data for producing a computer-generated-holographic (CGH) image of the body organ, determining a location of at least one first registration location in the body organ, detecting a location of at least one second registration location on the body, producing an interference based CGH image of the body organ, and displaying the CGH image of the body organ, wherein the displaying the CGH image of the body organ includes displaying the CGH image of the body organ so that the first registration location is displayed at a specific spatial location relative to the second registration location, and the CGH image of the body organ is aligned and located in a correct place of the body organ relative to the body.

According to some embodiments of the invention, the CGH image of the body organ provides a viewer simultaneously with both eye convergence and eye focus depth cues.

According to some embodiments of the invention, further including obtaining a relative location and orientation of the second registration location with respect to the first registration location.

According to some embodiments of the invention, further including accepting commands from a viewer of the CGH image via a user interface in order to align the CGH image of the body organ to be located in a correct place of the body organ in the body.

According to some embodiments of the invention, the displaying the CGH image of the body organ so that the CGH image of the body organ is aligned and located in a correct place of the body organ in the body is performed by a computation unit aligning the first registration location to the second registration location, and displaying the CGH image of the body organ aligned and located in a correct place of the body organ relative to the body.

According to some embodiments of the invention, further including obtaining a third three-dimensional dataset including data for producing a computer-generated-holographic (CGH) image of a tool, determining a location of at least one third registration location on the tool, producing an interference based CGH image of the tool, and displaying the CGH image of the tool, wherein the displaying the CGH image of the tool includes displaying the CGH image of the tool so that the third registration location is displayed at a specific spatial location relative to at least one of the first registration location and the second registration location, so that the CGH image of the tool is aligned and located in a real location of the tool relative to the body, and the CGH image of the tool provides a viewer with both eye convergence and eye focus depth cues.

According to some embodiments of the invention, a first portion of the tool is invisible within the body, and at least a second portion of the tool including the third registration location is visible outside the body.

According to some embodiments of the invention, the tool is an object selected from a group consisting of a syringe, a needle, a robot arm, a catheter, an endoscope, and an image acquisition tool.

According to some embodiments of the invention, the tool is an ultrasound imaging device for producing a three-dimensional dataset of an inner portion of the body, and further including obtaining, from the ultrasound imaging device, a fourth three-dimensional dataset including data for producing a computer-generated-holographic (CGH) image of a the inner portion of the body, producing an interference based CGH image of the inner portion of the body, and displaying the CGH image of the inner portion of the body, wherein the displaying the CGH image of the inner portion of the body includes displaying the CGH image of the inner portion of the body so that the CGH image of the inner portion of the body is aligned and located in a correct place relative to the ultrasound imaging device, and the CGH image of the inner portion of the body provides a viewer with both eye convergence and eye focus depth cues.

According to some embodiments of the invention, the first registration location is displayed at a same spatial location as the second registration location.

According to some embodiments of the invention, displaying the CGH image of the body organ includes displaying the CGH image of the body organ correctly oriented in space with a same orientation as the body organ is really oriented in the body.

According to some embodiments of the invention, the first registration location in the body organ includes a first group of registration locations including a plurality of registration locations in the body organ.

According to some embodiments of the invention, the second registration location on the body includes a second group of registration locations including a plurality of registration locations on the body.

According to some embodiments of the invention, the location of the first registration location in the body organ is detectable by image analysis, and the detecting the location of the first registration location in the body organ includes performing image analysis on the first three-dimensional dataset to detect the first registration location in the body organ.

According to some embodiments of the invention, further including providing a first registration marker at the first registration location, and wherein the first registration marker is detectable by an imaging modality used for the obtaining the first three-dimensional dataset.

According to some embodiments of the invention, the first registration marker has a shape which enables detection of orientation of the shape based on a two-dimensional view of the shape.

According to some embodiments of the invention, wherein the first registration marker has a three-dimensional asymmetric shape.

According to some embodiments of the invention, wherein the first registration marker includes a surface designed to provide indication of a 3D orientation of the first registration marker based on detecting the surface by a sensor.

According to some embodiments of the invention, the providing the first registration marker includes attaching the first registration marker to the body organ.

According to some embodiments of the invention, the location of the second registration location on the body organ is detectable by image analysis, and the detecting the location of the first registration location in the body organ includes performing image analysis of an image of the body organ to detect the second registration location in the body organ.

According to some embodiments of the invention, the detecting the location of the second registration location on the body includes performing image analysis on an image of the body to detect the second registration location on the body.

According to some embodiments of the invention, further including providing a second registration marker at the second registration location, and wherein the second registration marker is detectable by image analysis. According to some embodiments of the invention, the providing the second registration marker includes drawing a mark on the body. According to some embodiments of the invention, the providing the second registration marker includes attaching the second registration marker to the body.

According to some embodiments of the invention, further including obtaining a third three-dimensional dataset including data for producing a CGH image of a tool, detecting a location of a third registration location on the tool, producing the CGH image of the tool, and displaying the CGH image of the tool, wherein the displaying the CGH image of the tool includes displaying the CGH image of the tool so that the third registration location is displayed at a specific spatial location relative to the second registration location.

According to some embodiments of the invention, the location of the third registration location in the tool is detectable by image analysis, and the detecting the location of the third registration location in the tool includes performing image analysis on an image of the tool to detect the third registration location in the tool.

According to some embodiments of the invention, further including tracking movement of the third registration location in the tool relative to the second registration location, displaying the CGH image of the tool based, at least in part, on the tracking.

According to some embodiments of the invention, further including providing a third registration marker at the third registration location, and wherein the third registration marker is detectable by image analysis.

According to some embodiments of the invention, the providing the third registration marker includes drawing a mark on the tool. According to some embodiments of the invention, the providing the third registration marker includes attaching the third registration marker to the tool.

According to some embodiments of the invention, displaying the CGH image of the body organ includes displaying by a head mounted CGH image display.

According to an aspect of some embodiments of the present invention there is provided a system for displaying a holographic image of a body organ at a correct location of the body organ, including a computation unit for receiving a first three-dimensional dataset including data for producing a computer-generated-holographic (CGH) image of a body organ detecting a location of a first registration location in the dataset of the body organ, and producing an interference based computer generated hologram of the body organ, a sensor for detecting a location of a second registration location on a body, and a CGH image display for displaying an interference based CGH image of the body organ using the interference based computer generated hologram, wherein the displaying the CGH image of the body organ includes displaying the CGH image of the body organ so that the first registration location is displayed at a specific spatial location relative to the second registration location, so that the CGH image of the body organ is aligned and located in a correct place of the body organ in the body, and the CGH image of the body organ provides a viewer with both eye convergence and eye focus depth cues.

According to some embodiments of the invention, further including the computation unit configured to obtain a relative location and orientation of the second registration location with respect to the first registration location.

According to some embodiments of the invention, further including markers that are detectable by an image acquisition system selected from a list consisting of Magnetic Resonance Imaging, Computerized Tomography, Positron Emission Tomography-Computed tomography (PET-CT), nuclear imaging, X-ray, Infra-Red-camera, ultrasound, functional imaging, metabolic imaging, Optical Coherence Tomography (OCT), and IntraVascular Ultrasound (IVUS) imaging.

According to some embodiments of the invention, the markers are selected from a group consisting of a clip, a LED, an acoustic positioning system, an image pattern, a metallic pattern, an isotopic pattern, and a titanium pattern.

According to some embodiments of the invention, the markers have a shape which enables detection of orientation of the shape based on a two-dimensional view of the shape.

According to some embodiments of the invention, the markers have a three-dimensional asymmetric shape. According to some embodiments of the invention, the markers have a surface designed to provide indication of a 3D orientation of the markers based on detecting the surface by a sensor.

According to some embodiments of the invention, further including markers for attaching to the body that are detectable by the sensor for detecting a location of a second registration location on a body.

According to some embodiments of the invention, the sensor is selected from a group consisting of a camera, an acoustic positioning system, and an electro-magnetic positioning system. According to some embodiments of the invention, the sensor is included in the CGH image display.

According to some embodiments of the invention, the markers are attached to the body using at least one selected from a group consisting of a screw, a pin, a clip, a metal fastener, a polymer fastener, a sticker, glue, and paint.

According to an aspect of some embodiments of the present invention there is provided a method for displaying a holographic image of a body organ behind a body surface, including obtaining a first three-dimensional dataset including data for producing a three-dimensional image of a body organ, obtaining data describing a location of the body organ relative to a display device for displaying a three-dimensional image, using the display device to display a three-dimensional image of the body organ to appear a specific distance behind a surface of the actual body.

According to some embodiments of the invention, the display device displays the three-dimensional image with a plurality of points in the three-dimensional image each being in focus at a different distance from the display device.

According to some embodiments of the invention, at least some of the points in the three-dimensional image are in focus at a distance of less than 2 meters from the display device.

According to some embodiments of the invention, the display device includes a Computer Generated Holographic (CGH) image display.

According to some embodiments of the invention, the image of the body organ is aligned and located in a correct place of the body organ relative to the actual body.

According to some embodiments of the invention, when the display device is shifted relative to the actual body, the display device maintains the three-dimensional image of the body organ at a same location relative to the actual body.

According to some embodiments of the invention, when a distance of the display device is changed relative to the actual body, the display device changes focus of the three-dimensional image so that the three-dimensional image of the body organ appears in focus at a same location relative to the actual body.

According to an aspect of some embodiments of the present invention there is provided a system for displaying a holographic image of a first object behind a real object surface, including a computing unit for computing data for displaying a three-dimensional image of a first object, a location measurement unit for measuring a location of a surface of a real object, a display for displaying the three dimensional image of the first object, wherein the computing unit is adapted to compute data to display the three-dimensional image of the first object at least partly behind the surface of the real object.

According to an aspect of some embodiments of the present invention there is provided a method for displaying an interference based holographic image of a first object behind or within a visually obstructing second object, providing both eye convergence and eye focus accommodation cues, including obtaining a first three-dimensional dataset including data for producing a computer-generated-holographic (CGH) image of the first object, detecting a location of a first registration location in the first object, detecting a location of a second registration location in the second object, producing the CGH image of the first object, and displaying the CGH image of the first object, wherein the displaying the CGH image of the first object includes displaying the CGH image of the first object so that the first registration location in the first object is located at a specific spatial location relative to the second registration location.

According to some embodiments of the invention, the displaying the CGH image of the first object includes displaying a continuous range of both eye convergence and eye focus accommodation cues.

According to some embodiments of the invention, the location of the first registration location in the first object is detectable by image analysis, and the detecting the location of the first registration location in the first object includes performing image analysis on the first three-dimensional dataset to detect the first registration location in the first object.

According to some embodiments of the invention, further including providing a first registration marker at the first registration location, and wherein the registration marker is detectable by an imaging modality used for the obtaining the first three-dimensional dataset.

According to some embodiments of the invention, the providing the first registration marker includes producing a mark on the first object. According to some embodiments of the invention producing the mark includes drawing a mark on the first object. According to some embodiments of the invention, the providing the first registration marker includes attaching, affixing, fastening or inserting the first registration marker to the first object.

According to some embodiments of the invention, the location of the second registration location in the second object is detectable by image analysis, and the detecting the location of the second registration location in the second object includes performing image analysis on an image of the second object to detect the second registration location in the second object.

According to some embodiments of the invention, further including providing a second registration marker at the second registration location, and wherein the second registration marker is detectable by image analysis.

According to some embodiments of the invention, the providing the second registration marker includes drawing a mark on the second object. According to some embodiments of the invention, the providing the second registration marker includes attaching or inserting the second registration marker to the second object.

According to some embodiments of the invention, further including obtaining a third three-dimensional dataset including data for producing a CGH image of a third object, detecting a location of a third registration location in the third object, producing the CGH image of the third object, and displaying the CGH image of the third object, wherein the displaying the CGH image of the third object includes displaying the CGH image of the third object so that the third registration location is displayed at a specific spatial location relative to the second location.

According to some embodiments of the invention, the location of the third registration location in the third object is detectable by image analysis, and the detecting the location of the third registration location in the third object includes performing image analysis on an image of the third object to detect the third registration location in the third object.

According to some embodiments of the invention, further including tracking movement of the third registration location in the third object relative to the second registration location, displaying the CGH image of the third object based, at least in part, on the tracking.

According to some embodiments of the invention, further including providing a third registration marker at the third registration location, and wherein the third registration marker is detectable by image analysis.

According to some embodiments of the invention, the providing the third registration marker includes drawing a mark on the third object. According to some embodiments of the invention, the providing the third registration marker includes attaching the third registration marker to the third object.

According to some embodiments of the invention, displaying the CGH image of the first object includes displaying by a head mounted CGH image display.

According to some embodiments of the invention, displaying the CGH image of the third object includes displaying by a head mounted CGH image display.

According to an aspect of some embodiments of the present invention there is provided a method for displaying an interference based holographic image of an inner body organ within a body, providing both eye convergence and eye focus accommodation cues, including obtaining and/or receiving and/or using a first three-dimensional dataset including data for producing a computer-generated-holographic (CGH) image of the inner body organ, detecting a location of a first registration location in the inner body organ, detecting a location of a second registration location on the body, producing the CGH image of the inner body organ, and displaying the CGH image of the inner body organ, wherein the displaying the CGH image of the inner body organ includes displaying the CGH image of the inner body organ so that the first registration location is displayed at a specific spatial location relative to the second registration location.

According to some embodiments of the invention, the displaying the CGH image of the inner body organ includes displaying both eye convergence and eye focus accommodation cues.

According to some embodiments of the invention, the location of the first registration location in the inner body organ is detectable by image analysis, and the detecting the location of the first registration location in the inner body organ includes performing image analysis on the first three-dimensional dataset to detect the first registration location in the inner body organ.

According to some embodiments of the invention, further including providing a first registration marker at the first registration location, and wherein the first registration marker is detectable by an imaging modality used for the obtaining the first three-dimensional dataset.

According to some embodiments of the invention, the providing the first registration marker includes attaching the first registration marker to the inner body organ.

According to some embodiments of the invention, the location of the second registration location in the body is detectable by image analysis, and the detecting the location of the second registration location on the body includes performing image analysis on an image of the body to detect the second registration location on the body.

According to some embodiments of the invention, further including providing a second registration marker at the second registration location, and wherein the second registration marker is detectable by image analysis.

According to some embodiments of the invention, the providing the second registration marker includes producing a mark on the body. According to some embodiments of the invention, the providing the second registration marker includes attaching the second registration marker to the body.

According to some embodiments of the invention the relative location of the first marker (seen by the image modality that acquires the 3D data) to the second marker (detected by the CGH projection unit) is calculated, optionally by the CGH projection unit, in order to project the 3D data as a CGH image at the correct coordinates with respect to the second marker.

In some embodiments one or more markers on an outside of a patient's body are detected both by the CGH projection unit and by the imaging modality which acquires the 3D data, and the CGH image is projected such that the markers overlap.

In some embodiments a sensor outside the body detects location(s) of one or more marker(s) inside a patient's body, and the imaging modality which acquires the 3D data also detects the coordinates of the internal marker(s), and the location(s) from the sensors are provided to the CGH projection unit so as to display the CGH image, and such that the marker and its image overlap.

In some embodiments more than one sensor outside the body detect location(s) of one or more marker(s) inside a patient's body, and the imaging modality which acquires the 3D data also detects the coordinates of the internal marker(s), and the location(s) from the sensors are provided to the CGH projection unit so as to display the CGH image, and such that the marker and its image overlap.

In some embodiments a positioning system detects the marker(s) locations(s) by acoustic and/or electromagnetic sensors and sends the location(s) to the CGH image production system.

According to some embodiments of the invention, further including obtaining a third three-dimensional dataset including data for producing a CGH image of a tool, detecting a location of a third registration location associated with the tool, producing the CGH image of the tool, and displaying the CGH image of the tool, wherein the displaying the CGH image of the tool includes displaying the CGH image of the tool so that the third registration location is displayed at a specific spatial location relative to the second location.

According to some embodiments of the invention, the location of the third registration location in the tool is detectable by image analysis, and the detecting the location of the third registration location in the tool includes performing image analysis on an image of the tool to detect the third registration location associated with the tool.

According to some embodiments of the invention, further including tracking movement of the third registration location in the tool relative to the second registration location, displaying the CGH image of the tool based, at least in part, on the tracking.

According to some embodiments of the invention, further including providing a third registration marker at the third registration location, and wherein the third registration marker is detectable by image analysis.

According to some embodiments of the invention, the providing the third registration marker includes drawing a mark on the tool. According to some embodiments of the invention, the providing the third registration marker includes attaching the third registration marker to the tool.

According to some embodiments of the invention, displaying the CGH image of the inner body organ includes displaying by a head mounted CGH image display.

According to some embodiments of the invention, displaying the CGH image of the tool includes displaying by a head mounted CGH image display.

According to an aspect of some embodiments of the present invention there is provided apparatus for displaying an interference based holographic image of a first object behind or within a visually obstructing second object, providing both eye convergence and eye focus accommodation cues, including a computation unit for obtaining a first three-dimensional dataset including data for producing a computer-generated-holographic (CGH) image of the first object, detecting a location of a first registration location in the first object, producing the CGH image of the first object, a sensor for detecting a location of a second registration location in the second object, and a CGH image display for displaying the CGH image of the first object, wherein the displaying the CGH image of the first object includes displaying the CGH image of the first object so that the first registration location in the first object is located at a specific spatial location relative to the second registration location.

According to an aspect of some embodiments of the present invention there is provided apparatus for displaying an interference based holographic image of an inner body organ within a body, providing both eye convergence and eye focus accommodation cues, including a computation unit for receiving a first three-dimensional dataset including data for producing a computer-generated-holographic (CGH) image of the inner body organ detecting a location of a first registration location in the inner body organ, and producing a computer generated hologram of the inner body organ, a sensor for detecting a location of a second registration location on the body, and a CGH image display for displaying the CGH image of the inner body organ, wherein the displaying the CGH image of the inner body organ includes displaying the CGH image of the inner body organ so that the first registration location is displayed at a specific spatial location relative to the second registration location.

According to an aspect of some embodiments of the present invention there is provided a method for displaying an image of an object acquired using a first coordinate system by a CGH projection unit using a second coordinate system co-registered to the first coordinate system, the method including: a. providing a CGH image projection unit that monitors its display space, b. attaching to the object markers that are detectable in both the first and the second coordinate systems, c. capturing an image of the object with the markers using the first coordinate system, d. detecting the markers by the CGH projection unit using the second coordinate system, e. calculating a position of the object in the second coordinate system, and f. projecting the CGH image of the object at a location based on the position of the object in the second coordinate system.

According to some embodiments of the invention, the image taken using the first coordinate system includes markers that are detectable by an acquisition system selected from a list consisting of Magnetic Resonance Imaging, Computerized Tomography, PET-CT (Positron Emission Tomography—Computed tomography), nuclear imaging, X-ray, Infra-Red-camera, Ultrasound, functional imaging, metabolic imaging, OCT (Optical Coherence Tomography), IVUS (IntraVascular Ultrasound) imaging, Electrophysiology—electroanatomical mapping, and cone beam CT 3D rotational angiography.

According to some embodiments of the invention, the markers are selected from a group consisting of a clip, a LED, an acoustic positioning system, an image pattern, a metallic pattern, an isotopic pattern, and a titanium pattern.

According to some embodiments of the invention, also markers that are detectable by the CGH projection unit are attached to the body.

According to some embodiments of the invention, a sensor used by the CGH projection unit to detect the marker is selected from a group consisting of a camera, an acoustic positioning system and an electro-magnetic positioning system.

According to some embodiments of the invention, the markers are attached to the object using at least one selected from a group consisting of a screw, a pin, a clip, a metal or polymer fastener, a sticker, glue and paint.

According to an aspect of some embodiments of the present invention there is provided a method for co-registration of an image of an object acquired at a first coordinate system to a CGH projection unit at a second coordinate system including: a. providing a CGH projection unit that monitors its display space, b. attaching to the object markers that are detectable by the CGH projection unit in the second coordinate system, c. capturing the image of the object and the markers using the first coordinate system, d. sending the image of the object using the first coordinate system to the CGH projection unit, e. using the CGH projection unit to detect the markers, f. calculating the position of the image of the object using the second coordinate system, and g. projecting the image of the object based on the calculating the position of the image of the object using the second coordinate system.

According to some embodiments of the invention further including sending a shape and location of an additional object to the CGH projection unit.

According to some embodiments of the invention further including: the CGH projection unit detecting the markers, the CGH projection unit calculating a position of the object and the additional object in the second coordinate system; and projecting the image of the object and the image of the additional object using the second coordinate system.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced. In the Drawings:

FIGS. 2C, 2D and 2E are simplified illustrations of a HMD displaying a holographic image of a first object maneuvered to appear within a visually obstructing second object, according to an example embodiment of the invention;

FIG. 6A is a simplified line drawing of blood vessels and metastasis locations according to an example embodiment of the invention;

DESCRIPTION OF SPECIFIC EMBODIMENTS OF THE INVENTION

Figure 1A:
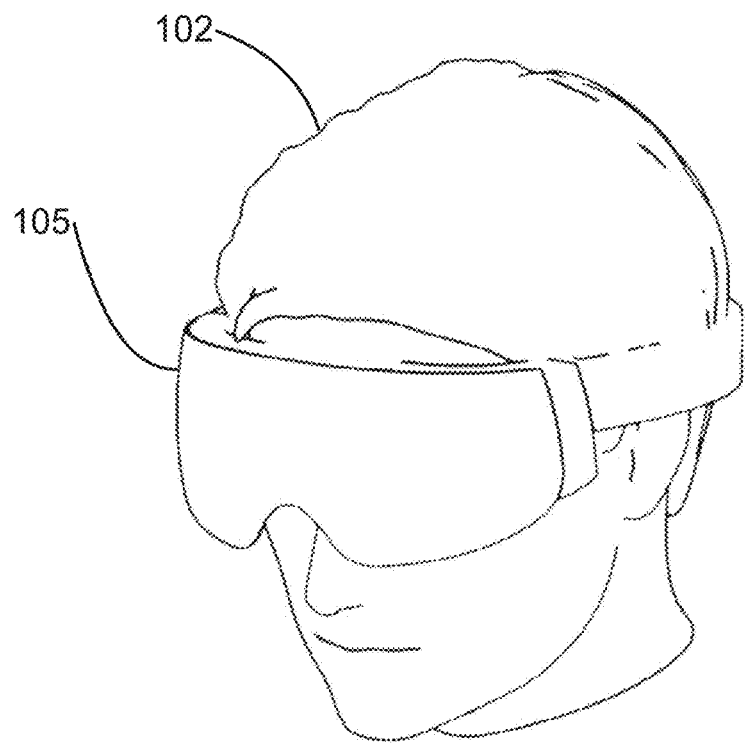
FIG. 1A is a view of a head with a Head Mounted Display (HMD) according to an example embodiment of the invention.

The present invention, in some embodiments thereof, relates to a display method and system which provides a 3D see-through vision view and, more particularly, but not exclusively, to a computer generated holographic (CGH) image display method and system which provides a 3D see-through vision view, and even more particularly, but not exclusively, to a CGH image display method and system which provides a display of a CGH image of a real object with every point in the CGH image of the real object aligned with its corresponding point in the real object in 3D space.

Overview

An aspect of some embodiments of the invention involves displaying one or more computer generated image(s) of a first object behind a surface of a real, actual second object.

In some embodiments the displaying is of a computer generated image of a body organ behind the real body surface.

In some embodiments the displaying is of a Computer Generated Holographic (CGH) image of the first object behind the real body surface.

In some embodiments the three-dimensional image is displayed by, for example, an augmented reality display such as a head mounted display, which also enables a viewer to view the real object in the real world. The image of the first object is displayed in a same space as the real object is viewed, so the viewer sees both the image and the real object. In some embodiments the viewer sees the image, for example of an internal organ, apparently behind a surface of the real object, for example apparently beneath the skin of a patient whose internal organ is being displayed.

In some embodiments the image of the internal organ is located at its correct location relative to a patient's body, optionally by aligning known landmark(s) on the body, such as a natural shape of the body or such as a marking added to the body, with known landmarks in the internal organ, again a natural shape of the internal or a marking added to the organ.

An aspect of some embodiments of the invention involves displaying one or more Computer Generated Holographic (CGH) image(s) in a space of an existing object. The CGH image(s) then, in some cases, appears to be visible inside the existing object, or the existing object, in some case, appears to be inside the CGH image(s).

An aspect of some embodiments of the invention involves displaying one or more CGH images in a space of an existing object.

In some embodiments the CGH image(s) are optionally images of internal body organs, and the real object is a body containing the real internal organs. Such embodiments are potentially useful in medical circumstances, where a physician is displayed a medical image in its correct location, and does not have to shift his view between looking at a patient and looking at the patient's medical images.

In some embodiments the CGH image(s) are optionally images of hidden elements of construction, and the real object may be walls, ceiling or floor hiding the elements.

An aspect of some embodiments of the invention involves aligning a CGH image of internal or hidden elements to an existing object so that the CGH image of the elements appears in its correct location and/or size and/or orientation relative to the existing object.

In some embodiments, the alignment is performed by a viewer using control commands to a display system displaying the CGH image(s) in order to align the elements with the exiting object. By way of a medical example, a physician commanding the CGH display to shift and/or rotate and/or scale a CGH image of a patient's internal organs to the patient's body. By way of a construction example, a viewer commanding the CGH display to shift and/or rotate and/or scale a CGH image of wiring to the visible wiring outlets on a wall.

In some embodiments, the alignment is performed automatically by a computer controlling the CGH display to shift and/or rotate and/or scale a CGH image to align markers detectable in a dataset for producing the CGH image with markers detectable in the existing object. By way of a medical example, aligning detectable elements of a patient's anatomy within the CGH image to detectable elements viewable on the patient's body. By way of a construction example, automatically computing values for the CGH display so as to shift and/or rotate and/or scale a CGH image of wiring to visible wiring outlets on a wall.

An aspect of some embodiments of the invention involves performing various medical procedures using displayed CGH image(s) of internal organs and/or medical tools aligned to a patient's body, enabling viewing the internal organs, the tool(s) and the patient's body all in their real place. Various embodiments are described below which teach beneficial uses of viewing internal organs and/or tools in their correct location in a patient's body.

An aspect of some embodiments of the invention involves using detectable markers in order to align the CGH image to the existing object.

In some embodiments two or more CGH images are optionally superposed to appear one inside the other.

In some embodiments displaying, to a viewer, two or more real and/or CGH images in a same space, at least up to an appropriate degree of accuracy.

The terms see-through vision or see-through view are used herein to refer to displaying a superposition of a CGH image and a real object, or two or more CGH images, in a same space/volume of space, or displaying of one or more CGH images behind a real object.

The term see-through vision may also be termed pseudo X-ray vision, as may be understood from the description above and the examples provided herein.

An aspect of some embodiments of the invention involves fusing views of real images with holographic images of real objects, optionally produced from three-dimension (3D) datasets describing the real objects, and/or with holographic images of computed objects or imaginary objects produced from three-dimensional (3D) datasets describing the computed or imaginary real objects.

Figure 1B:
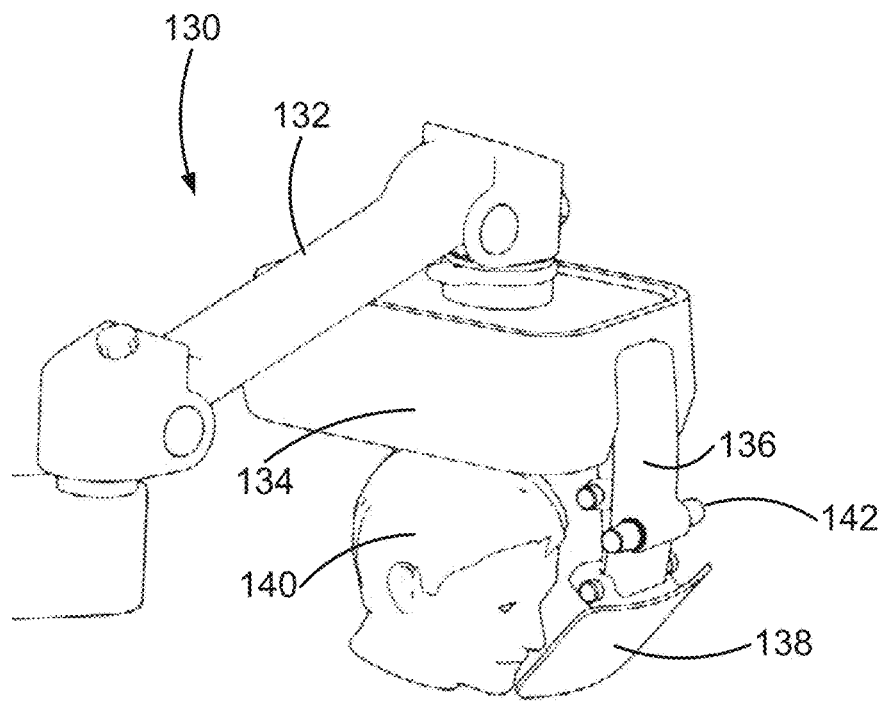
FIG. 1B is a simplified illustration of an example embodiment of a display on an adjustable arm according to an example embodiment of the invention.

The term "display" is used throughout the present specification and claims to mean a Computer Generated Holographic (CGH) display such as, by way of some non-limiting examples, a "head mounted display" (HMD) as depicted in FIG. 1A and a display on an adjustable arm as depicted in FIG. 1B.

An aspect of some embodiments of the invention involves detecting locations visible in a real objects and also visible or detectable in a 3D image or dataset of the real object, and aligning also termed registering, the CGH image of the object with the real object in 3D space.

In some embodiments the registering is performed as a registering of a 3D CGH image to a real body.

In some embodiments the registering is performed as a registering of more than one 3D CGH image to a real body, for example when the 3D CGH images are of the same real body.

In some embodiments the registering is performed as a registering of a 3D CGH image to another 3D image of the same real body.

In some embodiments the registering is performed across several real bodies and/or several CGH images. By way of a non-limiting example a registering of a first 3D CGH image to a 3D image of a first real body, and a registering of a second 3D image to the first real body and/or to the first CGH image. By way of another non-limiting example, a 3D CGH image of a patient's body is registered with the patient's body, and an image of a surgical tool partway inside the patient's body is registered with a portion of the surgical tool which is visible outside the patient's body. The above example, potentially enables a surgeon to view internal organs within a patient's body, and to view and image his/her surgical tool in its correct location within the body. Such an example provides see-through vision of objects and organs which are invisible to a naked eye.

In some example embodiments a physician steers a 3D CGH image of a body and/or internal organs to a correct, aligned location within the real body. The steering may require moving the image in one, two or three dimensions, and/or rotating the image, and/or scaling the image.

In some embodiments alignment in two dimensions is performed by the physician aligning known locations in the CGH image of the body with known locations of the real body. In some embodiments alignment in a depth dimension is optionally performed by the physician using 3D depth cues such as eye focus accommodation and/or eye convergence to align the CGH image display of the body with the actual location of the real body.

In some embodiments a marker detection system detects markers on or in the real body, and the CGH image display system, which also detects locations of the markers in the 3D CGH image of the body and/or internal organs, aligns the CGH image correctly with the real body.

In some embodiments a surgeon can keep looking at a patient's body and see medical images drawn to a correct scale and correctly aligned to the patient's body.

In some example embodiments it is not a physician which steers a 3D CGH image of a body and/or internal organs to a correct, aligned location within the real body, but some other scenario, such as a viewer viewing pipes and/or wiring within or behind a wall, and aligning the pipes/wiring correctly with their true location in the wall, optionally based on common details visible on the real wall and also in the CGH image of the wall.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Reference is now made to FIG. 1A, which is a view of a head 102 with a Head Mounted Display (HMD) 105 according to an example embodiment of the invention. FIG. 1A depicts an isometric view of a HMD 105 allowing a viewer to see through the display while also displaying a holographic image. In some embodiments the HMD 105 may be implemented as eyeglasses or goggles.

It is noted that a holographic image, by way of a non-limiting example a Computer Generated Holographic (CGH) image, displays an image which provides true depth cues. For example, a holographic image provides a three-dimensional image for which a human viewer's eye potentially performs both eye focus accommodation, and eye convergence accommodation.

In contrast, for example, a stereoscopic display provides an illusion of depth by displaying two slightly shifted images, one to each eye.

In addition, for example, an isometric image display provides neither eye convergence depth cues, nor eye focus depth cues, only an illusion of a three-dimensional image by virtue of displaying an isometric image.

Reference is now made to FIG. 1B, which is a simplified illustration of an example embodiment of a display on an adjustable arm according to an example embodiment of the invention. FIG. 1B depicts a system 130 which includes an optional enclosure 134 to optionally include a computing unit; as well as optical components such as coherent light sources, SLM(s), and optionally additional optical components for displaying a CGH image. FIG. 1B also depicts an optional adjustable arm 132 from the system mounting surface (not shown) to enclosure 134 and an optional arm 136 from the enclosure 134 to a semi-transparent/semi-reflective eyepiece 138, optionally containing additional optical components for displaying a CGH image. In some embodiments the semi-transparent/semi-reflective eyepiece 138 is a partially-transmitting/partially-reflecting curved mirror at projected light wavelengths, or a volumetric holographic element which acts as an eyepiece. FIG. 1B also depicts one or more optional handle(s) 142. FIG. 1B also depicts a viewer 140 using the system 130.

In some embodiments the adjustable arm 132 is a boom arm.

An aspect of some embodiments of the invention involves displaying, by way of a non-limiting example, a CGH image of a body's internal organs, correctly placed within a view of the real body. In some embodiments, such displaying is optionally achieved by the display device detecting a location of the real body, and displaying the CGH image of the body's internal organs at their correct location.

The terms "correct" place and/or correct orientation are used herein to mean a degree of accuracy appropriate with a medical need or a medical procedure.

The terms "correct location" "correct place" "correct coordinates" "correct orientation" "real location" "real place" "real coordinates" "real orientation" "same location" "same place" "same coordinates" "same orientation" in all their grammatical forms are used throughout the present specification and claims interchangeably to mean that a first CGH image is aligned with a second CGH image or with a second real object such that points on the first CGH image appear to a viewer in a same location in space as corresponding points in the second CGH image or in the second real object, to the above-mentioned appropriate degree of accuracy.

In some embodiments, such as performing a medical diagnosis, the CGH image is optionally approximately aligned with a patient's body and/or visible features on or within the patient's body, and the CGH image serves as an in-place image, showing a physician the internal organs in their approximate location. By way of a non-limiting example, such a display potentially eliminates a need for a physician to perform feats of mental imagery to imagine the internal organs in place, potentially eliminating, for example, mistakes between left and right of the patient's body in identifying or treating organs.

In some embodiments, such as performing a surgical procedure, the CGH image is optionally aligned accurately, and the CGH image potentially serves, by way of a non-limiting example, for determining a location of a tool relative to an internal organ, optionally as part of the surgical procedure.

In some embodiments the accuracy of alignment is measured as accuracy of within pixels or voxels of the CGH image to an actual body, and an accuracy of less than 10 pixels/voxels, such as 5, 2, 1 pixels/voxels, and even sub-pixel accuracy, such as 0.5, 0.2, 0.1 pixels/voxels or better.

In some embodiments the accuracy of alignment is measured as accuracy of within millimeters of the CGH image to an actual body, and an accuracy of less than 10 millimeters, such as 5, 2, 1 millimeters, and even sub-millimeter accuracy, such as 0.5, 0.1 millimeters or better.

In some embodiments the above-mentioned accuracy of alignment is achieved for a CGH image which is displayed at an apparent distance of 15-200 centimeters from a viewer's eyes. In some embodiments the above-mentioned accuracy of alignment is achieved for a CGH image which is displayed at an apparent hand-reach distance from a viewer.

In some embodiments sub-pixel accuracy of alignment is optionally achieved by image processing a dataset for producing the CGH image and an image of the patient obtained by the display system, and minimizing mean error between a shape of the body of the patient in the CGH image and a shape of the body of the patient in the image of the patient obtained by the display system.

In some embodiments sub-pixel accuracy of alignment is optionally achieved by detecting markers in the dataset for producing the CGH image and detecting the markers in an image of the patient obtained by the display system, and minimizing mean error between locations of the markers in the CGH image and in the image of the patient obtained by the display system.

In some embodiments the accuracy of alignment/registration is achieved in one or more of the following measures: translation along three-dimensions, such as sideways, up-down- and along the depth direction; scaling; and rotation.

The term "co-registration" is used throughout the present specification and claims to mean aligning a displayed CGH image with a real object/body, and/or with an additional displayed CGH image(s).

In some embodiments, the co-registration aligns the displayed CGH image with a real object/body, in such a way that a viewer's eye convergence and eye focus for the displayed CGH image is identical to the viewer's eye convergence and eye focus for viewing the real object. In some embodiments the viewer's eye convergence and eye focus is identical even when the real object is hidden, and the displayed image is visible at the location of the real object.

Figure 2A:
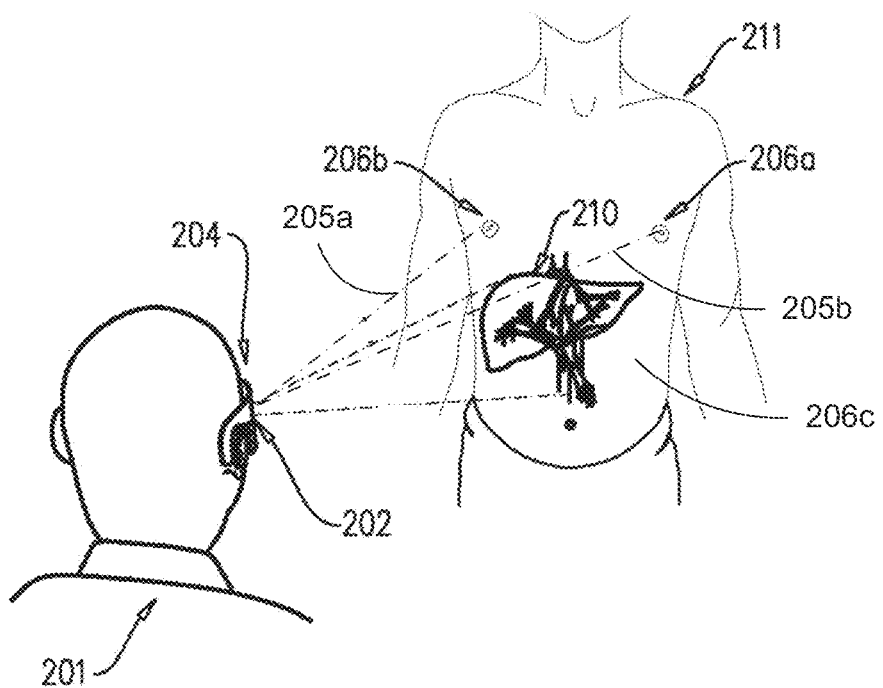
FIG. 2A is a simplified illustration of a HMD displaying a holographic image of a first object and a visually obstructing second object, according to an example embodiment of the invention.

Reference is now made to FIG. 2A, which is a simplified illustration of a HMD displaying a holographic image of a first object and a visually obstructing second object, according to an example embodiment of the invention.

FIG. 2A depicts the holographic image 210 of the first object, for example internal organs, for example liver and related blood vessels, behind and/or within the visually obstructing second object, for example the skin of an actual body of the patient whose internal organs are displayed.

FIG. 2A depicts a viewer 201 wearing a HMD 202, which displays the holographic image 210 of the internal organs of a patient.

The viewer 201 also sees the body 211 of the patient, so the viewer 201 sees the internal organs (liver and related blood vessels) within the body 211.

In some embodiments the HMD 202 displays to the viewer 201 just portions of body organs, so the viewer 201 sees the portions of the body organs appear within the body 211 at their correct locations.

In some embodiments the HMD 202 displays to the viewer 201 artificial devices implanted in the body 211 of the patient, such as stent(s), heart valves, pacemakers, artificial joints, and so on, so the viewer 201 sees the artificial devices appear within the body 211 at their correct locations.

In some embodiments the viewer 201 also sees artificial devices implanted in the body 211 of the patient, such as stent(s), heart valves, pacemakers, artificial joints, and so on, so the viewer 201 sees the artificial devices appear within the body 211 at their correct locations.

In some embodiments, the liver and related blood vessels are correctly located in space relative to the body 211. In some embodiments the display system, the HMD 202 for example, obtains a first relative location or coordinates of a location or locations 206a 206b on the body 211 of the patient, relative to the HMD 202, and also obtains second relative location(s) or coordinates of the location(s) 206a 206b relative to a three-dimensional (3D) imaging dataset used for producing the holographic image 210 of the internal organs of the patient.

In some embodiments the locations 206a 206b may be body parts, such as, by way of a non-limiting example nipples, or an umbilicus, or body contours or features which can be identified by the HMD 202 as well as be identifiable in the (3D) imaging dataset, either by computerized image processing and/or by the viewer 201 viewing the locations 206a 206b in the CGH image as well as in a real view.

In some embodiments the locations 206a 206b may be artificial markings, such as described in more detail elsewhere in the herein.

In some embodiments, the HMD 202 displays the holographic image 210 of the internal organs so that the locations 206a 206b in the holographic image coincide, also termed herein co-register, with the locations 206a 206b in the real world, on the body 211 of the patient. Such co-registration potentially displays the internal organs in the correct location relative to the body 211.

In some embodiments, the HMD 202 also displays a skin 206c of the patient. In some embodiments, the skin 206c is displayed based on data from a three-dimensional (3D) imaging dataset used for producing the holographic image 210 of the internal organs of the patient.

In some embodiments the HMD 202 optionally has one or more sensor(s) 204 which can detect and locate the markings 206a 206b. The sensor(s) 204 optionally measures distance and/or angle toward the markings 206a 206b on the patient's body 211, for example along lines 205a 205b. The measurement potentially enables the HMD 202 to determine a location of the patient's body 211 relative to the displayed CGH image 210 of the internal organs.

The sensor(s) 204 may optionally be any one of the sensors described herein.

The locations 206a 206b may optionally be any of markings described herein.

In some embodiments, the display, such as the HMD 202, is a see-through display, such that a viewer sees the real world through the display at the same time as seeing the CGH image 210. Such a display is termed an augmented reality display, since both reality e.g. body 211 and the CGH image 210 are seen.

When the CGH image 210 is an image of a real object, e.g. of a body organ, the display may optionally be termed a fused reality display.

In some embodiments, knowing the location of the internal organs relative to the body 211 and/or relative to HMD 202 potentially enables the HMD 202 to implement a man-machine-interface (MMI).

By way of some non-limiting examples, a MMI command may optionally include aligning a CGH image of the internal organs to the body, and may optionally include a measure of accuracy at which the alignment should be done.

By way of some non-limiting examples, a MMI command may optionally include to display a CGH image of the internal organs at some location other than aligned to the body such as, by way of some non-limiting examples: floating above the body, floating above the body and rotated by a specific angle relative to the body or in proximity to the body.

By way of some non-limiting examples, a MMI command may optionally include to display a CGH image of the internal organs re-aligned, back from the not-aligned location.

In some embodiments, when a viewer 201 wearing the HMD 202 moves his head, and/or moves his eyes to a different direction, the HMD 202 compensates for the movement, and displays the CGH image 210 in its correct location, registered to the body 211.

In some embodiments, when the body 211 of a patient moves or shifts, the HMD 202 compensates for the movement, optionally by tracking the locations 206a 206b, and displays the CGH image 210 in its correct location, registered to the body 211.

It is noted that the viewer 201 moving the HMD potentially enables the viewer to inspect or view the CGH image from different angles, the same as inspecting or viewing the real object which the CGH image is displaying.

Such tracking of the viewer 201 movements and/or patient movements are described with reference to FIG. 2A, yet it is to be understood by a person skilled in the art that such tracking applies to all embodiments described herein.

Figure 2B:
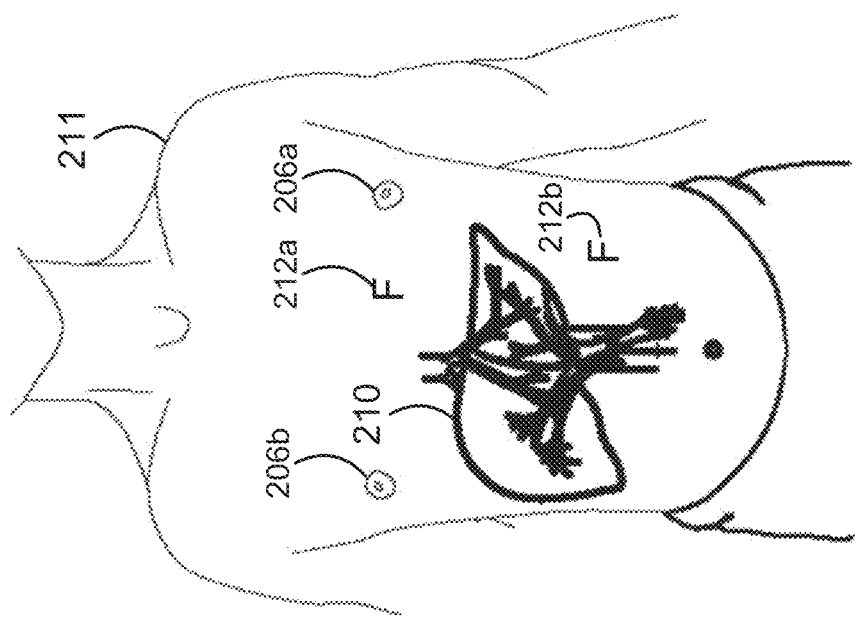
FIG. 2B is a simplified functional illustration of a display system according to an example embodiment of the invention.
Figure 2B:
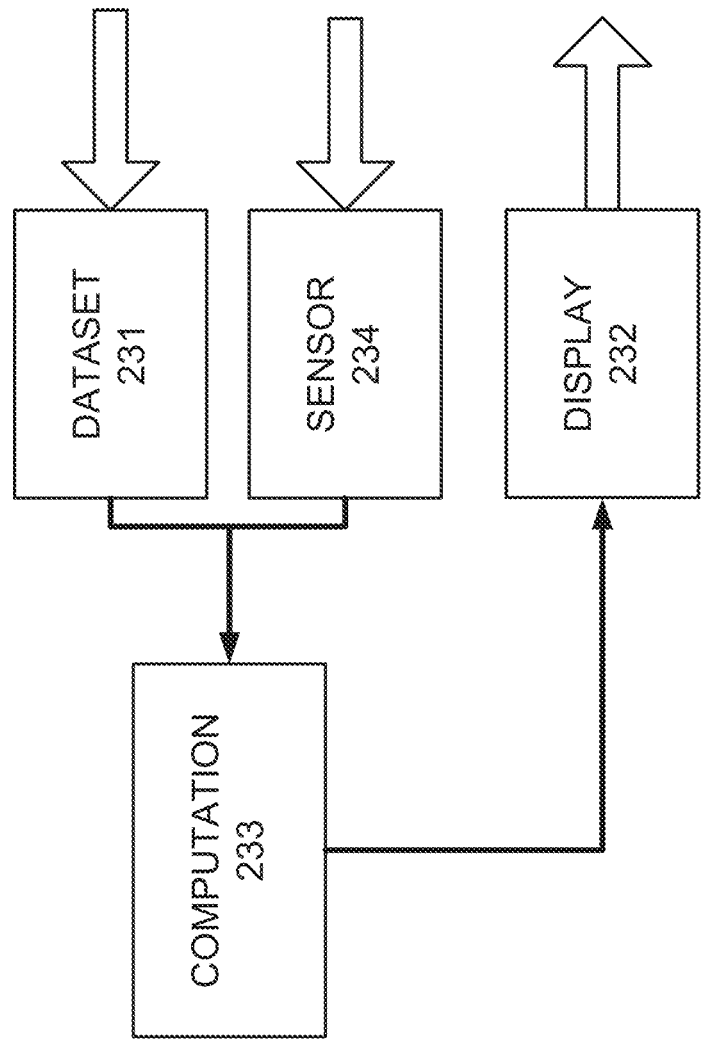

Reference is now made to FIG. 2B, which is a simplified functional illustration of a display system according to an example embodiment of the invention.

FIG. 2B shows functional blocks in an example embodiment of the invention and how they optionally interact in order to display a holographic image of a body organ, optionally at a correct location of the body organ within a body.

FIG. 2B depicts a body 211.

An imaging system (not shown) optionally images the body 211, optionally producing a first three-dimensional dataset 231 for producing a computer-generated-holographic (CGH) image of a body organ 210.

The dataset 231 is optionally fed into a computation unit 233, which can produce a computer-generated hologram of the body organ. In some embodiments one or more marker(s) location(s) and/or orientation(s) are optionally part of the data set.

A sensor 234 optionally detects locations of features in the body 211 which may optionally serve to align an image of the body organ with a view of the real body 211. In some embodiments the features are natural features such as nipples 206a 206b. In some embodiments the features are markers 212a 212b on and/or in the body. The sensor 234 optionally provides data, for example distance and direction from the sensor to the features or markers, to the computation unit 233, which can use the data to calculate and produce a computer generated hologram for displaying the CGH image of the body organ so that the CGH image of the body organ 210 is aligned and located in a correct place of the body organ in the body 211. In some embodiments one or more markers are optionally detected by the computation unit 233.

In some embodiments a sensor provides an inner marker location, or a relative position of the inner marker with respect to an outer marker, and the CGH unit senses the location of the outer marker, and optionally calculates the location of the inner marker.

Reference is now made to FIGS. 2C, 2D and 2E, which are simplified illustrations of a HMD displaying a holographic image of a first object maneuvered to appear within a visually obstructing second object, according to an example embodiment of the invention.

FIG. 2C depicts a holographic image 210 of the first object, for example a torso 203 including internal organs 210, for example liver and related blood vessels of a patient, floating in the air. FIG. 2C also depicts a viewer 201 wearing a HMD 202, which displays a field of view 219, which displays the holographic image 210. The holographic image is optionally floating in the air, somewhere in a vicinity of a patient's body (not shown in FIG. 2C, but shown in FIGS. 2D and 2E).

FIG. 2D depicts the holographic image 210 of the torso 203 and the internal organs 210 floating in the air, and maneuvered by the viewer 201 toward a patient's body 211, also showing a torso 203b. FIG. 2D depicts the holographic image 210 partly inside and partly outside of the patient's body 211.

In some embodiments the viewer 201 provides user commands to a user interface associated with the HMD 202, to move a location of the display of the CGH image 210 in space, by way of a non-limiting example toward a correct location for the internal organs within the patient's body 211.

In some embodiments the viewer 201 provides user commands to a user interface associated with the HMD 202, to rotate the display of the CGH image 210 in space, by way of a non-limiting example to appear from a correct aspect or angle for the internal organs within the patient's body 211.

In some embodiments the viewer 201 provides user commands to a user interface associated with the HMD 202, to scale (change size) the display of the CGH image 210 in space, by way of a non-limiting example so as to appear at a correct size for the internal organs relative to the patient's body 211.

In some embodiments the maneuvering of the holographic image 210 is optionally performed by a user interface, the viewer 201 maneuvering the image 210 in three-dimensions in space (up-down, left-right, and forward-backward in a depth direction relative to the viewer), optionally rotating around three axes (optionally up-down, left-right, and forward-backward in a depth direction relative to the viewer), and optionally scaling (making the holographic image 210 larger or smaller).

In some embodiments the viewer 201 uses depth cues provided by the holographic image 210 and by a viewable portion of the real object which is the body of the patient 211 in order to maneuver the holographic image 210 in the depth direction.

In some embodiments the viewer aligns natural registration markings, such as, by way of some non-limiting examples, a patient's 211 nipples 221 and/or the outline of the patient's torso 203 in the holographic image 210 and a patient's nipples 221b and/or the outline of the patient's torso 203b in the real patient's 211 body.

FIG. 2E depicts the holographic image 210 of the internal organs behind or within the visually obstructing skin of the actual body 211 of the patient whose internal organs are displayed.

In some embodiments, the location of the display of the CGH image 210 in space is automatically located and/or rotated and/or scaled to appear at a correct location for the internal organs within the patient's body 211. By way of a non-limiting example, the HMD 202 locates identifiable features which are common to both the visible body 211 and to a dataset used for producing the CGH image of the internal organs, and produces the display of the internal organs so that the identifiable features are co-registered. By way of a non-limiting example the identifiable locations may be nipples 221 and/or an umbilicus on the body 211, or an outline of the body 211, or markers as described elsewhere herein.

In some embodiments, the display of the CGH image 210 in space is optionally manipulated, by a user or automatically, with one or more of the following image manipulations: rotation; shifting/moving in space; scaling and/or zooming; slicing an image; fusing two images; and marking a location in an image.

In some embodiments the identifiable features which are common to both the visible body 211 and to the dataset include bony protuberances, which are less likely to shift relative to the body when a patient shifts her/his position, and less likely to shift relative to internal organs of the body when the patient shifts her/his position.

In some embodiments a physician thus steers a 3D CGH image of a body and/or internal organs to a correct, aligned location within the real body. In some embodiments alignment in two dimensions is performed by the physician aligning known locations in the CGH image of the body with known locations of the real body. In some embodiments alignment in a depth dimension is optionally performed by the physician using 3D depth cues such as eye focus accommodation and/or eye convergence to align the CGH image display of the body with the actual location of the real body.

In some embodiments, the MMI may optionally be as described in above-mentioned U.S. Pat. No. 8,500,284; and/or as in U.S. Patent Application Publication Number 2014/0033052; and/or as in PCT Patent Application Publication WO 2015/004670.

In some embodiments, tracking a body's location and/or orientation in space relative to the HMD 202 is optionally performed by an external system tracking the body 211 and/or the HMD 202.

In some embodiments, tracking a display's orientation in space, such as the HMD 202, is optionally performed by the display itself, by optically tracking location of objects, external to the display, in space; by optically tracking specific markings in a vicinity of the display in space; by using direction finding similarly to direction finding by mobile devices such as smart phones; by using an accelerometer; by using a gravity sensor; and in case of a display mounted on an adjustable arm, optionally measuring angles of sections of the adjustable arm.

In some embodiments, a tracking system for determining three-dimensional coordinates is optionally an optical tracking system monitoring objects in a same space as the CGH image is displayed.

In some embodiments, a tracking system for determining three-dimensional coordinates is optionally an electromagnetic tracking system monitoring objects such as markers in a same space as the CGH image is displayed.

In some example embodiments, a view of internal organs within a body, by way of a non-limiting example as described with reference to FIG. 2A, may be done, by way of a non-limiting example, for planning a surgical procedure, during a surgical procedure, and for teaching purposes.

In some example embodiments, a view of a first object within and/or behind a second object may be done, by way of a non-limiting example, for displaying pipes behind or within a wall, pipes underneath the ground, geologic formations beneath the ground, electric wires behind or within walls, a sewer pipe beneath the ground, a cable in a pipe, and so on.

An aspect of some embodiments of the invention involves displaying, by way of a non-limiting example, a CGH image of a body's internal organs, correctly placed within a view of the real body, via two or more displays, each one of the displays displaying the same CGH image, as viewed from a viewpoint of an associated CGH image display, of the body's internal organs, correctly placed within the view of the same real body, to the above-mentioned appropriate degree of accuracy.

In some embodiments, such displaying is optionally achieved by each one of the display devices detecting a location of the real body, and displaying the CGH image of the body's internal organs at the correct location and from a correct viewpoint.

It is noted that a CGH displays a true depth at CGH image points, causing eye focus accommodation and eye convergence, the CGH image appears as the real object would appear to a viewer with reference to eye focus accommodation and eye convergence.

In some embodiments, such displaying is optionally achieved by one of the display devices detecting a location and/or orientation of another or others of the display devices. The display device which detects the locations/orientations of the other devices either provides relative distance/direction data to the other devices, or to a central computing unit.

In some embodiments, the detecting a location and/or orientation of the display devices is optionally performed by a central tracking unit, e.g. such as a tracking camera and a tracking processor, or a Kinect camera.

In some embodiments a central computing unit calculates the pixel settings for SLMs of each of the CGH image displays.

In some embodiments each of the CGH image displays calculates the SLM pixel setting for itself, based partly on receiving a location of the real body relative to the CGH image display.

The above-mentioned embodiments span many combinations. One such combination is described with reference to FIG. 3. A person skilled in the art can understand many additional combinations based on the description of the example embodiment of FIG. 3.

Figure 3:
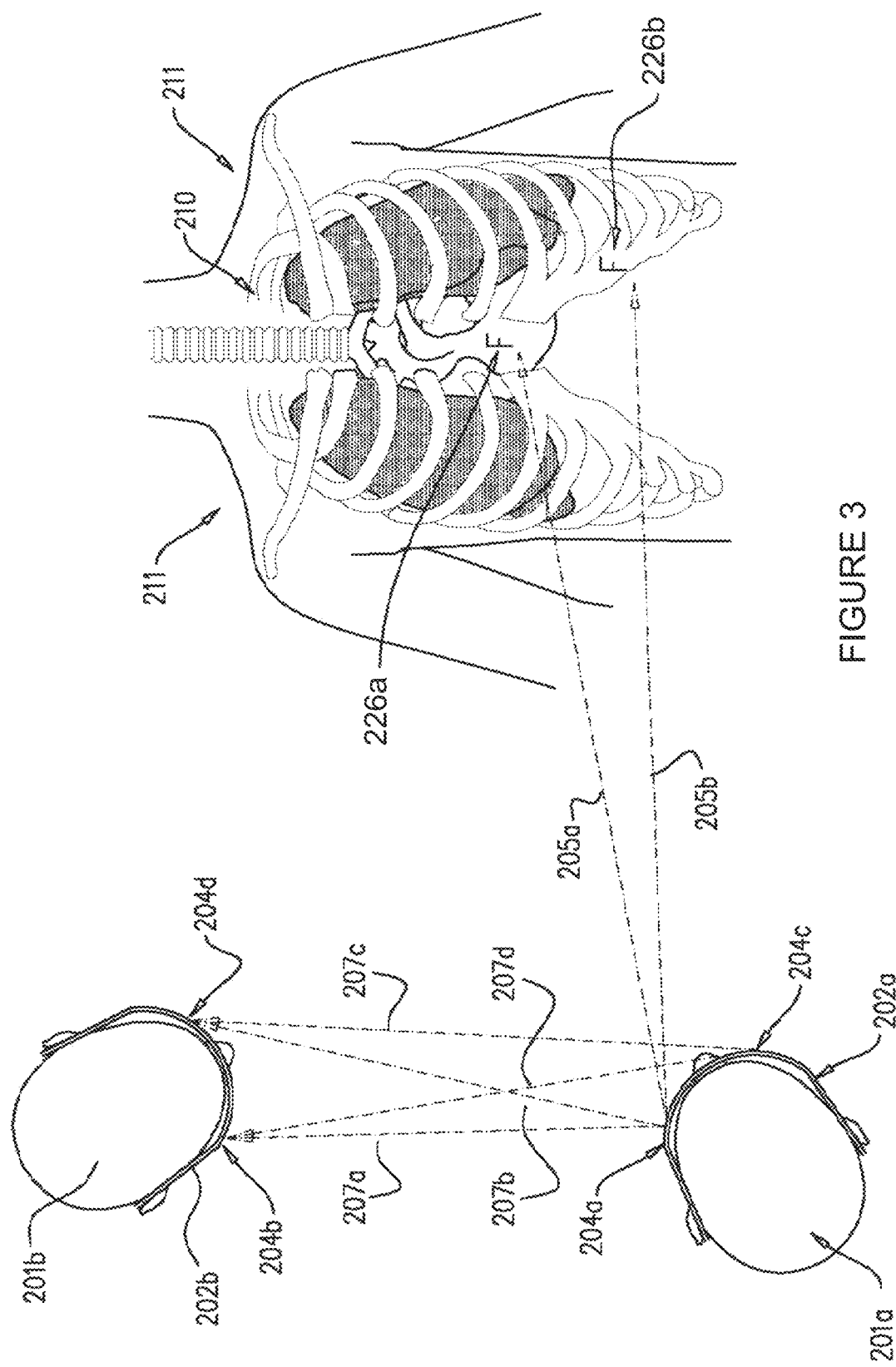
FIG. 3 is a simplified illustration of two HMDs displaying a same holographic image of a first object behind or within a visually obstructing second object, according to an example embodiment of the invention.

Reference is now made to FIG. 3, which is a simplified illustration of two HMDs displaying a same holographic image of a first object behind or within a visually obstructing second object, according to an example embodiment of the invention.

FIG. 3 depicts a holographic image 210 of the first object, for example internal organs, for example bones and lung, behind or within the visually obstructing second object, for example the skin of an actual body 211 of the patient whose bones are displayed.

FIG. 3 depicts two viewers 201a 201b each wearing a HMD 202a 202b, which displays the holographic image 210 of the bones and lung of a patient.

The viewers 201a 201b also see the body 211 of the patient, so see the internal organs (bones and lung) and the body 211.

In some embodiments, the displays, such as the HMDs 202a 202b, are see-through displays, such that viewers see the real world and the body 211 through the display at the same time as seeing the CGH image 210 of the internal organs (bones and lung). Such a display is termed an augmented reality display, since both reality and the CGH image are seen.

In some embodiments, the CGH image 210 of the bones and lung is correctly located in space relative to the body 211.

In some embodiments the display systems, the HMDs 202a 202b for example, obtain a first relative location or coordinates and/or orientation of a marking or markings 226a 226b on the body 211 of the patient, relative to the HMDs 202a 202b, and also obtain a second relative location or coordinates and/or orientations of the markings 226a 226b relative to a three-dimensional imaging dataset used for producing the holographic image 210 of the bones and lung of the patient. Each one of the HMDs 202a 202b produce a CGH image 210 display of the bones and lung correctly located in space relative to the body 211, by co-registering the CGH image 210 to the body 211. In such embodiments the HMDs 202a 202b operate independently of each other, yet optionally display the same CGH image at the same location and orientation in space and relative to the body to the above-mentioned appropriate degree of accuracy.

In some embodiments the display systems, the HMDs 202a 202b for example, obtain a first relative location or coordinates and/or orientation of a marking or markings 226a 226b on the body 211 of the patient, relative to one of the HMDs 202a 202b, and also obtain a second relative location and/or orientation of the other one of the HMDs 202a 202b. Each one of the HMDs 202a 202b produce a CGH image 210 display of the bones and lung correctly located in space relative to the body 211.

In some embodiments the relative location or orientation of the other one of the HMDs 202a 202b is optionally obtained by one or more sensors 204a 204b 204c 204d on the HMDs 202a 202b optionally detecting one or more marking or sources of light on the other one of the HMDs 202a 202b, e.g. along directions 207a 207b 207c 207d.

An aspect of some embodiments of the invention involves displaying, by way of a non-limiting example, a CGH image of a body's internal organs, correctly placed within a view of the real body, and a CGH image of an additional object, for example a surgical tool, inserted wholly or partially within the real body, correctly placed within the view of the same real body, to the above-mentioned appropriate degree of accuracy.

An aspect of some embodiments of the invention involves displaying, by way of a non-limiting example, a CGH image of a body's internal organs, placed not aligned with the real body, and providing user interface commands for a physician to align the CGH image with the real body. Some non-limiting example of the user interface commands include:
 automatically aligning the CGH image with the real body, potentially including automatic shifting and/or scaling and/or rotating;
 automatically moving an aligned CGH image to a different position, such as floating above the real body, or in the vicinity of the real body; and
 using a user interface control, such as a slider, mouse, wheel, joystick, touchpad, pointer to move the CGH image in three-dimensions, to enlarge or shrink a display of the CGH image, to rotate the CGH image.

In some embodiments the user interface is optionally implemented by detecting hand and/or finger motions in a space monitored by the CGH display system, or by eye movements monitored by the CGH display system.

In some embodiments a physician optionally aligns the CGH image with the patient's body by moving and/or rotating and/or scaling the CGH image display without handling the patient.

In some embodiments a physician optionally aligns the CGH image with the patient's body by using depth cues such as eye focus accommodation and eye convergence to determine a distance in a CGH image depth to place the CGH image relative to the patient's body, optionally aligning visible parts of the patient's body with corresponding parts in the displayed CGH image.

In some embodiments the markings 226a 226b optionally have a structure which enables a sensor or sensors such as sensor 204a, or an HMD such as the HMDs 202a 202b to determine orientation of the marking in space. By way of a non-limiting example, FIG. 3 depicts markings with a shape of a letter "F", which shape enable differentiating between up, down, left and right in an image. In some embodiments the shape of the marking, such as the shape of letter "F", to indicate a slope toward or away from a viewer by detecting a convergence of parallel sides of the shape. In some embodiments the shape of a letter "R" is used to determine the position of an additional plane. In some embodiments, a marker is used which has geometric features that enable determining a direction of the marker, such as differentiating between up, down, left and right in an image.

In some embodiments enough markings, such as the markings 226a 226b, are included on the body so as to enable shifting along one, two or three (X-Y-Z) spatial axes, rotating around one, two or three axes, and scaling of a displayed image to align with the body.

In some embodiments some of the markings may be embedded within the body, as described elsewhere herein, and the relative distance and/or direction of at least some of such markings is optionally known relative to marking on the body. A dataset for displaying the CGH image, acquired by some imaging modality, includes at least some of the internal markings. The CGH image display system optionally aligns the CGH image to the body based on detecting the markings on the body and displaying the CGH image at a correct displacement from the internal markings and the above-mentioned relative distance and/or direction.

Figure 4A:
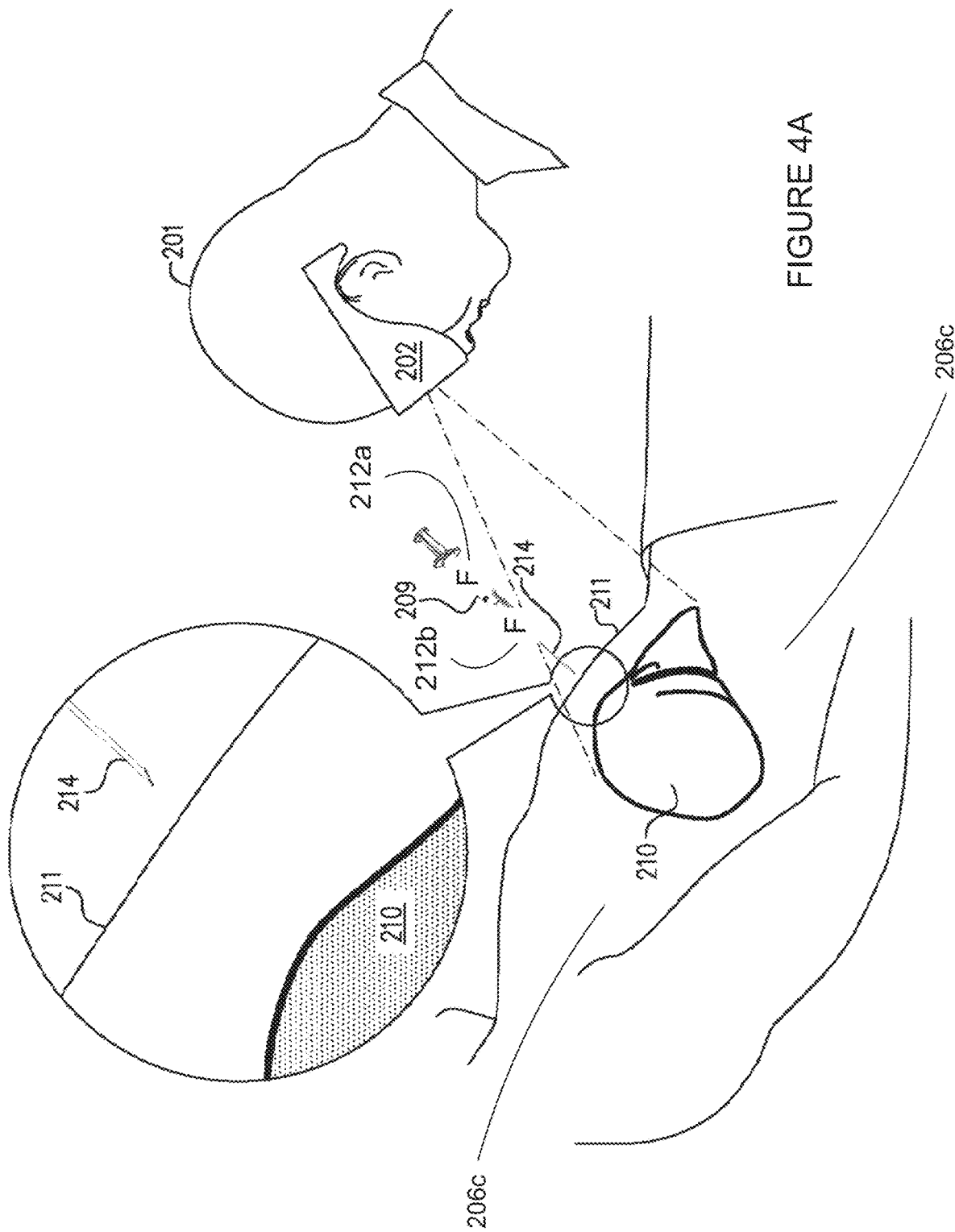
FIGS. 4A and 4B are simplified illustrations of a HMD displaying a holographic image of a first object behind or within a visually obstructing second object, as well as an additional object at least partially behind or within the visually obstructing second object, according to an example embodiment of the invention.
Figure 4B:
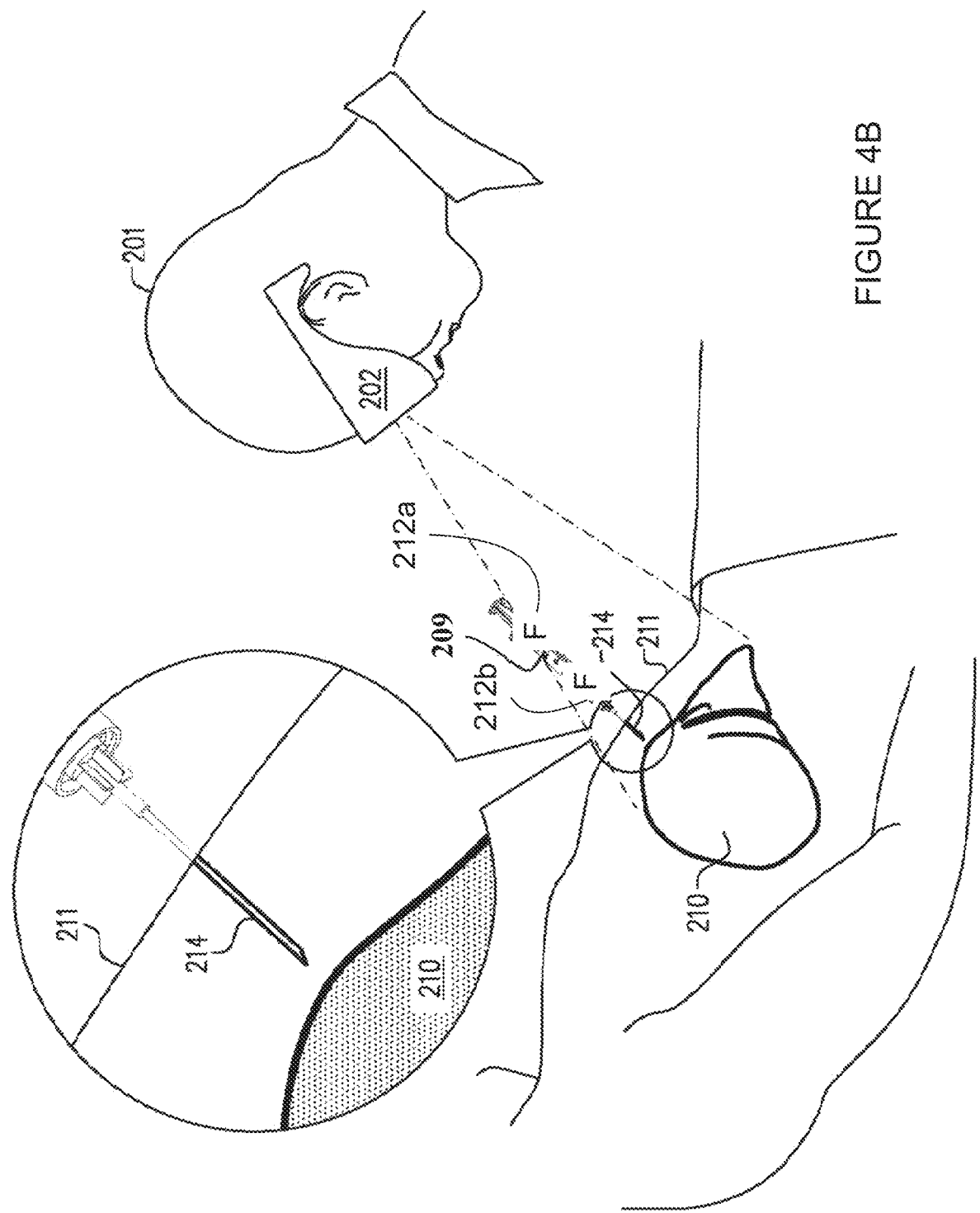

Reference is now made to FIGS. 4A and 4B, which are simplified illustrations of a HMD displaying a holographic image of a first object behind or within a visually obstructing second object, as well as an additional object at least partially behind or within the visually obstructing second object, according to an example embodiment of the invention.

FIG. 4A depicts the holographic image 210 of the first object, for example internal organs, for example a liver, within the visually obstructing second object, for example the skin 211 of an actual body of the patient whose liver is displayed, and the additional object, for example a surgical tool 209, for example a syringe which includes a needle 214.

FIG. 4A depicts a viewer 201 wearing a HMD 202, which displays the holographic image 210 of the liver of a patient.

The viewer 201 also sees the skin 211 of the body of the patient, so the viewer 201 sees both the internal organs (liver) and the skin 211.

FIG. 4B depicts the holographic image 210 of the liver, within the visually obstructing skin 211, and the surgical tool 209, the syringe, and the needle 214. However, FIG. 4B depicts the needle 214 partially behind the skin 211.

The viewer 201 also sees the needle 214, partly outside the skin 211, as a real object, and partly below/behind the skin 211, that is within the body, as a CGH image of the needle 214, or at least of the portion of the needle 214, which is within the body.

In some embodiments the HMD 202 detects a location and/or orientation of the surgical tool 209, and/or of the needle 214, and displays the needle 214 as a CGH image of the needle 214, co-registered with, or aligned with, the actual needle 214. The viewer 201 thus sees the entire length of the needle 214. The HMD 202 displays a portion of the needle 214 which is outside the skin coinciding with a view of the portion of the needle 214 which is outside the skin, and the HMD 202 displays a portion of the needle 214 which is within the body at the location which the within-the-body portion of the needle 214 actually exists. The viewer 201 sees both the skin 211 as a real view, and the entire length of the needle 214, partly as a CGH image and partly as a real view. The HMD 202 calculates and displays an extrapolated or calculated image of the hidden portion of the needle 214.

Since a CGH image provides actual depth cues such as eye focus accommodation and also eye convergence, the CGH image of the needle 214 is seen on both sides of the skin 211 as an augmented reality image.

In some embodiments a portion of the tool or needle 214 which is hidden to a naked eye, and is below the skin 211 is sensed by an imaging system such as an X-ray imaging system or an ultrasound imaging system. The portion of the needle 214 which is hidden is displayed as a CGH image, optionally correctly aligned with a portion of the needle which is visible to a naked eye.

In some embodiments markers on the visible portion of the too or needle 214 are detected by the HMD 202 and the location of the hidden portion of the needle 214 is calculated based on knowing the shape of the tool or needle 214 and on detecting the location of the markers.

In some embodiments the HMD 202 detects a location and/or orientation of the surgical tool 209, and/or of the needle 214, and displays just the portion of the needle 214 which is inside the body as a CGH image of the needle 214. The HMD 202 optionally detects a shape of the needle 214 and produces just the hidden portion of the needle 214.

In some embodiments the HMD 202 detects a location and/or orientation of the surgical tool 209, and/or of the needle 214 using an imaging sensor (not shown) attached to or part of the HMD 202.

In some embodiments the HMD 202 detects the location and/or orientation of the surgical tool 209, and/or of the needle 214 using image processing of an image captured by the imaging sensor attached to or part of the HMD 202. In some embodiments the image processing detects and locates the needle 214 based on detecting a shape of the surgical tool 209, and/or of the needle 214. In some embodiments the image processing detects and locates the needle 214 based on detecting one or more marker(s) attached to or marked on the surgical tool 209, and/or the needle 214.

In some embodiments, the HMD 202 also displays a skin 206c of the patient. In some embodiments, the skin 206c is displayed based on data from a three-dimensional (3D) imaging dataset used for producing the holographic image 210 of the first object, for example the liver of the patient.

In some embodiments an additional optical tracking system and/or electromagnetic tracking system detects the location and/or orientation of the surgical tool 209, and/or of the needle 214. In some embodiments image processing of images from the optical tracking system detects and locates the needle 214 based on detecting a shape of the surgical tool 209, and/or of the needle 214. In some embodiments the image processing and/or the electromagnetic tracking system detects and locates the needle 214 based on detecting one or more marker(s) attached to or marked on the surgical tool 209, and/or the needle 214.

In some embodiments the display system, the HMD 202 for example, obtains a first relative location or coordinates and/or orientation of a marking or markings 206a 206b on the body 211 of the patient, relative to the HMD 202, and also obtains a third relative location or coordinates and/or orientations of one or more marking(s) 212a (212b) relative, for example, to the HMD 202.

In some embodiments, the HMD 202 displays a holographic image of the tool 209 so that the marking(s) 212a (212b) location in the holographic image of the tool 209 coincides, also termed herein co-registers, with the marking(s) 212a (212b) location in the real world. Such co-registration potentially displays the tool 209 in the correct location relative to the body 211.

In some embodiments the HMD 202 optionally has one or more sensor(s) 204 which can detect and locate the marking(s) 212a (212b). The sensor 204 optionally measures distance and/or angle toward the marking(s) 212a (212b) on the tool 209, for example along a line between two markings 212a 212b.

In some embodiments an orientation is optionally determined by detecting an optionally asymmetric shape of the markers.

The sensor 204 may optionally be any one of the sensors described herein.

The marking(s) 212a (212b) may optionally be any of the markings described herein.

In some embodiments, tracking a tool's location and/or orientation in space relative to the HMD 202 is optionally performed by an external system tracking the tool 209 and/or the HMD 202.

Figure 4C:
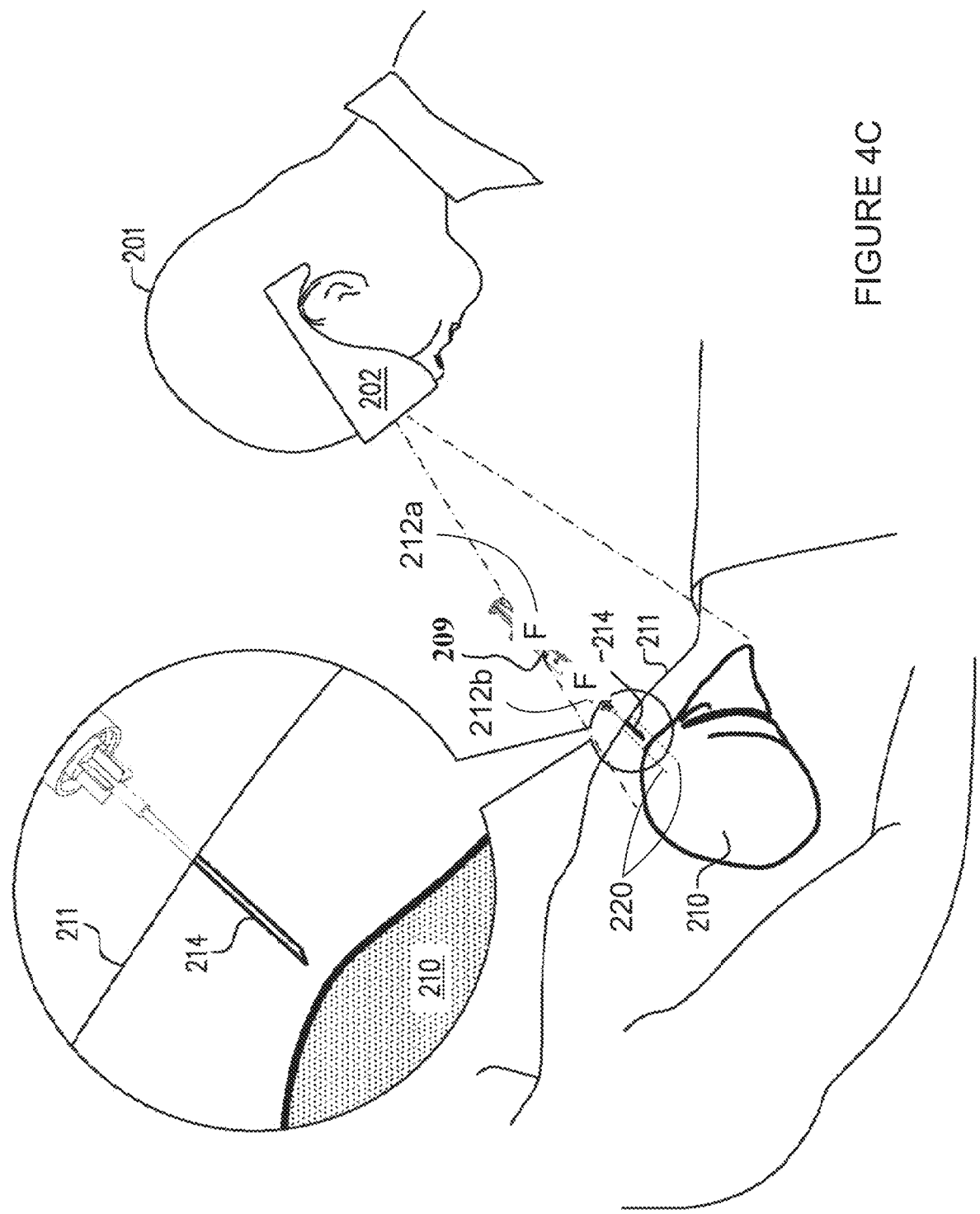
FIG. 4C is a simplified illustration of a HMD displaying a holographic image of a first object, obtained and registered in real time, behind or within a visually obstructing second object, as well as an additional object at least partially behind or within the visually obstructing second object, also obtained and registered in real time, and one or more additional guide lines, according to an example embodiment of the invention.

Reference is now made to FIG. 4C, which is a simplified illustration of a HMD displaying a holographic image of a first object, obtained and registered in real time, behind or within a visually obstructing second object, as well as an additional object at least partially behind or within the visually obstructing second object, also obtained and registered in real time, and one or more additional guide lines, according to an example embodiment of the invention.

FIG. 4C is similar to FIG. 4B, and displays a similar scenario, and also depicts optional guide lines 220, which are optionally produced to illustrate a planned path for the needle 214.

In some embodiments the guide lines 220 are optionally co-registered with the holographic image 210 of the first object, for example the liver.

In some embodiments the guide lines 220 are optionally displayed or un-displayed according to a user input.

In some embodiments the guide lines 220 are optionally automatically displayed in space up until the skin of the body 211, and/or up until the liver (210), and/or from the skin of the body 211 up until the liver (210).

Co-Registration

An aspect of some embodiments of the invention involves co-registering, or aligning, one or more CGH images with a real-world scene.

Co-registering a CGH image with a real world scene includes aligning the CGH image to a real world scene including location and/or orientation and/or sizing and/or scaling to the real world scene.

In terms of depth perception, a CGH image which is co-registered with a real object provides eye convergence and eye focus depth cues for viewing the CGH image which are the same as viewing the real object.

In some embodiments a first CGH image is co-registered to a true location of a body used for obtaining data for producing the first CGH image, and a second CGH image, optionally of an element which is inserted to the body, such as stent, can be viewed as part of a combined CGH image including both the first CGH image and the second CGH image. Such combination may be used, by way of a non-limiting example, to measure compatibility of the element with the body. The second CGH image can optionally be moved, rotated and rescaled with respect to the first CGH image.

In some embodiments, the display system which produces the CGH image locates the CGH image so that points/locations in the CGH image coincide with associated points/locations in the real world scene. For example, the points which the CGH image display causes to coincide may optionally be points which the CGH image display receives as specific marker points in a three-dimensional dataset for producing the CGH image, and which are also detected by the CGH display in the real world. For example, the points which the CGH image display causes to coincide may optionally be points which the CGH image display detects by image processing the three-dimensional dataset to detect the specific marker points in the three-dimensional dataset, and which are also detected by the CGH display in the real world. The process of detection is described in more detail below, in sections named "Markers" and "Detecting marker location(s)".

Causing the marker points to coincide may optionally involve one or more of the following actions: shifting the CGH image to a specific three-dimensional location in real space, rotating the CGH image, and scaling, or resizing the CGH image.

Co-registering two CGH images with a real world scene, for example a CGH image of hidden objects and a CGH image of a partially hidden tool, includes causing the two CGH images to be located/shifted and/or oriented and/or sized/scaled the same as the real world scene.

In some embodiments the three-dimensional dataset for producing the CGH image of internal organs may have been acquired prior to activating the CGH image display system. For example, the CGH system may display a 3D medical CGH image from a medical CT scan performed minutes, hours, days, and weeks prior to the displaying.

In some embodiments the three-dimensional dataset for producing the CGH image may be acquired concurrently, optionally within seconds or less, to activating the CGH image display system. For example, the CGH system may display a 3D medical CGH image from an Ultrasound device being used to scan a patient, and the 3D medical CGH image may be displayed at its correct location within the patient's body.

In some embodiments a marker that is visible to the CGH image display system may optionally be connected to the ultrasound sensor's handle such that the data acquired by the ultrasound sensor has a known distance from the marker. By detecting the marker position and orientation it is possible to display a CGH image produced from the ultrasound imaging tool co-registered with the real location of the displayed data.

In some embodiments the three-dimensional dataset for producing the CGH image of a tool may have been acquired prior to activating the CGH image display system. For example, the CGH system may display a 3D medical CGH image of a tool from a library of tool images, where the library may be produced by some form of 3D image acquisition minutes, hours, days, and weeks prior to the displaying, or even provided by the tool manufacturer.

Registration Chaining

An aspect of some embodiments of the invention involves chaining registration of several bodies, each with registration locations located thereon.

In some embodiments a pair of three-dimensional (3D) image data sets for co-registering is provided, each one of the pair including one or more registration locations detectable by a display system. By way of a non-limiting example, a first 3D data set for producing a CGH image of a first object, including coordinates of one or more registration locations in the 3D data set, and the first object from which the 3D data set was acquired, including coordinates of the one or more registration locations in the first object, for example as detected by a CGH image display system.

In some embodiments an additional source for co-registering is provided, in addition to the above-mentioned two sources, the additional source including one or more registration locations also detectable, either by the display system, or by the imaging modality used to acquire the first 3D data set. By way of a non-limiting example, the additional source may be a second 3D data set for producing a second CGH image of a second object, including coordinates of one or more registration locations in the second 3D data set, and relative positions of coordinates of the one or more registration locations in the first 3D object, or in the first object, relative to the registration locations in the second object.

In some embodiments the co-registration of any number of CGH images and/or objects may be performed, using registration locations in datasets for producing the CGH images and/or in objects, as long as relative positions of the registration locations are known. In some embodiments the registration locations are the same in pairs or more of the data sets and/or the objects, so the relative positions in space, when the CGH images and/or the objects are aligned, are the same.

Registration by User Interface (UI)

An aspect of some embodiments of the invention involves a viewer providing commands to a user interface, for the CGH image of a first object to shift the CGH image of the first object in space in one, two or three-dimensions, and/or to rotate the CGH image in space, and/or to scale (shrink or enlarge) so as to register the CGH image of the object behind or within another, second object.

In some embodiments the viewer may perform the registration by eye, optionally using only vision cues. It is noted that a CGH image provides visual depth cues including both eye focus accommodation and eye convergence, so such registration by eye feels natural, moving a CGH image to its correct location.

In some embodiments the viewer may perform the registration by aligning markers, as described elsewhere herein. Aligning markers by sight may be termed registering by using registration aids.

In some embodiments the viewer performs the registration by moving the CGH image in the depth direction to achieve identical eye focus accommodation and convergence to a registration location in the CGH image as to a corresponding location in the real object.

Automatic Registration

An aspect of some embodiments of the invention involves a CGH display automatically aligning the CGH image of a first object to shift the CGH image of the first object in space in one, two or three-dimensions, and/or to rotate the CGH image in space, and/or to scale (shrink or enlarge) so as to register the CGH image of the object behind or within another, second object.

In some embodiments the automatic alignment may optionally be of features in the CGH image of the first object and features in the second object, the features being detectable by image analysis.

In some embodiments the automatic alignment may optionally be of markers, as described elsewhere herein. Aligning markers may be termed registering by using registration aids.

Markers

Markers, also termed markings, used for aligning images of 3D datasets with 3D objects in the real world, may be of various types.

The term "marker" in all its grammatical forms is used throughout the present specification and claims interchangeably with the terms "reference marker", "marking" and "reference marking" and their corresponding grammatical forms.

In some embodiments, markers are attached to a real world object such as a patient's body. Such markers are optionally visible/detectable by sensors in the 3D CGH image display system and also by a 3D medical imaging acquisition system such as a CT system. Such markers may optionally be metal markers, which are detectable by a CT system, optionally colored a color which shows up against the patient's body, and/or optionally textured with a texture which shows up against the patient's body.

In some embodiments, where a marker should not be made of magnetic material, such as some markers intended for a specific imaging modality such as Magnetic Resonance Imaging (MRI), a material which shows contrast with a patient's body in the specific imaging modality is optionally used.

In some embodiments, a marker is drawn at a specific location on a patient's body or object, optionally using a color which shows contrast with the patient's body or object.

In some embodiments, a marker comprises a light source such as a LED light source.

In some embodiments, a marker comprises a shape that indicates orientation, or direction. Some non-limiting examples include an arrow shape, or a shape that is different from a mirror image of the same shape, such as the letters "F", and "R".

In some embodiments, a marker which serves to co-register two 3D datasets is optionally detectable by both imaging modalities used to produce the 3D datasets.

In some embodiments, a marker which serves to co-register a CGH image of a 3D dataset and a real object is optionally detectable both by the imaging modality used to produce the 3D dataset and by the CGH image display system.

In some embodiments a marker may be attached to an outside of a body/object.

In some embodiments a marker may be inserted into a body/object, and/or implanted in a body/object.

In order to determine a three-dimensional orientation of a three-dimensional body or object in a coordinate system it is enough to know locations of three points in the object. It is noted that knowing locations of more than three points may optionally provide redundant information, which in some embodiments may be used to increase accuracy of registration.

In some embodiments a single marker is used per body/object, and the three points are located on the single marker. For example, a marker with a shape such as the letter "F" or other shape as mentioned above provides optionally three points, such as a base of the leg of the "F" and the two ends of the two arms of the "F".

In some embodiments two markers are used per body/object, and three or more points are located distributed on the two markers.

In some embodiments three markers are used per body/object, and three or more points are located on the three markers. In some embodiments, one point is located per marker. In some embodiments the markers are optionally small, and detecting locations of the markers is used as detecting point locations.

In some embodiments the markers are located at various depths in a body or object. By way of some non-limiting examples the markers may be placed in one plane, that is, for example three or four or more markers may be placed on one geometric plane. By way of some non-limiting examples the markers may be placed in different planes, that is, for example four or more markers may be placed on more than one geometric plane.

Additional example embodiments include markers such as a micro needle, optionally of less than 5, 10, 50, 100, 500, 1,000, 2,000, 5,000-micron diameter; a micro clip, for example of 2 mm diameter.

In some embodiments the markers are active, that is, the markers emit signals for sensing by a detector. Some non-limiting example of active markers include Bio sense by Webster Inc.; a Given Imaging capsule; a light emitting marker, e.g. a LED light.

In some embodiments the markers are passive, that is, the markers do not actively emit signals. Some non-limiting example of passive markers include a magnetic marker; paint; natural body markers; needles attached to or stuck in the patient; ink, and so on.

In some embodiments registration may optionally be performed on a moving body, optionally by detecting a specific time in a repetitive movement, such as a specific point in a breathing cycle.

In some embodiments the markers are natural features that are detectable by the CGH projection unit and are part of the body, such as the contour of an organ, the center of an eye, a bone segment, the umbilicus, the end point of a tool.

The term marker "on a body" or "on a body organ", in all its grammatical forms, is used throughout the present specification and claims interchangeably with the term marker "in a body" or "in a body organ" and their corresponding grammatical forms. A person skilled in the art will discern when a marker is "on" a body or body organ, that is approximately at a surface of the body or body organ, and when a marker is "in" a body or body organ, that is within the body or body organ.

Detecting Marker Location(s)

Various sensors or imaging technologies may be used in a CGH display system to detect markers or to detect body/object locations to use for co-registration.

Some example embodiments of sensors include cameras, optionally used in conjunction with image processing.

Some example embodiments of sensors include ultrasound imaging, which can optionally be used even real-time, during a physician performing a medical procedure, surgery, or diagnostics, to detect a marker and use a location of the marker to register an organ or a tool marked by the marker to a patient's body or limb.

Some example embodiments of sensors include ultrasound imaging, which can optionally be used even real-time, during a physician performing a medical procedure, surgery, or diagnostics, to detect a marker and use a location of the marker to register an organ or a tool marked by the marker to a patient's body or limb.

Some example embodiments of sensors include Transesophageal Echocardiogram (TEE) imaging, which can optionally be used even real-time, during a physician performing a medical procedure, surgery, or diagnostics, to detect a marker and use a location of the marker to register an organ or a tool marked by the marker to a patient's body or limb.

In some embodiments a Transesophageal Echocardiogram (TEE) imaging instrument which is typically inserted into a patient body, is optionally imaged by another imaging modality, such as x-ray or CT, which detects a location in space of the TEE instrument, and a CGH image produced by a TEE imaging system is optionally aligned based on the location in space of the TEE instrument.

An example embodiment is now described which is taken from a different field than medicine—for example using see-through vision in a context of "seeing through" walls of a building, to view images of elements such as pipes or wiring appear in their correct 3D location within or behind walls, or "seeing through" the ground to view images of elements such as pipes appear in their correct 3D location underneath the ground.

In some embodiments, a camera and/or a thermal camera may optionally be, pointed at a wall and be used to identify cold and/or hot spots optionally used as markers. The cold/hot spots are optionally thermal elements inserted in the wall, and optionally brought to a temperature different from the rest of the wall, for example an electrical resistor being heated by current, such that its location is identified.

Markers are not necessarily stationary. By way of a non-limiting example, in some embodiments a marker is optionally inserted into a flowing medium and can be used to track flow speed, openings in the flow channel and or blockages. The marker is optionally a solid object of sizable volume, a powder, a fluid. In some embodiments a moving marker is optionally used in conjunction with one or more stationary markers. In some embodiments, the CGH image is aligned with a real body/object, and the non-stationary marker(s) are optionally detected by a 3D image acquisition system and the location of the non-stationary marker(s) is optionally calculated and optionally displayed.

An aspect of some embodiments of the invention relates to holographic imaging, for example by a holographic head-mounted display, which enables presentation of an image produced from a 3D data set, in absolute coordinates. Such presentation optionally includes displaying the 3D data with natural depth cues used by viewers, including different focii for different points in the image at different distances from a viewer, within a unified coordinate system. Viewers of such images perform eye convergence and eye focus to view different points in a CGH image which appear at different distances from the viewers.

In some embodiments, such an image may be calculated and projected in real time, optionally even at video rate, at a distance that is a hand's reach from the viewer. The image potentially appears floating in space, allowing a viewer to optionally insert his/her hand or a tool into the image space, and interact with the image just as he/she would interact with a real 3D object. The viewer can mark a location on or in the image, move the image by grabbing it and rotating it as he/she wishes. More complex manipulations can also be performed. The viewer can change his/her position while the image stays fixed in space as a real object would.

In some embodiments, for multi-user interaction, when a person touches part of the image all the other viewers see that part with the finger touching just as a real object would appear.

In some embodiments, for a holographic Head-Mounted Display (HMD) or a holographic head set display, the Computer Generated Hologram (CGH) image is an imaginary holographic image, that is, the light seen by the eye, does not originate from the CGH image directly to the eye, but is redirected by an optical element. Such an attribute can optionally be applied for making the CGH image appear at locations where real world objects would not otherwise be visible.

In some embodiments, 3D see-through vision provides the ability to fuse or integrate or overlay a holographic image of an object and a real world solid object. The holographic image may optionally display 3D images at locations where objects are not expected to be visible to the naked eye, and projected as being transparent and/or having variable degrees of transparency, opacity or translucence.

Consider a scenario in which a holographic image is derived from 3D data of the internal aspects of the solid object. By optionally integrating and or overlaying the holographic image with or on the solid object, a viewer has the ability to apparently see through the solid object as if it were transparent or translucent. Internal aspects of the object, and/or surfaces beyond or underneath a surface of the affected object or material can be seen.

Consider an object, in plain sight, which the viewer can see in 3D, with normal depth perception. In some embodiments, a 3D hologram of the same object, including detailed information of the object, including information that is not visible in plain sight, for example, information that is internal to the object, or not in the field of view of the viewer, may optionally be displayed.

In some embodiments, the holographic image is optionally overlaid on the real object, such that the viewer can see the object, as he would normally view it, while also viewing internal aspects of the object and as well as facets of the object that are not obtainable by natural sight, e.g. the sides and or back side of the object.

In some embodiments both the holographic image and the real object are visible to the viewer. In some embodiments the viewer focuses his eyes on the holographic image or the real object. Such focusing is naturally performed in human vision, and the holographic image provides full depth cues to human vision, so the viewer may optionally select what to view in focus, the holographic image or the real object.

In some embodiments, 3D see-through vision provides potential applications where 3D image acquisition is used. For example, in a medical application, for example in non-destructive testing applications, such as non-destructive testing of structures and of welds, and for example in seismic studies.

In some embodiments such as nondestructive testing (NDT), images collected optionally include 3D data. By way of a non-limiting example, in weld inspection, identifying cracks or flaws typically requires skill and experience in interpreting a 2D display of the 3D data, which typically provides a small slice of a flaw. Inspection of a 3D hologram potentially enables making the interpretation task intuitive, and furthermore optionally displays the flaw/crack in its correct location with respect to the component under test. Cracks are typically of small dimensions, by way of some non-limiting examples having one of the dimensions of the crack less than 1, 5, 10, 20 mm. Inspection is typically conducted at close range, for example within hand-reach, or less than 25, 50, 100, 150 centimeters away from a viewer. NDT inspection typically potentially benefits from accurate depth cues, specifically eye convergence and focus accommodation.

Coordinate Systems

The terms global positioning system or global coordinate system or absolute coordinates are used herein interchangeably to mean a unified coordinate system used to display several objects, where some of the objects in the display may have been captured using different imaging systems, which used different coordinate systems, and are now unified to use a common system.

Independent acquiring data systems, such as MRI, CT, Ultrasound, X-ray, electroanatomical mapping systems, provide data in a coordinate system which is referenced with respect to the acquiring system. Thus local coordinates of acquired data are known.

In some embodiments, in order for a display such as a Head Mounted Display (HMD) to display the acquired data in a real world global position, optionally where a real object appears, the local coordinate system of the acquired data is optionally translated and/or rotated and/or rescaled, to co-register with a coordinate system of the HMD.

By way of a non-limiting example, when a viewer is viewing a holographic image of lumbar vertebra L3 and L4, as the viewer's head moves up the image of the spine, the viewer is displayed lumbar vertebra L2 and L1, that is, the viewer scans upwards. In contrast, a typical monitor does not track a viewer's head motion, and does not track or shift contents of the display when the display is moved.

2D Presentation of 3D Data

Information derived from 3D image acquisition is typically presented in 2D displays. Understanding 3D data displayed on a 2D screen typically involves manipulation of the displayed data in order to obtain desired views. The understanding typically involves interpretation by the user who mentally connects multiple cross sections to form a mental 3D image. Such interpretation involves significant skill and experience, and is prone to erroneous observations and conclusions in that the 2D information lacks information, even if multiple 2D images are reviewed.

For example, in medical applications, a clinician interprets 2D images that are sometimes displayed on multiple screens or monitors, and mentally visualizes the relationships of the anatomy and how the 2D images relate to the real anatomy of the patient. The ability to understand the relationship between the image and that of the patient's real anatomy is particularly important, for example as it relates to planning of minimally invasive interventional surgical procedures. Such types of procedures cause the clinician to mentally fuse the 3D image, which s/he mentally formed by viewing 2D cross sections displayed on a 2D screen, with the patient's actual anatomy as s/he actually performs the procedure. Furthermore, in situations that involve multiple clinicians which communicate and work together, it is beneficial that the participants have the same mental 3D image.

In medical applications, the growth of image-guided Interventional Radiology (IR) and interventional cardiology procedures in surgical settings has led to an increased reliance on the use of 3D imaging (CT, cone beam CT, MRI, 3DUS, PET, SPECT). An interventionalist desires a highly accurate image and a full understanding of the spatial anatomy to pinpoint the area of interest for diagnostic procedures such as image guided biopsy. In addition, with the advancement of image guided treatment, an interventionalist should have a comprehensive understanding of the anatomical relationship of neighboring vessels and structures in order to spare healthy tissue and minimize or prevent damage to the adjacent tissue during the procedure. Furthermore, it is potentially beneficial that such data be available and interpreted in a short time span so that intervention durations can be reduced to a minimum. Furthermore, it is potentially beneficial to acquire the 3D data with minimal acquisition cycles. Minimal acquisition cycles can reduce the overall intervention procedure time, reduce handling of the patient and reduce radiation exposure.

The 3D see-through vision system potentially provides a clinician with an intuitive understanding of spatial anatomy based on a displayed hologram. The 3D see-through vision system allows the clinician to visualize a holographic image fully registered to an actual location in or on a patient's body and displayed as-if through the patient's skin. The system can optionally also provide holographic tracking of intervention tools such as a biopsy needle/energy delivery needle/catheter/camera as they are navigated to tissue of interest.

Embodiments of a 3D see-through vision system can be employed in a variety of clinical areas, for a large range of clinical applications, including but not limited to: Volumetric Tissue Biopsy; Biliary Drainage and Stenting; Chemoembolization; Embolization; Irreversible Electroporation, Infection and Abscess Drainage; Needle Biopsy; Radiofrequency (or other energy source) Ablation; Urinary Tract Obstruction; Uterine Artery Embolization; Uterine Fibroid Embolization; Vertebroplasty, Dental Implants, Interventional Neurology.

It is noted that using a 3D see-through vision system has a potential to reduce errors in medical procedures and/or diagnoses and/or reduce duration of medical procedures. The 3D see-through vision system optionally displays organs in their correct location within a patient's body, potentially preventing mistakes such as accidental right/left substitution by a physician which views an image of the organs on a monitor not aligned or registered with the patient's body.

Volumetric Biopsy

In some example embodiments 3D see-through vision potentially enhances 3D anatomical understanding for tumor identification and needle placement when performing a volumetric biopsy procedure. The 3D see-through vision potentially enables intuitive understanding of the 3D information, such as that the 3D see-through vision potentially reduces the time required for identification of tumors and potentially increases accuracy of needle placement in tissue to be biopsied. Such an improvement is potentially further augmented when performing minimally invasive treatment, by way of a non-limiting example in cases in which the treatment target is very close to a major blood vessel with complex anatomy.

Tissue Ablating Energy

Some minimally invasive methods of treatment involve the delivery of tissue ablating energy by means of a needle or series of coupled needles. Exact positioning of the needle(s) within the target tissues is presently performed under fluoroscopic guidance on a pre-procedure CT.

An example embodiment of a 3D see-through vision potentially enables pre or intra-procedure CT data to be integrated to the patient's actual anatomy of the target organ and/or of a needle, potentially enabling direct needle advancement to an exact position.

High Intensity Focused Ultrasound Treatment

Mention is made of non-invasive methods based on MR guided high intensity focused ultrasound (HIFU) treatment. An objective of MR-guidance is to control heat deposition with HIFU within the targeted pathological area, despite the physiological motion of these organs.

In such methods several technological challenges exist. Anatomical location of both organs within the thoracic cage make intercostal ablation strategies desirable, to preserve therapeutic efficiency, but prevent undesired tissue damage to the ribs and the intercostal muscle. Therapy guidance and energy deposition should preferably be rendered compatible with continuous physiological motion of the abdomen.

In some embodiments, using the 3D see-through vision, real-time Magnetic Resonance Imaging (MRI) is optionally displayed and or optionally registered to the patient's real anatomy. The clinician is then potentially able to visualize the trajectory of the HIFU as it is delivered through the ribs and intercostal muscle, in real-time, and potentially able to guide the HIFU energy to its target even during continuous physiological motion of the abdomen.

A Simultaneous View of External and Internal Aspects

In some embodiments, using 3D see-through vision, a viewer is able to view external aspects of an object, as he would normally observe an object, while also viewing internal aspects of the object, simultaneously, and at a same location.

3D see-through vision potentially enables fusing one or multiple 3D images, with real world views of the same object. For example, 3D images of the internal aspects of the object as well as 3D representations of various properties of the internal object such as temperature, density, electrical properties.

In some embodiments, using the 3D see-through vision and/or real-time tracking capabilities in a procedure in which an energy delivering catheter is inserted into a target organ through the skin, the clinician is able to see a portion of the catheter that is external to the tissue, to see the point of entry, as he normally does. He is also able to see the portion of the catheter that is within the tissue, as it is being inserted into the tissue. Both external and internal views are optionally visible from the same viewing aspect, so that the clinician does not have to shift his eye or move his head towards a separate imaging display.

Using an unaided eye, when viewing a needle or other tools that are inserted through the skin, a portion of the needle or other tool disappears from view once the portion passes through the skin. In some embodiments, using the 3D see-through vision, the clinician is able to see the portion of the needle or other tool that is external to the skin while also seeing the portion of the needle or other tool that has been inserted through the skin.

In some embodiments, when treating an organ, such as in open surgery, the 3D see-through vision potentially enables viewing beyond an outer layer of the organ, similarly to viewing beyond the skin as described above.

Another minimally invasive method for treating tumors is by low dose radiation therapy delivered by brachytherapy. Computed tomography (CT)-guided brachytherapy is presently used to treat primary and metastatic cancer (e.g. liver, breast, prostate cancer). Brachytherapy involves precise placement of short-range radiation-sources (radioisotopes) directly at a site of a tumor by means of a needle(s). As with the procedures described above, in some embodiments, by employing the 3D see-through vision technology during such the procedure, the clinician is potentially able to visualize the needle as it is being inserted into the tissue, as opposed to the situation today where the needle "disappears" from unaided view once it passes through the skin.

In the above examples, procedures conducted while using embodiments of 3D see-through vision are potentially performed in less time and with better accuracy, potentially resulting in less radiation and/or better tumor coverage, where applicable, than similar procedures conducted without the 3D see-through vision.

In some embodiments, potential added value of the use of the 3D see-through vision is applicable to the above described scenarios and to many other minimally invasive needle/catheter guided procedures such as, but not limited to, Volumetric Tissue Biopsy; Biliary Drainage and Stenting; Chemoembolization; Embolization; Irreversible Electroporation, Infection and Abscess Drainage; Needle Biopsy; Radiofrequency (or other energy source) Ablation; Urinary Tract Obstruction; Uterine Artery Embolization; Uterine Fibroid Embolization; Vertebroplasty, Dental Implants, Interventional Neurology.

Changing a Viewing Mode of a Holographic Image

In some embodiments, using 3D see-through vision, a holographic image of a patient's anatomy is superimposed onto the patient's actual anatomy, to guide a clinician intra-procedurally. The clinician can optionally change, optionally ad hoc, a viewing mode of the holographic image, such that the image is temporally disconnected from the real world object. For example, the holographic image may optionally be disconnected from the patient's actual anatomy to a position that is viewed as floating above the patient. In the floating above the patient position, the clinician can optionally interactively manipulate the holographic image to enhance spatial understanding of the patient's anatomy image and inter-relationship of anatomical elements. In such a mode, the surgeon can rotate and or slice the holographic image. Furthermore, switching between modes can potentially provide the surgeon with real time views of the location of a surgical tool from different viewing angles with respect to the internal aspects of the organ being treated.

Controlling the holographic image viewing mode, be it connected or disconnected from the real world object, can optionally be performed by the viewer, optionally single handed. Controlling the holographic image viewing mode can optionally be achieved by a software menu visible in a viewing volume adjacent to the patient, optionally using visual cues, such as hand gestures, with voice commands, optionally using eye tracking technology, and similar means known in the art.

Multiple Holographic Images

In some embodiments, a 3D see-through vision system optionally provides two holographic images derived from a same 3D image data set. One holographic image is registered to and appears at a location within the real world object, and a second holographic image is floating in space, e.g. floating in the air above a patient. Both images are optionally updated in real time, optionally simultaneously.

In some embodiments the two holographic images are provided side by side, or in close proximity to each other. A surgeon can optionally choose to view either one of the images or both.

In some embodiments the images are completely or partially independent, such that the surgeon can choose to manipulate, rotate, cut and/or slice one of the holographic images without affecting the other image(s).

In some embodiments the 3D see-through vision system optionally provides multiple holographic images derived from the same 3D image data set. All of the images are optionally updated in real time, optionally simultaneously. At least one, or more, holographic image is not displayed as within the real world object. Other holographic images are optionally displayed in different settings or locations.

In some example embodiments all of the holographic images share data such that if one viewer touches a holographic image in a particular spot, the location touched is optionally seen, optionally highlighted or otherwise marked, in some other, or even all of the other holographic images. Similarly, if one viewer manipulates, e.g. rotates or slices a holographic image, the manipulation is optionally performed on some other or even all of the holographic images.

In some embodiments, the holographic images do not share data, such that if one viewer touches one holographic image in a particular location, the location touched is optionally not seen as touched in the other holographic images. Similarly, if one of the viewers manipulate, e.g. rotates or slices a holographic image, the manipulation will not be performed on some or all of the holographic images.

In some embodiments, viewers or a system administrator can define a protocol governing sharing of data between multiple holographic images. In an example, the protocol may be fixed, dynamic and/or configurable and modified over time.

In some embodiments, an ability to share or not to share information is optionally used in a multi viewer setting, such as in a complex medical procedure with multiple clinicians. The ability to share or not share information is potentially valuable in training and educational settings, for documentation purposes, etc.

In some embodiments, a second holographic image is presented with a time delay with respect to a first holographic image. The time delay may optionally be fractions of a second, seconds, minutes or longer. A sharing of information between the holographic images, in one non-limiting example, is optionally from the first holographic image to the second holographic image. In a second non-limiting example there is no shared information, that is, the second holographic image optionally does not display manipulations conducted on the first holographic image.

Multiple Holographic Images from Multiple Acquisition Systems

In some embodiments 3D image fusion of multi-modal acquisitions may optionally be used to further assist in pre-planning and intra-procedural guidance of interventional procedures. The use of fused images may optionally be displayed as holographic images as a 3D see-through vision holographic image or as a free floating image above the patient.

In some example embodiments a 3D see-through vision system optionally provides an ability to integrate multiple images obtained from various image acquisition technologies. For example, consider an object viewed in plain sight, on which an accurate hologram image, optionally obtained statically, e.g. with a CT, is overlaid. Further, consider overlaying an additional image obtained by a real time imaging technology such as ultrasound. The real time imaging, e.g. ultrasound, may even have less resolution and accuracy then the imaging obtained from the static imaging, e.g. CT.

A potential benefit of the overlaying of multiple images is to optionally provide an improved resolution for non-moving elements of the imaged object, and another potential benefit is to optionally improve registration. The real time image can optionally provide dynamic information of changes over time, due for example to inspiration and expiration. The real time images can also optionally provide information about dynamic systems such as a flow regime under various conditions.

Consider a heart valve being viewed. The static analysis can optionally provide an accurate positioning of various registration points, while the real time image acquisition can optionally provide information of heart valve dynamics and blood flow in its vicinity.

In some embodiments, two (or more) 3D data acquisition systems are optionally deployed in parallel. A first 3D data acquisition system is, by way of a non-limiting example, an invasive system, such as an ultrasonic catheter, focused on an organ being viewed, e.g. the inside aspects of an artery. A second 3D data acquisition system is, by way of another non-limiting example, an external 3D data acquisition system, such as a CT, focused on a location and orientation of the first 3D data acquisition system with respect to the viewed artery. In such a manner, a clinician can optionally verify that the first 3D data acquisition system is in a correct place and a correct orientation, and/or optionally that the data acquired from the first 3D data acquisition system is the data sought.

In some embodiments a holographic image produced based on a pre-acquired CT, of the brain for example, is optionally aligned with an intra-operative microscope image, optionally providing an intra-operative magnified view of at least part of a total holographic image.

In some embodiments the alignment of the magnified image to a real body and/or object is optionally based on placing a single point of the magnified image at a same location as a single point of the real body/object.

In some embodiments the alignment of the magnified image to a real body and/or object is optionally based on placing a line, optionally corresponding to a direction from a viewer to a point of interest such as a center of a field of view, at a same location as a corresponding line of the real body/object.

In some embodiments the magnified image is not aligned to the real body and/or object, but optionally displayed in a same area as the real body/object, potentially enabling a viewer, such as a physician, not to divert his view from the direction of the real body/object.

Depth Perception

Holographic imaging provides holographic images which cause a viewer to perform both eye focus accommodation and eye convergence dependent on distance of a viewed object or location in or on an object.

Stereopsis tricks a viewer's mind in order to create a perception of depth, as in is done in stereoscopic movies or stereoscopic photos. Holographic images retain all of the real world depth cues, and specifically eye focus accommodation and convergence.

Eye focus accommodation and convergence are considered significant cues in vision, in that they provide distance information. Eye focus accommodation is effective at close ranges, typically from 5 cm to 2 or 3 meters, and convergence is effective at ranges of up to 10 meters. Both of these ranges are potentially relevant to a typical indoor environment, and to images such as human anatomy from medical imaging.

Registration

In some example embodiments a physician may optionally be looking at a patient in an operating theatre or procedure room, and performing a minimally-invasive procedure, optionally a procedure in which the organ that is treated is not seen directly by the physician and the guiding is performed by imaging of 3D acquired data.

In some embodiments, the physician is displayed the surgical tools and the organ that are inside the patient, as if the procedure was open surgery. In-order to do so, a CGH image is optionally co-registered with a location of the patient's anatomy in the real world, in a global coordinate system.

In some embodiments a co-registration of the CGH image with a location of a patient's anatomy is optionally achieved using markers that are detectable by a 3D data acquisition system and optionally by the hologram projection unit.

In some embodiments a co-registration of the CGH image with a location of a patient's anatomy is optionally achieved using markers whose positions/coordinates are fed into a 3D data acquisition system and/or into the hologram projection unit.

In the scenario described above, there are coordinate systems which are optionally co-registered, including, by way of some non-limiting examples:
1. G [Global]/L [Local] PS—there are tools and systems in the operating room whose position in space is defined by their coordinates in a global and/or a local positioning system.
2. Components of a holographic image projection unit.
   a. Camera or sensors that detect marker position.
   b. A Head Mounted Display.
3. A surgical tool—whose local coordinate system may optionally be defined with markers
4. 3D data acquisition system(s), whose data is optionally integrated into a holographic image.

Registration Markers

In some embodiments co-registration of a CGH image with a location of a patient's anatomy is optionally achieved with markers that are detectable by a 3D image data acquisition system and/or by the hologram projection unit.

In some embodiments co-registration of a CGH image with a location of a patient's anatomy is optionally achieved with markers whose position is optionally fed into the 3D see-through vision system.

In some embodiments the relative position and orientation of one marker with respect to the other is input into the CGH image display system. In some embodiments a relative position/orientation of the markers is detected by an another, additional, data acquisition (image modality) system.

In some embodiments markers are placed on or within a body of a patient. In some embodiments, markers are attached to organs or parts of the skeletal system. In some embodiments, markers are placed on a surgical tool or equipment, such as on needles, laparoscopic tools, catheters, tubes and wires.

In some embodiments a hologram projection unit includes a sensor (or sensors) that can sense a position in space and/or an orientation of a marker or multiple markers. In some cases, the sensor can track a moving marker in real time, e.g. at a video rate of 60 Frames Per Second (FPS) or higher than 24, 30, 48, 50, 72, 100 FPS. For example, a camera, a video camera, a High-definition video, an IR camera, a G/LPS receiver.

In some embodiments the marker is optionally detectable by the 3D data acquisition system as well as by the hologram projection unit. For example, to be detectable in an X-ray, CT, US or MRI system.

In some embodiments the marker is optionally, by way of a non-limiting example: a surgical site marker applied with a pen on skin, fasteners and bone screws, cranial screws, head bolts, MRI marker, clips used in the liver and soft tissue markers.

In some embodiments a marker can optionally be a point/dot marker or a marker that includes a pattern, or shape, e.g. semi-spherical, or cone-like, positioned on or connected to the skin.

In some embodiments a marker can optionally be a shape which indicates location as well as direction, such a shape of a letter "L", "R", "F", and so on.

In some embodiments a marker may optionally have metal or liquid components. In some embodiments, the marker may optionally have active characteristics such as emission of RF, heat, magnetic, light or other radiation. In some embodiments, the marker may optionally have a specific ID as in RFID or a visual ID placed on markers.

In some embodiments the marker may optionally encompasses an area, for example, surrounding a portion or all of an exterior surface of a catheter, along the catheter's length, or a line marker on a rigid tool such as a needle or a bone.

In some embodiments markers, such as powder or liquid, are optionally introduced into fluid systems, such as veins and or arteries.

In some embodiments, the marker may optionally be an object such as a viewer's hand, or anatomical features or portions of a patient's organ being viewed.

In some embodiments a marker's coordinates, in a local or a global coordinate system, may optionally be fed in to the system and then presented in the hologram.

Registration in Real Time

Consider medical procedures that include surgical tools such as needles, fibers, endoscopes, catheters, energy delivering systems, and implants that are inserted into the body.

In some embodiments the tools include markers or features detectable by a real time acquisition system, or the position of the tools or markers can be introduced in to the real time acquisition system, that is the system that provides the 3D image data to the CGH image display system, and that the coordinates of the tool's shape with respect to the markers is known. When the tool is in image space, the space where the CGH image appears, the tool image is optionally projected at the same location as the real tool which is inside the body. That is, the tool image appears in the body as if the physician sees the tool in an open surgery.

In some embodiments, for example when a tool is rigid, such as a needle, one marker is sufficient. In some embodiments two markers are sufficient.

In some embodiments, for example when a tool is flexible and/or may change shape and or orientation during a medical procedure, multiple markers may optionally be deployed. In some embodiments involving flexible tools a location of each part of the tool's system is known, optionally in a local coordinate system. In such a case it is sufficient for one or two markers to co-register a specific part of the tool's system in the coordinate system of the CGH image, thereby co-registering at least some of the tool's other parts in the CGH image coordinate system.

In some embodiments, the markers are optionally placed before or after joints of the tool mechanism. In some embodiments, the markers are optionally distributed at fixed or non-fixed distances along the tool. In some embodiments, the whole tool or portions of the tool are optionally marked and detectable by a real time acquisition system.

In some embodiments, different types of marking are optionally used on the same tool. Different types of marking used on the same tool potentially enable detection of tool orientation.

The marker can optionally be flexible, such as, for example, a catheter in a blood vessel which has sensors, and their positions can optionally be monitored in real time and directly fed in to the acquisition system.

In some embodiments a real time data acquisition with a real time data acquisition tool such as an ultrasound system is used, wherein the relative location of the acquired data with respect to the coordinate system of the real time acquisition tool, the ultrasound handle for example, is known. A relationship between the coordinate system of the real time acquisition tool and the coordinate system of the CGH projection system is optionally defined using markers on the handle, and by measuring the location and/or orientation of the real time acquisition tool relative to the coordinate system of the CGH projection system.

An example embodiment using real time acquisition and registration of images is described below with reference to FIG. 4D.

Figure 4D:
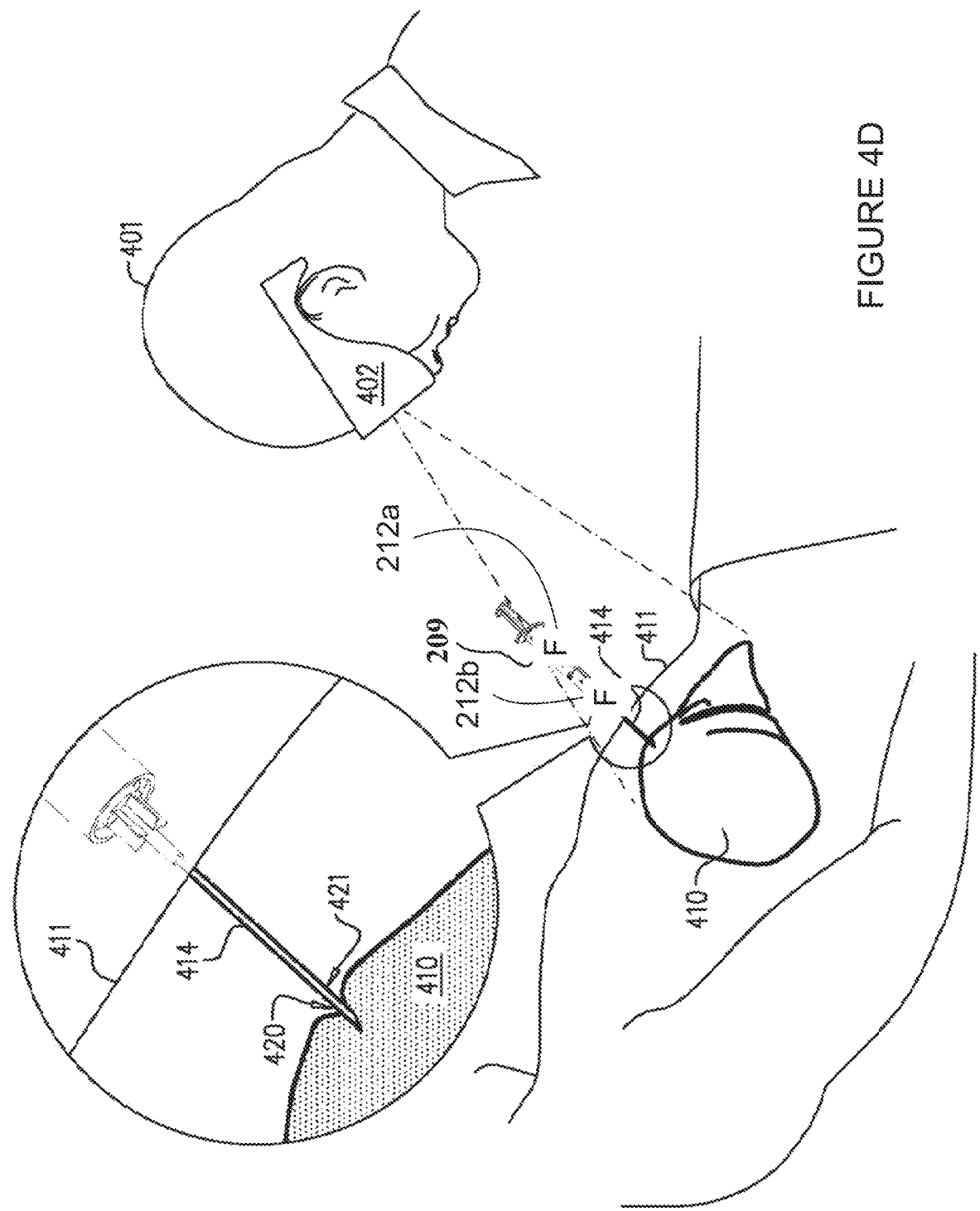
FIG. 4D is a simplified illustration of a HMD displaying a holographic image of a first object, obtained and registered in real time, behind or within a visually obstructing second object, as well as an additional object at least partially behind or within the visually obstructing second object, also obtained and registered in real time, according to an example embodiment of the invention.

Reference is now made to FIG. 4D, which is a simplified illustration of a HMD displaying a holographic image of a first object, obtained and registered in real time, behind or within a visually obstructing second object, as well as an additional object at least partially behind or within the visually obstructing second object, also obtained and registered in real time, according to an example embodiment of the invention.

FIG. 4D depicts a holographic image 410 of the first object, for example internal organs, for example a liver, within a visually obstructing second object, for example skin 411 of an actual body of the patient whose liver is displayed, and an additional object, for example a surgical tool 409, for example a syringe which includes a needle 414.

FIG. 4D depicts a viewer 401 wearing a HMD 402, which displays the holographic image 410 of the liver of a patient. The viewer 401 also sees the skin 411 of the body of the patient, so sees both the internal organs (liver) and the skin 411.

FIG. 4D depicts the holographic image 410 of the liver, behind the visually obstructing skin 411, and the surgical tool 409, the syringe, and the needle 414. FIG. 4D depicts the needle 414 partially behind the skin 411.

In some embodiments the holographic image 410 is optionally displayed based on a 3D data set obtained in real time, for example by a real time acquisition system such as an ultrasound system or an X-ray system.

The viewer 401 sees the needle 414, partly outside the skin 411 and partly below/behind the skin 411, that is within the body, as a CGH image of the needle 414.

FIG. 4D depicts a tip 421 of the needle 414 producing a dimple 420, or indentation, in the holographic image 410 of the liver. The dimple 420 is best depicted in an enlarged view in the upper left portion of FIG. 4D.

FIG. 4D depicts an embodiment which potentially provides real time visual feedback to a surgeon inserting a tool such as a needle, potentially augmenting sensory feedback of the needle's resistance against the liver. In some embodiments the real time visual feedback is provided even when sensory feedback is not felt, possibly owing to weak resistance of the liver to penetration by the needle 414.

Aligning of the holographic image 410 and the holographic image of the needle 414 to the body of the patient is optionally performed by image processing 3D data sets for producing the holographic image 410 and the holographic image of the needle 414 and an image acquired of the body of the patient by the HMD 402. In some embodiments the image processing detects natural features of the liver/tool/body which may be aligned. In some embodiments the image processing detects artificial markers, such as described elsewhere herein.

In some embodiments the markers, for example optical or electrical or acoustic markers, are optionally connected to the real time data acquisition tool such that they are detectable by the CGH imaging system.

In some embodiments some of the markers may be embedded within the body, as described elsewhere herein, and the relative distance and/or direction of at least some of such markers is optionally known relative to markers on the body, viewable and/or detectable by the CGH image display system. A dataset for displaying the CGH image, acquired by some imaging modality, includes at least some of the internal markers. The CGH image display system optionally aligns the CGH image to the body based on detecting the markers on the body and displaying the CGH image at a correct displacement from the internal markers and the above-mentioned relative distance and/or direction.

The markers enable monitoring the acquisition tool's coordinates in the image space, thus the imaging of the acquired data is mapped to the coordinate system of the CGH imaging system. Such markers include, by way of some on-limiting examples:

a. Optical markers or fiducial markers, such as dye or stickers with specific patterns, or patterns embedded on or into the tool or LEDs, connected to the handle of the data acquisition tool, optionally positioned so that there is a line of sight to a detection camera.

b. Electronic markers such as a local positioning system, and transducers located at known positions by the imaging system. Thus the true position of the acquired data at the image space may be known.

In some embodiments, the use of robotic guidance systems, such as a Mazor Robotics product for spine surgery is contemplated. For co-registration accuracy, the robot may optionally be connected to a patient's bones with screws. The screws, with or without modifications and/or additions, can serve as markers, for example by detection with a camera and analysis with image processing tools. By knowing a relative location of the robot's arm to the screws or other known locations of the markers, and by monitoring the markers' location in real time by the imaging system, the location of the robot's arm and tools are potentially known. Thus it is possible to project an image of the robot's activity inside the body to appear in the actual robot location, within the body.

In some embodiments, a 3D imaging dataset used for producing the holographic image of organs of the patient, may have been obtained when the patient was lying down, and the displaying of the internal organs may be performed when the patient is in a different pose, for example, the patient may be lying on a side or on his stomach.

In some embodiments, a computer used for preparing a display of the patient's organs optionally deforms a 3D scene for displaying the organs so that the organs appear in a more correct location. The deformation is optionally performed so that markers' locations in the 3D dataset conform to detectable marker locations in or on the patient's body when the patient is in the different pose. By way of a non-limiting example, a computer deforms the 3D dataset so that the markers of the 3D dataset are each exactly at a location of a corresponding detected marker in the patient. By way of another non-limiting example, the computer deforms the 3D dataset to minimize a mean-square-error of locations of the markers in the 3D dataset and locations of the markers detected in or on the patient in the different pose. By way of yet another non-limiting example, the computer deforms the 3D dataset according to a mathematical deformation model of a deformation suitable for a patient change of pose between various poses such as: lying on his back, lying on his front, lying on one side or the other, sitting, standing, and so forth.

In some embodiments a holographic image is registered to a real world body, with registration marks in a dataset for producing the holographic image registered to registration marks in or on the real world body, and displaying the holographic image is reactive to changes in the real world body. When the real world body moves, a display of the holographic image moves accordingly, to remain aligned.

In some embodiments, when the real world body changes shape or scale, the holographic image is recomputed so as to change shape or scale accordingly. For example, if the real world object shrinks, the display of the holographic image is recomputed to shrink as well, such that registration marks stay aligned. For example, when the real world object twists, the display of the holographic image is computed to twist such that the registration marks stay aligned.

In some embodiments, when a real world body has been dissected, the display of the holographic image is recomputed to appear dissected, such that the registration marks stay aligned. Dissection is optionally detected when one or more registration marks are detected to move approximately together, in a different direction and/or a different distance than one or more different registration marks.

By way of a non-limiting example, a real world body and a corresponding dataset for displaying a holographic image of the real world body optionally have 6 registration marks. In some embodiments when it is detected that 3 registration marks on the real world object shift in one direction, maintaining relative distance and/or angles between them, and 3 other registration marks on the real world object shift in a second direction or rotate some angle, maintaining relative distance and/or angles between them, the holographic image of the real world object is optionally computed to display as two portions of the real world object, a holographic image displaying each portion still aligned with 3 registration marks associated with the image portions.

In some embodiments, less than 3 registration marks, or more than three registration marks, an equal number of registration marks or an unequal number of registration marks are involved with displaying image portions of a real world object as if dissected, as described above, or as if truncated, as will be described below.

In some embodiments, when a real world object is truncated, a display of the holographic image is truncated, such that the relevant registration marks stay aligned.

In some embodiments an endoscope system is used. Markers are optionally attached to the end and/or to sections of the endoscope. By knowing the relative location of the endoscope with respect to that of the markers, and by monitoring the markers location in real time by the imaging system, the location of the endoscope is potentially known. Thus it is possible to project an image of the endoscope inside the body to appear at its real coordinates, just as if the physician sees the endoscope inside the body.

In some embodiments, tools such as endoscopes, catheters or wires which have a dynamic shape that changes in real time are involved. In such embodiments the real time shape with respect to the markers location is optionally detected, in order to image such a tool, for example an endoscope/catheter/wire, at its real coordinates based on the marker's position and tool's shape. Various methods optionally enable detection of a real time shape of the endoscope/catheter/wire, optionally including a local positioning system (LPS), optical shape detection through optical fibers passing along the tool, or other gadgets along the tool. Once the tool is located in an image space of the CGH projector, the image may optionally be projected in real coordinates.

In some embodiments a camera pill such as the camera pill of "Given Imaging" is involved. The camera pill optionally sends image data and relative coordinates to its sensor system. By recording the true position of the sensor system with respect to the CGH projection system, the true coordinates of the camera pill and its acquired data can optionally be known. Recording the true position of the sensor system can be achieved by placing markers on the sensor system, which is typically a sensor belt. The markers are optionally visible to the detection camera. As long as the belt is fixed to the patient's anatomy the data may be co registered in the CGH system.

In some embodiments an isotopic imaging (nuclear imaging) system, or PET CT imaging system is involved. An organ is optionally monitored by an image acquiring system that optionally provides data, optionally in its local coordinate system. Markers visible to the imaging system are optionally attached to the skin or connected to the bones/skull. The markers are optionally also detectable by the GCH projection unit. This enables co-registering the image at the local coordinate system (nuclear imaging system) with the coordinates of the CGH projection unit. When imaging data enters the CGH image space it is optionally projected in its true coordinates. Optionally markers are placed on the CT imaging system at a location where its relative distance to acquired data for producing the CGH image is known.

Non Real Time Registration

In some embodiments, such as for procedures involved with non-real time acquisition of imaging data, for example X-ray, MRI and CT, the captured CT image coordinates are optionally co-registered to the CGH image space coordinates. This is optionally done by stickers and or markers that are attached to a patient's body, on the skin or using screws to bones. The markers are such which can be detected by both the CT and the X-ray acquisition system (for example a pattern of metal wires) and can be detected by the CGH image projection system (for example visible markers or LED patterns).

In some embodiments, such as described above, internal fiducial markers are optionally used. Such markers can be made from titanium or gold or other non-toxic materials. In order for the CGH system to know their location, optionally a near-IR LED in the markers or attached to the markers can be detected through the skin, or some other electronic/acoustic local positioning marker.

In some embodiments, for example for non-real time imaging, the markers are optionally into the bones or skull. For brain surgery, screwing the markers to the skull and scanning the brain through MRI or CT while the markers are detectable by the MRI or CT. When a head of a patient is placed in a CGH image viewing space, sensors detect the markers' real-time location and display a CGH image of the brain such that the markers are co-registered, and the CGH image shows the brain at its actual position.

In some embodiments, by inserting a tool at known coordinates, relative to the CGH imaging system, the physician can view the tool in the brain as if it is open surgery.

In some embodiments, for example involving non-real time imaging, a catheter is optionally placed in a blood vessel related to an organ, close to or inside the organ. A 3D image of the catheter and the organ are optionally captured using, for example, CT imaging. The catheter is optionally fixed, at least temporarily, relative to the organ, and optionally includes a local positioning system which is co-registered with the CGH image projection unit (by placing markers on the unit). When the organ is inside the CGH image space a CGH image of the acquired data is optionally projected at its actual location.

In some embodiments image processing can optionally replace some or all of the markers, and/or complement the use of markers. By means of image processing of an image of an organ it is possible to co-register MRI, CT, and X-ray images, based on features in the organ. For example, the leg bones acquired in CT can be superimposed by detecting, in the CT data set, the external aspects of the leg. When the leg is placed within the CGH image space, the location or image of the external aspects of the leg is optionally detected by the CGH imaging display system and its location is calculated. With image processing it is possible to know the location of the recorded bone relative to the external aspects of the leg, and the bone is optionally displayed at its true location within the leg, including the true depth and orientation.

4D Registration—Time Dependent Registration

In some embodiments a registration method is used that includes spatial, 3D position coordinates, and time domain information.

Consider a procedure in which non-real-time 3D data is acquired of a system that also includes movement, by way of a non-limiting example a cyclical motion patterns, such as the lungs, ribs or sternum that are affected by the breathing cycle. A location of markers that are placed on the ribs and/or sternum changes in a cyclic pattern based on the inhale-exhale cycle.

In some embodiments the markers are detectable by an imaging system such as MRI or CT at the time of data acquisition, and by the CGH image display system during projection of the holographic image. The CGH image display system optionally shifts the holographic image in synchronization with the cyclic phenomena such as: a breathing cycle, to a heartbeat, to cyclical flow, to metabolic processes and electrical signals such as ECG, which correspond to heartbeats. The co-registration is maintained for the time evolving movement of the organ.

Optionally, tracking the cyclic movement of a body can be done by monitoring a time dependent movement of the markers. Knowing the relative position of the acquired data, the CGH image may optionally be co-registered at any time. Image processing can be used to predict a true location of an organ for different movements of the organ. For example, monitoring of the time dependent change in the lungs under regular breathing can be a basis for computing and extrapolating the position of the lungs, also for deep breathing.

Combining Non Real Time Registration with Real Time Registration

In some embodiments, such as imaging involved with soft tissue such as in of the lungs, some imaging modalities, such as ultrasound for example, real time data acquisition is not typically used because ultrasound doesn't image the soft tissue of the lung well. Other 3D imaging modalities, for example such as, such as CT, which image the soft tissue better, can optionally be used to detect the soft tissue. Markers are optionally inserted into or attached to the soft tissue. The markers are selected to be detectable both by a CT system and an ultrasound system. By doing so, the soft tissue organ and the clips may be co-registered in one local or global coordinate system. By way of a non-limiting example, a patient may be taken to an ultrasound imaging system, or similar imaging system which typically involves local positioning, such as Biosense/Mediguide, that can monitor the position of the markers in real time and send the position to a CGH image projection unit. The coordinates of the ultrasound handle or the Biosense/Mediguide system may optionally be monitored by a guiding unit, potentially providing data for co-registering all the local coordinate systems (CT and ultrasound) with the CGH image projection unit. When the organ is in the CGH image viewing space the CGH projection unit optionally projects the CGH image of the organ and/or the tools with respect to the clips/markers/beads, at a true location, optionally as based on global coordinates.

A non-limiting example embodiment involves monitoring blood flow in blood vessels, optionally using a thermal imaging IR camera. The IR camera captures thermal images of a body, potentially identifying blood vessels. The IR camera optionally has a known position relative to the CGH image projection unit, or its position is detected by using markers or image processing. In some embodiments, knowing a magnification and focus, location of the information captured by the IR camera is optionally co-registered to the CGH image projection unit.

In some embodiments a different image acquisition system is used, such as a CT system, and co-registers the blood vessels with the desired organ, optionally in its local coordinate system.

In some embodiments it is possible to have the IR camera capture images in real time, such as the position of the blood vessels, and a global position of the organ, based on the CT data, can be calculated. When the body part or organ is placed in the CGH image viewing space, the CGH projection unit optionally projects the CGH image at its actual location.

In some embodiments a catheter is placed inside a body, and the catheter is used as a marker, using, by way of a non-limiting example, a CT imaging system to monitor the organ+marker/catheter. In some embodiments a Fluoroscopy (soft X-ray in real time) system is optionally used in real time monitor the marker/catheter, optionally by using two 2D projections to calculate a location. The coordinates of the marker/catheter are optionally registered by the fluoroscopy system, which is optionally co-registered with the CGH image projection system, so that the organ is co-registered with the CGH image.

Combining Real Time Registration of Multiple Acquisition Systems

In some embodiments, 3D data acquired from multiple acquisition systems is combined to create an image with high resolution information at specific locations.

In some embodiments the 3D data acquired by a first acquisition system includes 3D data of a second tool shape, position and orientation. Such a combination potentially provides additional information for interpreting an acquired 3D image.

In some embodiments, a first 3D acquisition system provides a general view of the heart, and a second 3D acquisition system is inserted into a specific vein of interest, e.g. the right inferior pulmonary vein. The 3D data from both acquisition systems is optionally integrated into one 3D image. The combined image displays varying resolutions at various locations, or displays other display characteristics in different areas of the image. The combined image optionally includes 3D data of the second 3D acquisition system, shape, position and orientation.

Viewing a shape, position and orientation of the data of the second acquisition system potentially provides additional information and potentially improves a viewer's understanding of the image of the first acquisition system. A combined image may potentially be used to guide, or to provide feedback, on how to improve the 3D data acquisition of the second system.

In some embodiments, a 3D acquisition system whose field of view is defined as a cone and of decreasing resolution with distance from the sensor, for example an ultrasound image acquisition system, is used. Viewing a location and orientation of a second system, a viewer can better interpret an image and/or reposition the second system to provide the higher resolution and or additional information at a desired location. In some cases, the 3D acquisition system field of view is spherical or semi spherical. In some cases the field of view shape is limited but not defined by simple geometric shapes.

Figure 4E:
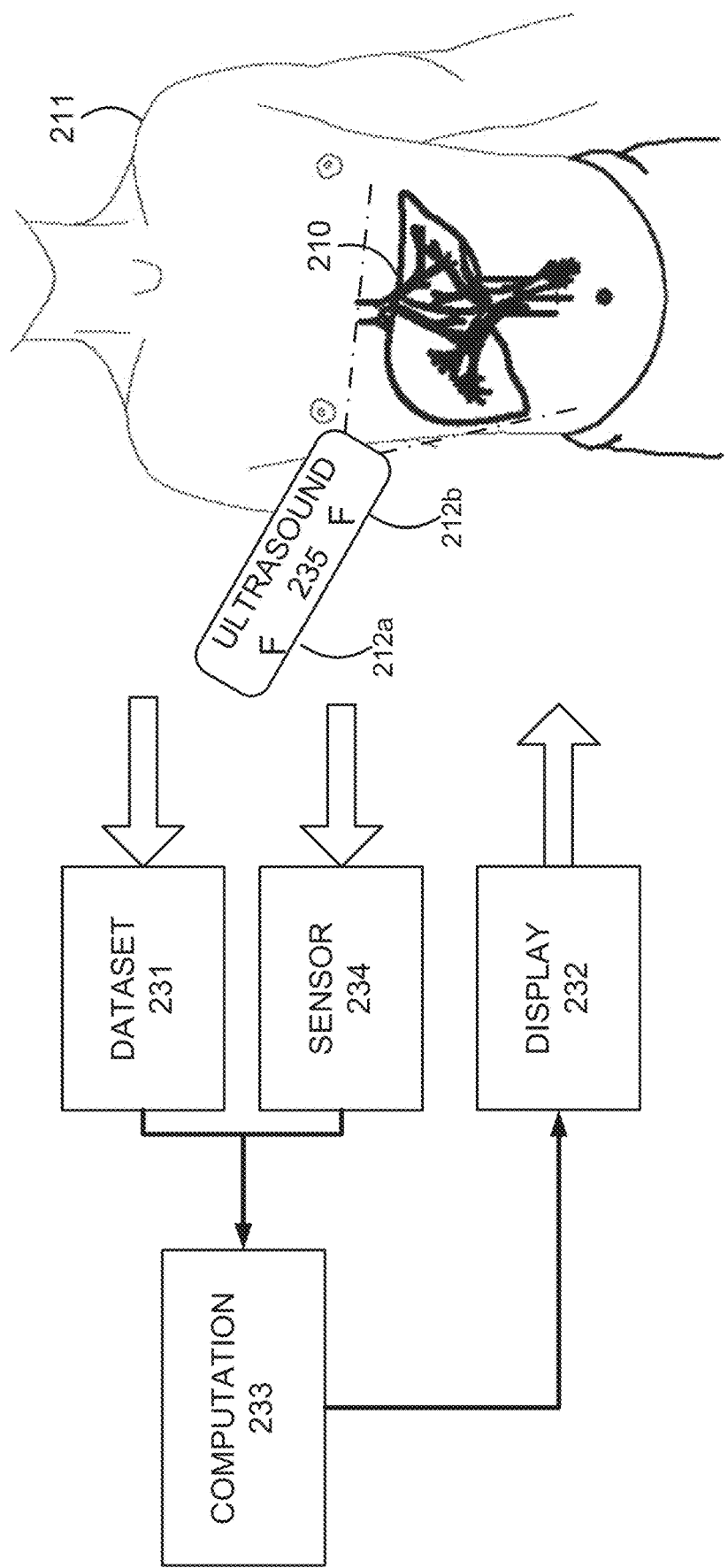
FIG. 4E is a simplified functional illustration of a display system for displaying a CGH image of ultrasound data according to an example embodiment of the invention.

Reference is now made to FIG. 4E, which is a simplified functional illustration of a display system for displaying a CGH image of ultrasound data according to an example embodiment of the invention.

FIG. 4E shows functional blocks in an example embodiment of the invention and how they optionally interact in order to display a holographic image of ultrasound data of a body organ, optionally at a correct location of the body organ within a body.

FIG. 4E depicts a body 211.

An ultrasound imaging system 235 optionally images the body 211, optionally producing a first three-dimensional dataset 231 for producing a computer-generated-holographic (CGH) image of a body organ 210.

The dataset 231 is optionally fed into a computation unit 233, which can produce a computer generated hologram of the body organ.

A sensor 234 optionally detects locations of features on the ultrasound imaging system 235 which may optionally serve to align an image of the body organ with the ultrasound imaging system 235. In some embodiments the features are markers 212a 212b on the ultrasound imaging system 235, which by way of a non-limiting example, may be the ultrasound handle. The sensor 234 optionally provides data, for example distance and direction from the sensor to the markers, to the computation unit 233, which can use the data to calculate and produce a computer generated hologram for displaying the CGH image of the body organ so that the CGH image of the body organ 210 is aligned and located in a correct place relative to the ultrasound imaging system 235.

Figure 4F:
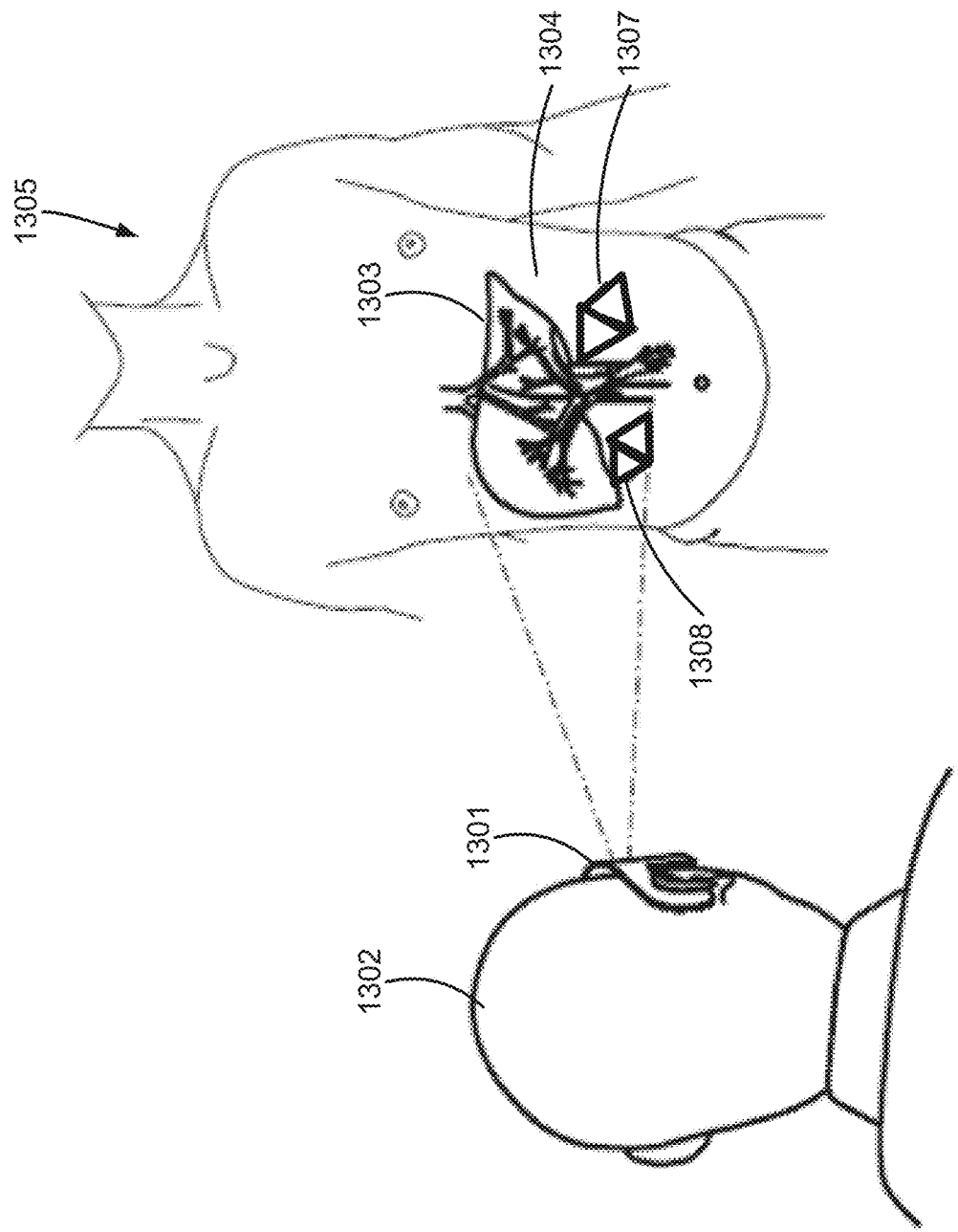
FIG. 4F is a simplified illustration of a HMD displaying a holographic image of a first object and a visually obstructing second object, according to an example embodiment of the invention.

Reference is now made to FIG. 4F, which is a simplified illustration of a HMD displaying a holographic image of a first object and a visually obstructing second object, according to an example embodiment of the invention.

FIG. 4F shows an HMD 1301 displaying to a viewer 1302 a three-dimensional, optionally holographic image 1303 of the first object, for example internal organs, for example liver and related blood vessels, behind and/or within the visually obstructing second object, for example the skin 1304 of an actual body of the patient 1305 whose internal organs are displayed.

FIG. 4F also shows a first marker 1307 attached to the patient's 1305 skin 1304. The first marker 1307 is optionally a three-dimensional (3D) marker, and a three dimensional location of the first marker 1307 is optionally obtained by a location detection system (not shown in FIG. 4F) optionally built into the HMD 1301. In some embodiments a marker with a three-dimensional structure is used, which potentially enables the location detection system to locate the first marker 1307 in three dimensions, including depth.

In some embodiments the location detection system optionally detects at least three points which are not in one line in the 3D first marker 1307.

It is noted that detecting three points not in one line potentially enables determining a three dimensional position of an object in space, and that when the three points are in one line, the object may be rotated about the line as an axis and the three dimensional position of the object may change without the three-dimensional location of the three points being changed.

FIG. 4F also shows a second marker 1308 which is optionally included in a three-dimensional dataset which is used to produce the three-dimensional, optionally holographic image 1303. The second marker 1308 may optionally also be a three-dimensional (3D) marker, and a three dimensional location of the second marker 1308 is optionally obtained by whatever three dimensional imaging system used to produce the three-dimensional dataset.

In some embodiments the three dimensional location of the second marker 1308 optionally includes at least three points which are not in one line in the 3D second marker 1308.

The HMD 1301, or a computing system (not shown in FIG. 4F) which prepares three-dimensional images for the HMD 1301, optionally knows a relative position of the first marker 1307 and the second marker 1308, and optionally aligns the three-dimensional image 1303 to the patient's 1305 body so as to appear in its correct place within the patient's 1305 body under the skin 1304.

In some embodiments the markers are shaped as a three-dimensional non-symmetric pyramid. It is noted that marker described with reference to any other drawing may have a shape of a three-dimensional non-symmetric pyramid.

In some embodiments, a single three-dimensional marking optionally enables detection of both location and orientation of a body/organ/tool attached to or associated with the three-dimensional marking. In some embodiments the three dimensional marking potentially enables detection of several points, at least some of the points not on a straight line, thereby potentially enabling detection of both location in space and orientation in space.

Figure 4G:
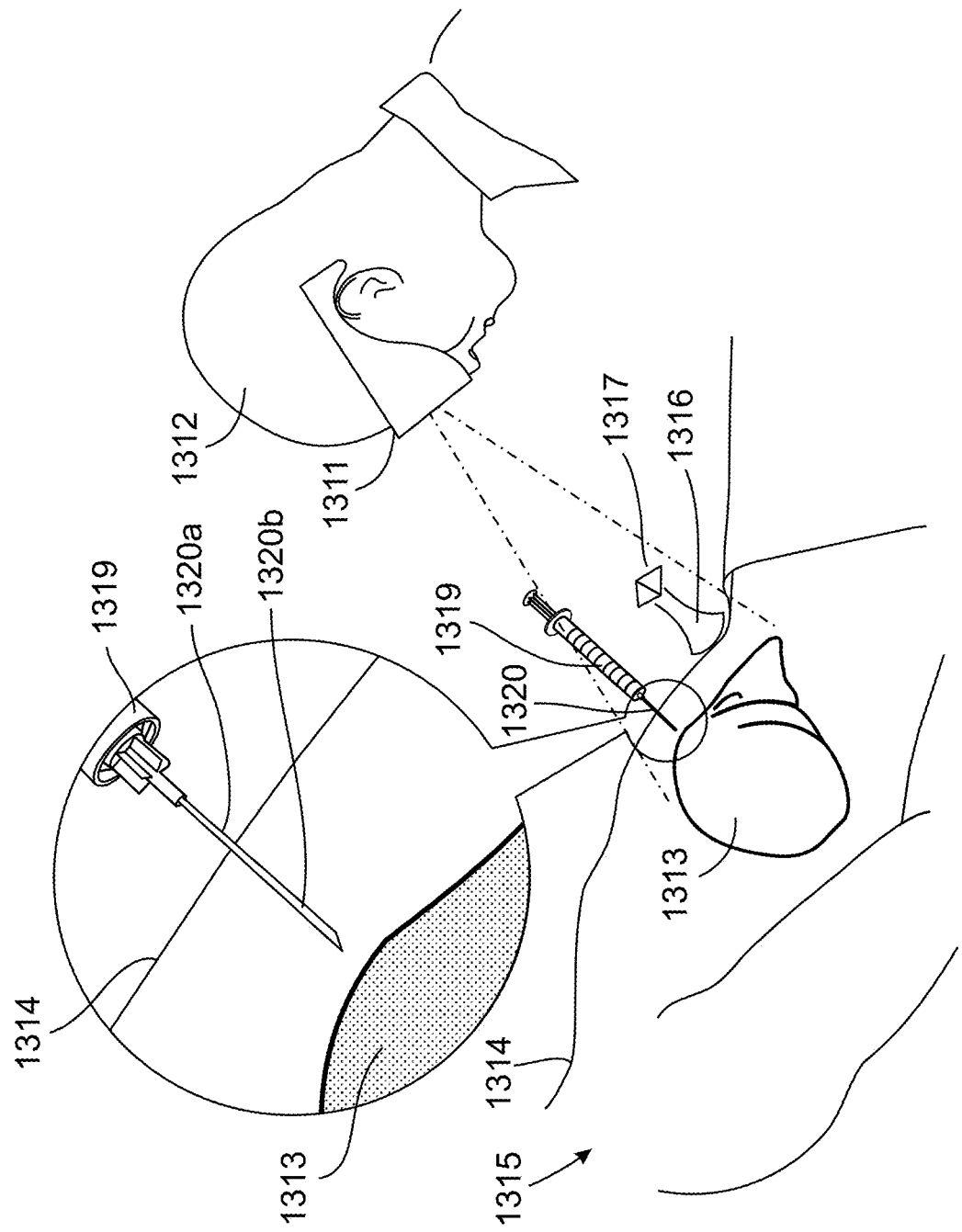
FIG. 4G is a simplified illustration of a HMD displaying a holographic image of a first object behind or within a visually obstructing second object, as well as an additional object at least partially behind or within the visually obstructing second object, according to an example embodiment of the invention.

Reference is now made to FIG. 4G, which is a simplified illustration of a HMD displaying a holographic image of a first object behind or within a visually obstructing second object, as well as an additional object at least partially behind or within the visually obstructing second object, according to an example embodiment of the invention.

FIG. 4G shows an HMD 1311 displaying to a viewer 1312 a three-dimensional, optionally holographic image 1313 of the first object, for example internal organs, for example liver, behind and/or within the visually obstructing second object, for example the skin 1314 of an actual body of a patient 1315 whose liver is displayed.

In some embodiments, a system used for obtaining three-dimensional data for producing the image 1313 is a three-dimensional ultrasound imaging system 1316. In some embodiments, a location detection system (not shown) optionally built into the HMD 1311 locates a three-dimensional location of the ultrasound imaging system 1316. In some embodiments, the location detection system optionally locates a three-dimensional location and orientation of the ultrasound imaging system 1316 based on a marker 1317 optionally attached and/or built into the ultrasound imaging system 1316. In some embodiments, the marker 1317 is a three-dimensional marker as described above.

In some embodiments, the ultrasound imaging system 1316 provides a dataset for producing the image 1313, optionally in real-time. Since the HMD 1311 optionally detects the three-dimensional location and orientation of the ultrasound imaging system 1316, and receives data from the ultrasound imaging system 1316 for displaying the three dimensional image 1313, the HMD 1311 can display the image 1313 in its correct location in space, based on a relative location and orientation of the ultrasound imaging system 1316 relative to the HMD 1311, and the relative location and orientation of the first object relative to the ultrasound imaging system 1316.

FIG. 4G also shows a tool 1319, such as a syringe, which is partly outside the patient's 1315 skin 1314, and is thus optionally seen by the viewer 1312 through the HMD 1311. In some embodiments the syringe includes a needle, a first part 1320a of which is outside the skin 1314, and is viewed directly by the viewer 1312, and a second part 1320b that is hidden from unaided view by the patient's 1315 skin 1314, and is viewed as part of the image displayed by the HMD 1311, as captured by the ultrasound imaging system 1316. The first part 1320a of the needle is optionally viewed as a continuation of the second part 1320b of the needle, since the image displayed by the HMD 1311 is correctly aligned, or registered, in space, as described above.

Figure 4H:
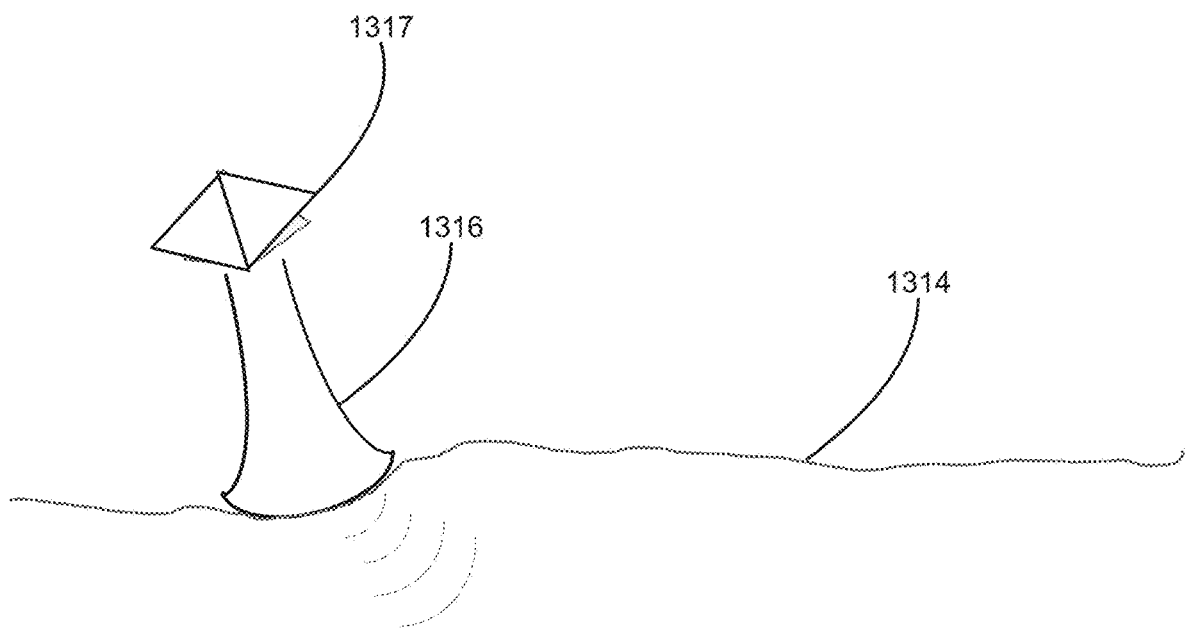
FIG. 4H is a simplified illustration of an imaging system for obtaining three-dimensional data for displaying a 3D image of internal organs in a body, according to an example embodiment of the invention.

Reference is now made to FIG. 4H, which is a simplified illustration of an imaging system 1316 for obtaining three-dimensional data for displaying a 3D image of internal organs in a body, according to an example embodiment of the invention.

FIG. 4H shows an image acquisition system 1316, by way of a non-limiting example an ultrasound system, and a marker 1317 attached to the image acquisition system 1316, which is optionally capturing an image or images below a patient's skin 1314. In some embodiments the marker 1317 is a three-dimensional marker as described above.

The marker 1317 potentially enables a location system to detect a location and orientation of the marker 1317 in space. From the location and orientation of the marker 1317 in space a location and orientation of the image acquisition system 1316 in space may be calculated. From the location of the image acquisition system 1316 in space, a location and orientation of objects in a 3D image captured by the image acquisition system 1316 may be calculated. Regardless of whether the location of the marker 1317 is detected by an HMD, as shown in FIG. 4G, or by some other location detection system, the location in space of the objects captured by the 3D imaging system 1316 can be calculated.

In some embodiments the 3D image acquisition system 1316 is a real time image acquisition system, and 3D images displayed based on data captured by the 3D image acquisition system 1316 are optionally displayed in real-time, that is, within a fraction of a second of capturing the 3D images.

Some non-limiting example embodiments of 3D image acquisition system to which 3D markers can be attached include ultrasound transducers, TEE imaging transducers, CT imaging systems, and additional systems as listed herein.

Figure 4I:
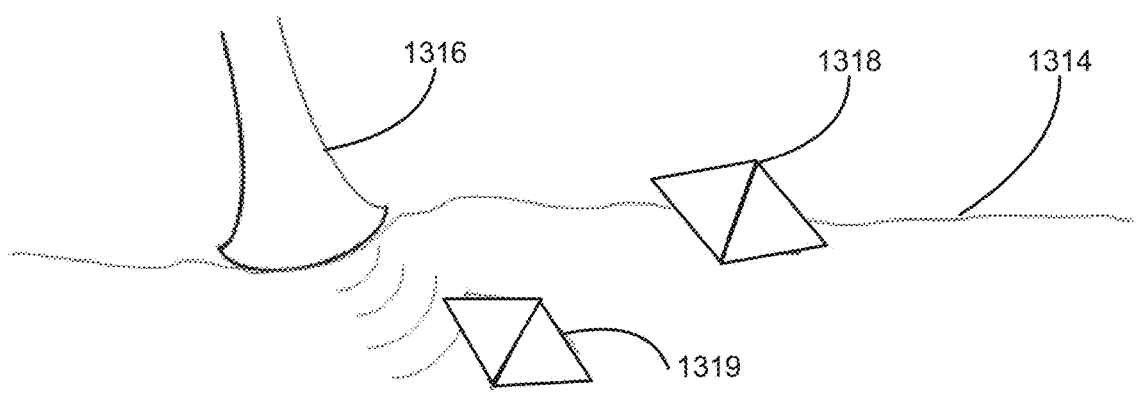
FIG. 4I is a simplified illustration of an imaging system for obtaining three-dimensional data for displaying a 3D image of internal organs in a body, according to an example embodiment of the invention.

Reference is now made to FIG. 4I, which is a simplified illustration of an image acquisition system 1316 for obtaining three-dimensional data for displaying a 3D image of internal organs in a body, according to an example embodiment of the invention.

FIG. 4I shows an image acquisition system 1316, by way of a non-limiting example an ultrasound system, and a first marker 1318 viewable by an external location detection system (not shown). The external location detection system may be on a HMD such as shown in FIG. 4G, or elsewhere which can view or detect and measure a location of the first marker 1318.

FIG. 4I also shows a second marker 1319, somewhere within a patient's body, hidden by skin 1314, yet detectable and its location measurable at least by the imaging system 1316.

In some embodiments, locations of both the first marker 1318 and the second marker 1319 are detectable and/or measurable by the above-mentioned location detection system (not shown), or by some other location detection system. The location detection system which detects both the first marker 1318 and the second marker 1319 optionally provides a location and orientation of the first marker 1318 relative to the second marker 1319. A display system which is provided with the location of the first marker 1318, a relative location of the second marker 1319, and a dataset of internal organs (not shown) which includes data describing the second marker 1319, optionally displays the internal organs in a correct position in space, based on calculating the internal organ location relative to the second marker 1319, the location of the second marker 1319 relative to the first marker 1318, and the location of the first marker relative to the patient's body and/or relative to the display system and/or relative to the viewer.

In some embodiments, locations of both the first marker 1318 and the second marker 1319 are detectable and/or measurable by the image acquisition system 1316. The image acquisition system 1316 optionally provides an image of internal organs (not shown) which includes images and/or locations of the first marker 1318 and the second marker 1319. A three-dimensional display system which can view and measure a location of at least the first marker 1318 can display an image with the first marker located correctly in space, and use a dataset of the internal organs and the two markers from the imaging system 1316 to produce and display a 3D image of the internal organs located correctly in space.

Figure 4J:
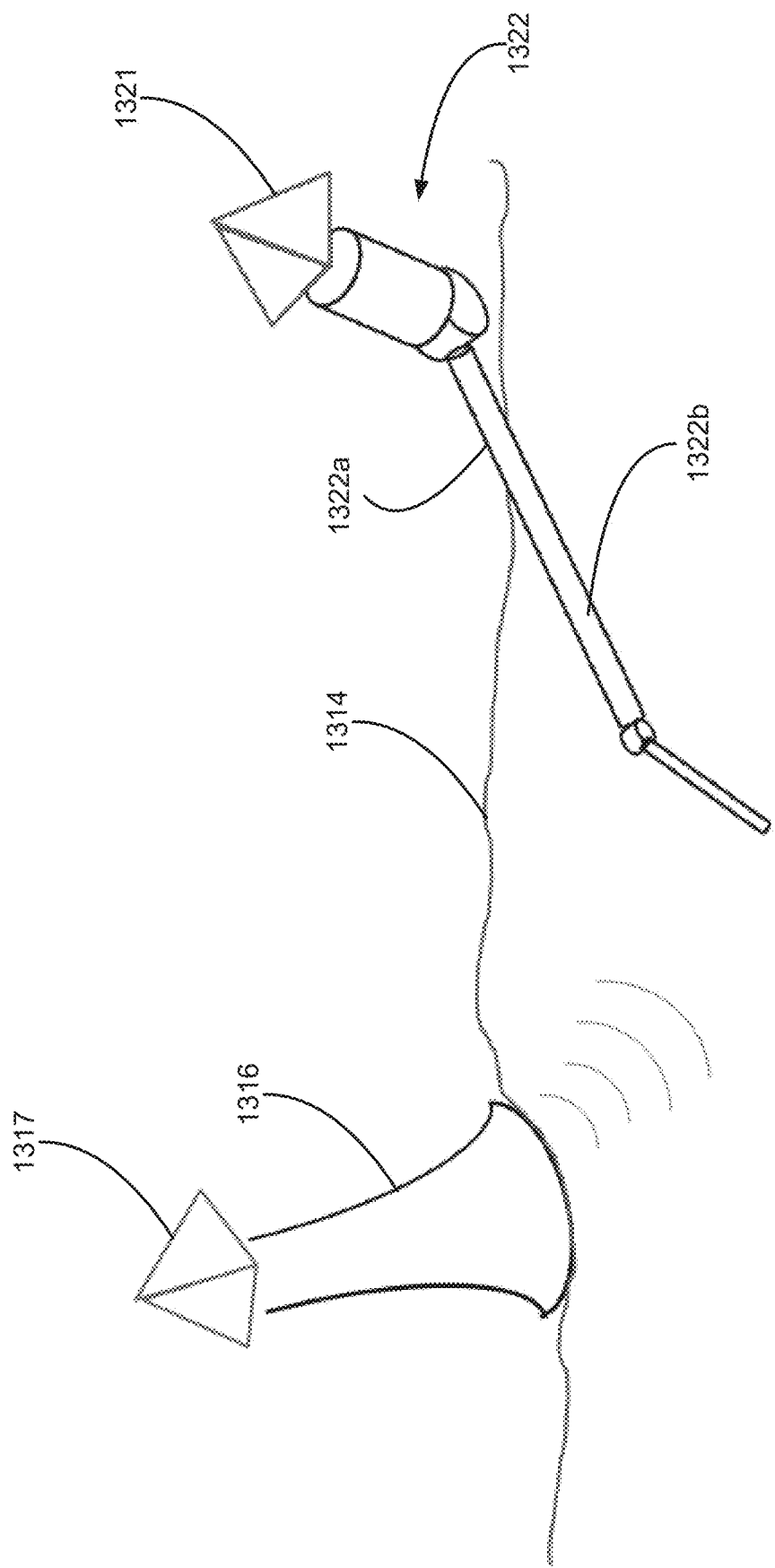
FIG. 4J is a simplified illustration of an imaging system and an additional object, according to an example embodiment of the invention.

Reference is now made to FIG. 4J, which is a simplified illustration of an image acquisition system 1316 and an additional object, according to an example embodiment of the invention.

FIG. 4J shows an image acquisition system 1316, by way of a non-limiting example an ultrasound system, and an additional object, by way of a non-limiting example a surgical tool 1322.

A first marker 1317, viewable and its location detectable and/or measurable by an external location detection system (not shown), is optionally attached to, marked upon, or built into the imaging system 1316. A second marker 1321, viewable and its location detectable and/or measurable by the external location detection system is optionally attached to, marked upon, or built into the surgical tool 1322.

By way of a non-limiting example, a first portion 1322a of the surgical tool 1322 is external to a skin 1314 of a patient's body, and a second portion 1322b of the surgical tool 1322 is within the patient's body, hidden from unaided view by the skin 1314.

The image acquisition system 1316 optionally provides data for producing 3D images to a three-dimensional display system (not shown), for displaying internal organs, hidden beneath the skin 1314. By virtue of a location of the first marker 1317 being detectable and measurable by the external location detection system, and by virtue of geometric properties of the imaging system 1316 being known, an image of the internal organs is optionally shown registered to the patient's body, at a correct location in space.

In some embodiments the imaging system 1316 optionally provides data for producing 3D images to a three-dimensional display system (not shown), including data for displaying the second portion 1322b of the surgical tool 1322. By virtue of the location of the second marker 1321 being detectable and measurable by the external location detection system, and by virtue of geometric properties of the surgical tool 1322 being known, an image of the second portion 1322b is optionally shown registered to the patient's body, at a correct location in space.

In some embodiments the imaging system 1316 optionally provides data for producing 3D images to a three-dimensional display system (not shown), including data for displaying the second portion 1322b of the surgical tool 1322. By virtue of the location of the second marker 1321 being detectable and measurable by the external location detection system, and by virtue of geometric properties of the surgical tool 1322 being known, an image of the entire surgical tool 1322 is shown, including the second portion 1322b, which is inside the body, and the first portion 1322a, which is outside the body. Both portions 1322a 1322b of the surgical tool are optionally shown registered to the patient's body, at a correct location in space.

In some embodiments the three-dimensional display system (not shown), displays images of entire objects which are partly hidden by other objects and partly visible. Both the hidden part(s) and the visible part(s) are shown in their correct position in space.

In some embodiments the three-dimensional display system (not shown), displays digital images which are partly hidden by other objects and partly visible. Both the hidden part(s) and the visible part(s) are shown in their correct position in space.

In some embodiments the image acquisition system 1316 optionally provides data for producing 3D images to a three-dimensional display system (not shown), including data for displaying the second portion 1322b of the surgical tool 1322. By virtue of the location of the first marker 1317 being detectable and measurable by the external location detection system, and by virtue of geometric properties of the imaging system 1316 being known, an image of the second portion 1322b which may be provided to the display system, optionally in real-time, is optionally shown registered to the patient's body, at a correct location in space.

In some embodiments there is optionally a marker (not shown), optionally attached to, marked upon, or built into the second portion 1322b of the surgical tool 1322, optionally detectable by the image acquisition system 1316.

Example of Not-Necessarily Medical Embodiments

An aspect of some embodiments of the invention involves displaying, by way of a non-limiting example, a CGH image of hidden components, correctly placed within a view of a real world scene. In some embodiments, such displaying is optionally achieved by the display device locating itself relative to the real world scene, and displaying the CGH image of the hidden components at their correct location.

Figure 5A:
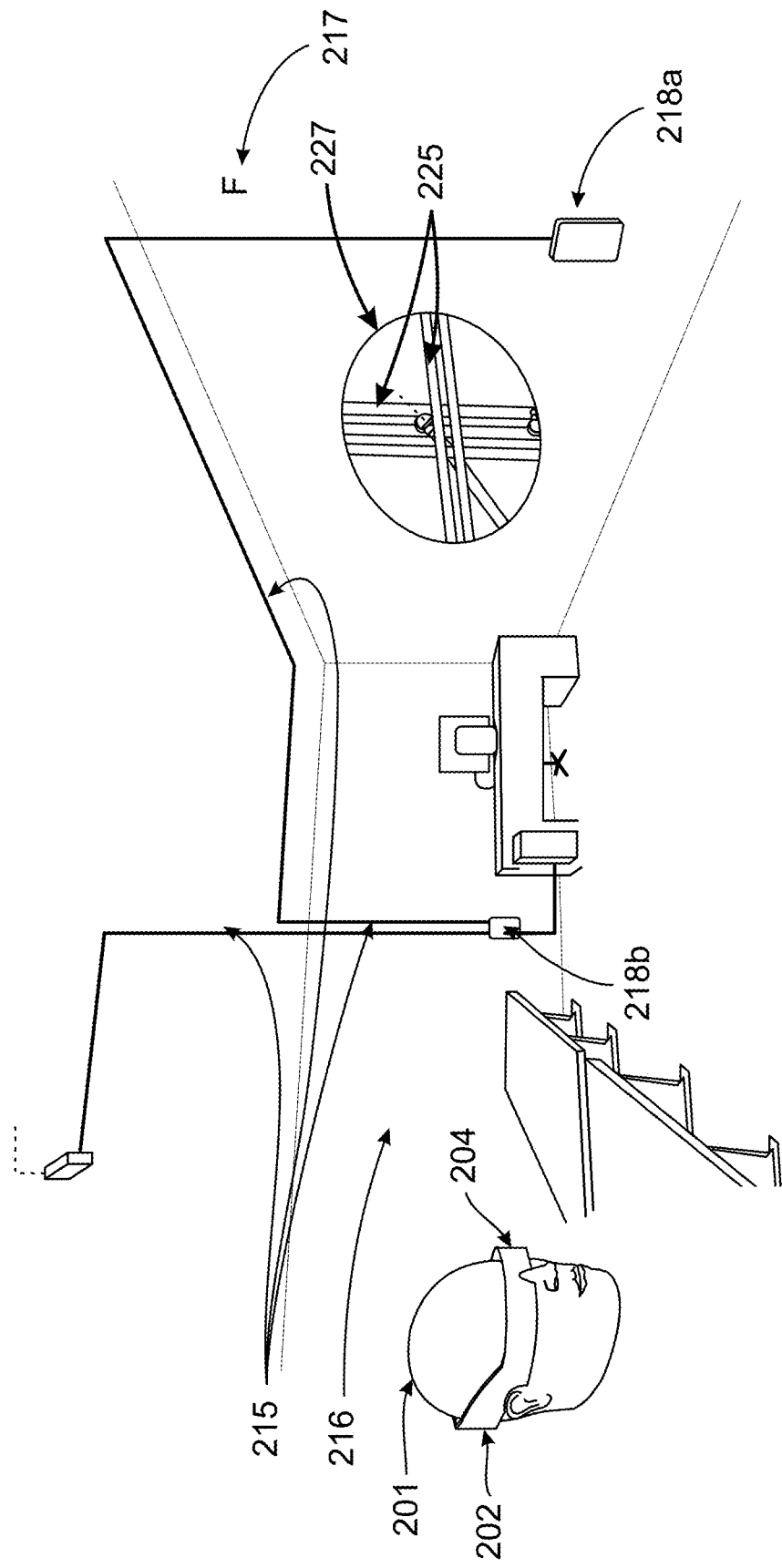
FIG. 5A is a simplified illustration of a HMD displaying a holographic image of a first object behind or within a visually obstructing second object, according to an example embodiment of the invention.

Reference is now made to FIG. 5A, which is a simplified illustration of a HMD displaying a holographic image of a first object behind or within a visually obstructing second object, according to an example embodiment of the invention.

FIG. 5A depicts the holographic image of the first object, for example network wiring 215, or electric wiring, or water pipes 225, or air conditioning ducts, or house frame joists, behind or within the visually obstructing second object, for example the wall 216 of a room.

FIG. 5A depicts a viewer 201 wearing a HMD 202, which displays the wiring 215 and the pipes 225 in the room.

The viewer 201 also sees the walls 216 of the room, so sees both the wiring 215 and pipes 225 and the walls 216 of the room.

In some embodiments, the wiring 215 and the pipes 225 are correctly located in space relative to the walls 216.

In some embodiments the display system, the HMD 202 for example, obtains a first relative location or coordinates and/or orientation of one or more marking(s) 217 on the wall 216, relative to the HMD 202. The HMD 202 also obtains a three-dimensional dataset describing the wiring 215 and/or the pipes 225, and optionally displays the wiring 215 and/or the pipes 225 in their correct location behind or within the walls 216.

In some embodiments the display system, the HMD 202 for example, obtains a first relative location or coordinates of a known portion of the wiring 215 and/or the pipes 225, such as a location of one or more wall plate(s) 218a and/or 218b, relative to the HMD 202. The HMD 202 also optionally obtains a three-dimensional dataset describing the wiring 215 and/or the pipes 225, and optionally displays the wiring 215 and/or the pipes 225 in their correct location behind or within the walls 216.

In some embodiments, the HMD 202 displays the holographic image of the wiring 215 and/or the pipes 225 so that the marking(s) 217 and/or the known portion 218a 218b locations in the holographic image coincide, also termed herein co-register, with the marking(s) 217 and/or the known portions 218a 218b locations in the real world, on the walls 216 of the room. Such co-registration potentially displays the wiring 215 and/or the pipes 225 in the correct location relative to the walls 216.

In some embodiments the HMD 202 optionally has one or more sensor(s) 204 which can detect and locate the marking(s) 217 and/or the known portions 218a 218b. The sensor 204 optionally measures distance and/or angle toward the marking(s) 217 and/or the known portions 218a 218b on the walls 216. The measurement potentially enables the HMD 202 to determine a location of the walls 216 relative to the displayed wiring 21 and/or pipes 2255.

The sensor 204 may optionally be any one of the sensors described herein.

The marking(s) 217 may optionally be any of the markings described herein.

In some embodiments, tracking the wiring 215 and/or pipes 225 location and/or orientation in space relative to the HMD 202 is optionally performed by an external system tracking the HMD 202.

In some embodiments, tracking a display's orientation in space, such as the HMD 202, is optionally performed by the display itself, by optically tracking location of objects, external to the display, in space; by optically tracking specific markings in a vicinity of the display in space; by using direction finding similarly to direction finding by smart phones; by using an accelerometer; and by using a gravity sensor.

In some example embodiments, a view of wiring and/or pipes within a wall, by way of a non-limiting example as described with reference to FIG. 5A, may be done, by way of a non-limiting example, for planning work on the walls 216 or cutting into the walls 216.

In some non-limiting example embodiments, only a specific section of wiring and/or pipes, such as section 227 depicted in FIG. 5A, is depicted behind the wall 216.

In some embodiments a 3D structure of elements of the scene which are partially hidden from naked-eye view is optionally known, for example as a CAD dataset of the elements, or as some other dataset describing a structure of the hidden elements. In such embodiments the HMD 202 optionally measures a location of reference elements which are visible to the HMD 202, or at least susceptible to location measurement by the HMD 202, and displays the scene, including the elements which are hidden from naked-eye view, correctly aligned with the reference elements and so correctly aligned in the real world.

The terms "dataset" and "imaging data" in all their grammatical forms are used throughout the present specification and claims to mean a dataset for producing a three-dimension image, including medical imaging datasets, Computer Aided Design (CAD) datasets, mapping datasets, geographic datasets, geologic datasets, and additional datasets which contain three-dimensional data.

In some embodiments, a display such as described herein displays CAD data for engineering review of a working mechanism, such as a motor. In some embodiments a viewer can optionally see inner parts of a mechanism dynamically, in motion, optionally located correctly relative to an outer envelope of the mechanism. In some embodiments the display enables viewing the inner parts of the mechanism from various angles, optionally including a full 360 degree walk-around and/or top-and-bottom circumnavigation, with capability to observe the inner parts of the mechanism.

By way of some non-limiting examples a viewer may view inner workings of a motor and/or motor parts within a car.

In some embodiments such displaying is optionally used for structure design, for teaching, in medical scenarios and in non-medical scenarios.

Figure 5C:
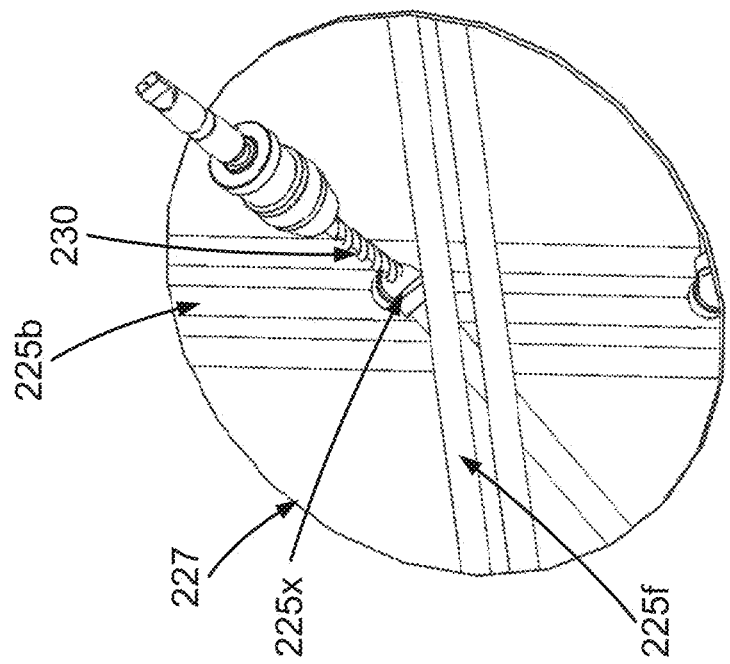
FIGS. 5B and 5C are simplified illustrations of a specific portion of Figure in which a HMD is displaying a holographic image of pipes behind a visually obstructing wall, according to an example embodiment of the invention.
Figure 5B:
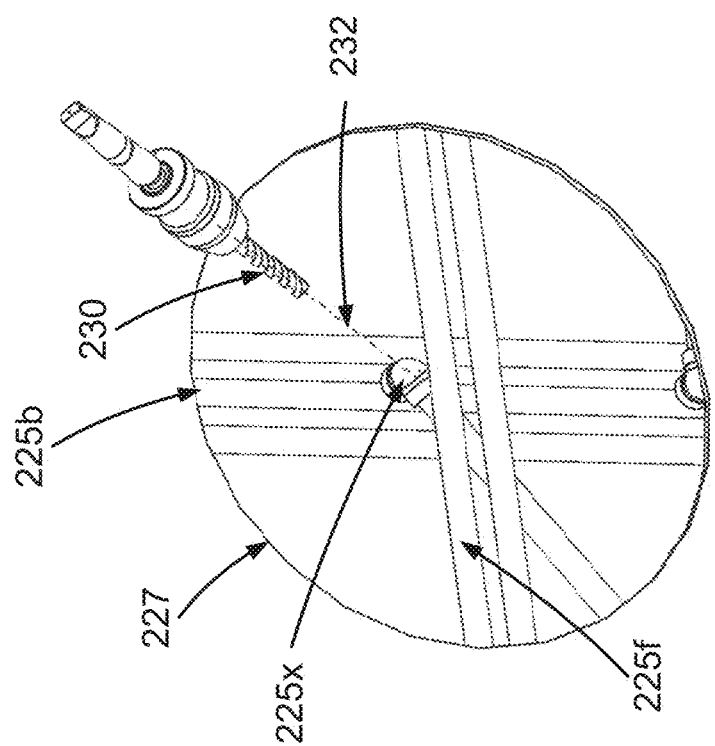

Reference is now made to FIGS. 5B and 5C, which are simplified illustrations of a specific portion 227 of FIG. 5A, in which a HMD is displaying a holographic image of pipes 225f 225b 225x behind a visually obstructing wall, according to an example embodiment of the invention.

FIG. 5B depicts the portion 227 with various pipes behind the wall. Some pipes 225f pass in front of some other pipes 225b 225x. By way of a non-limiting example it is desired to drill a specific pipe 225x which passes behind some of the pipes 225f and in front of some of the pipes 225b.

FIG. 5B also depicts, by way of a non-limiting example, a drill 230 directed toward the specific pipe 225x. FIG. 5B depicts that a viewer may optionally have a view of both a CGH image of pipes and a real object, the drill 230.

In some embodiments, as depicted, by way of a non-limiting example in Figure a CGH image of a guide line 232 may optionally be displayed continuing the direction of the drill 230, showing where the drill would intersect the specific pipe 225x.

FIG. 5C depicts the portion 227 with the various pipes 225b 225f 225x behind the wall.

FIG. 5B also depicts the drill 230 drilling the specific pipe 225x. the drill 230 is optionally directed at an angle so as to optionally drill a location behind the front pipes 225f. FIG. 5B depicts that a viewer may optionally naturally direct a drill base on seeing the pipes 225x 225b 225f as they are in their correct location in space.

Viewing Arc—Orbit

In some embodiments it is desirable that the physician be able to see surgical tools and/or an organ that are inside the patient. An aspect of such a capability is termed the viewing arc. The viewing arc aspect implies that the physician is able see a 3D image from different viewing positions, as if he is traversing on an arc, or moving around the organ from a choice of any angle. Consider a surgeon inspecting an organ prior to or during surgery. It is potentially beneficial that the physician be able to see a proximity and relative position of tissue to vessels, behind, within and to the sides of the organ, relative to the physician's vantage point.

A CGH image provides the physician with a natural and intuitive viewing arc which can potentially provide spatial comprehension. The physician can optionally walk around the CGH image, and view the CGH image from different angles, naturally and intuitively. The physician does not rotate the CGH image on a display. The CGH image of the organ is co-registered with the patient's body, and as the physician views the organ and moves around the organ he views the co-registered image and organ from different angles.

The CGH image potentially displays spatial resolution of less than 1 mm, 2 mm, 5 mm or 10 mm. The term arc in this context is used for a change of viewing angle or position relative to the CGH image it is not necessarily a geometric arc.

In some embodiments a needle like tool is navigated: to determine a best end expiration depth. See the figures below—the light area displays metastasis in a liver surrounded by blood vessels. In the left figure, which shows a lateral view, no clear path for a needle to reach the metastasis without damaging the vessels is seen. By changing the viewing position to a more anterior-posterior projection, shown in the right figure, the relative 3D position of the blood vessels to the metastasis is clarified, demonstrating a route to the metastasis without the risk of damaging a blood vessel. The motion path between the lateral and AP viewing position is termed herein the viewing arc—orbit.

A lateral view might show the metastasis and the blood vessels crowded in space while an anterior—posterior view may present a different spatial configuration. In the figures below, the anterior—posterior view shows larger distances between the metastasis and the blood vessels.

Reference is now made to FIG. 6A, which is a simplified line drawing 601 of blood vessels 602 and metastasis locations 603a 603b according to an example embodiment of the invention.

FIG. 6A depicts the blood vessels 602 and metastasis locations 603a 603b as viewed from a lateral direction.

In some example embodiments a surgeon may move his display, changing his point of view, relative to an actual location of the body of the patient, specifically relative to an actual location of the blood vessels 602 and metastasis locations 603a 603b, so as to look at a patient's body from various directions.

Figure 6B:
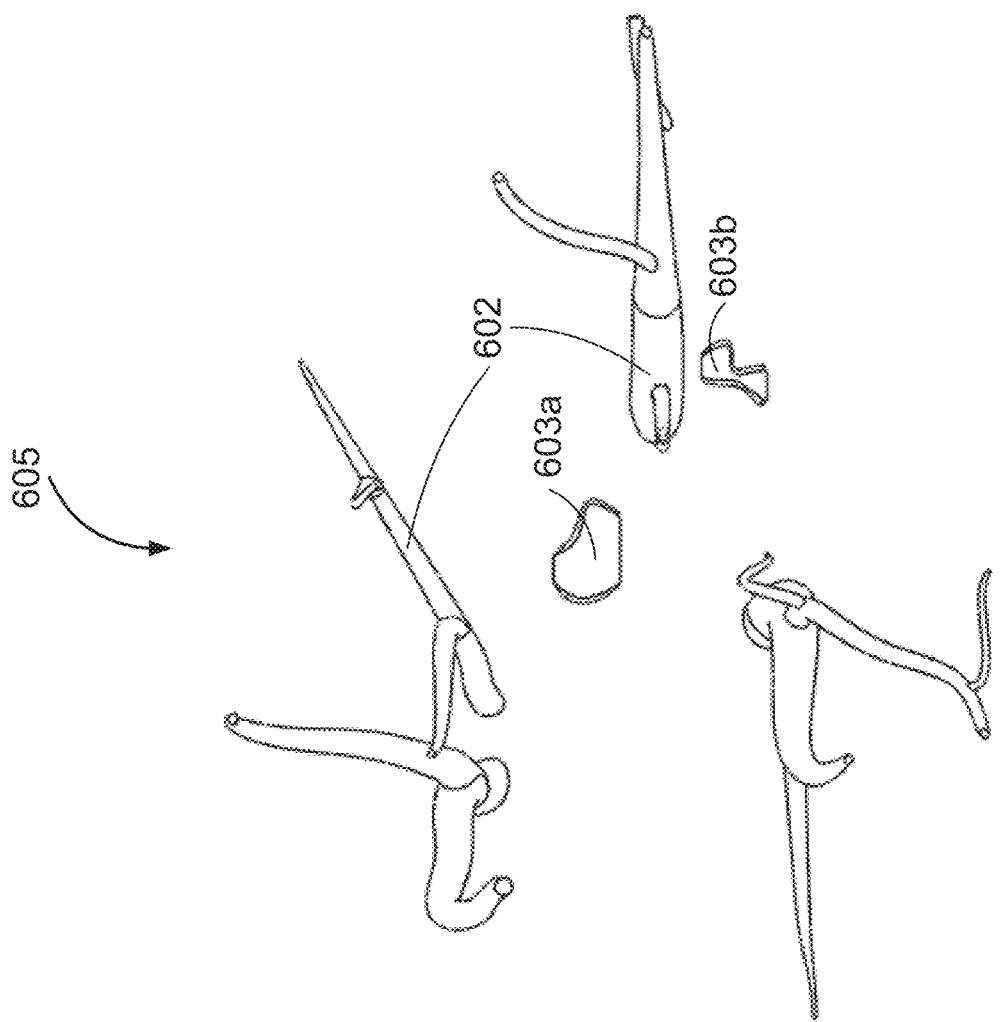
FIG. 6B is a simplified line drawing of the blood vessels and the metastasis locations of FIG. 6A according to an example embodiment of the invention.

Reference is now made to FIG. 6B, which is a simplified line drawing 605 of the blood vessels 602 and the metastasis locations 603a 603b of FIG. 6A, according to an example embodiment of the invention.

FIG. 6B depicts the blood vessels 602 and metastasis locations 603a 603b as viewed from an anterior-posterior direction.

The example of FIG. 6B illustrates that when the surgeon changes his/her direction of viewing the patient's body, the CGH image display optionally provides the surgeon with a CGH image correctly located and viewed from the surgeon's new viewing direction, which may sometimes provide a clearer, more separated in the image, view of the blood vessels 602 and metastasis locations 603a 603b.

In some embodiments support for a change in viewing direction such as shown in the difference between FIG. 6A and FIG. 6B is provided, with the displayed blood vessels 602 and metastasis locations 603a 603b remaining correctly registered within a patient's body. Such support potentially enables physicians a natural interface for inspecting a patient and planning medical intervention.

Clinical Applications

In some embodiments, 3D see-through vision is used in image guided therapy, for example for irreversible electroporation (IRE) ablation. IRE procedures are applied in tumor ablation in regions where precision and conservation of blood vessels and nerves are of importance.

In some embodiments, multiple electrodes, shaped in the form of long needles, are placed around a target tumor. The point of penetration for the electrodes is chosen according to anatomical considerations. Imaging is potentially essential to the placement of the needles that should be placed with high precision. The electrode needles are preferably parallel to each other and placed around the tumor at a high precision of 1 mm, 2 mm, 5 mm. This precision also relates to the depth that each needle is inserted relative to each other and relative to the tumor.

Figure 7B:
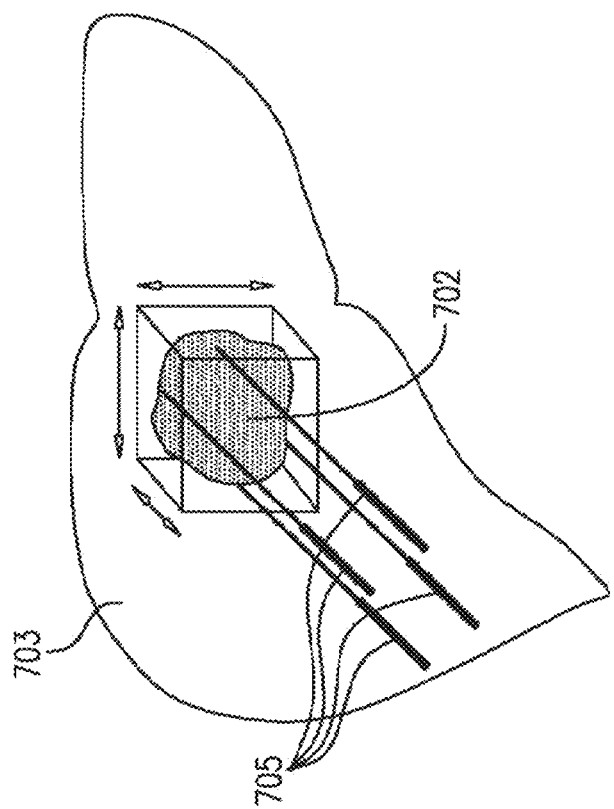
FIG. 7B is a simplified isometric line drawing illustration of needles and a tumor with a specific body volume according to yet another example embodiment of the invention.
Figure 7A:
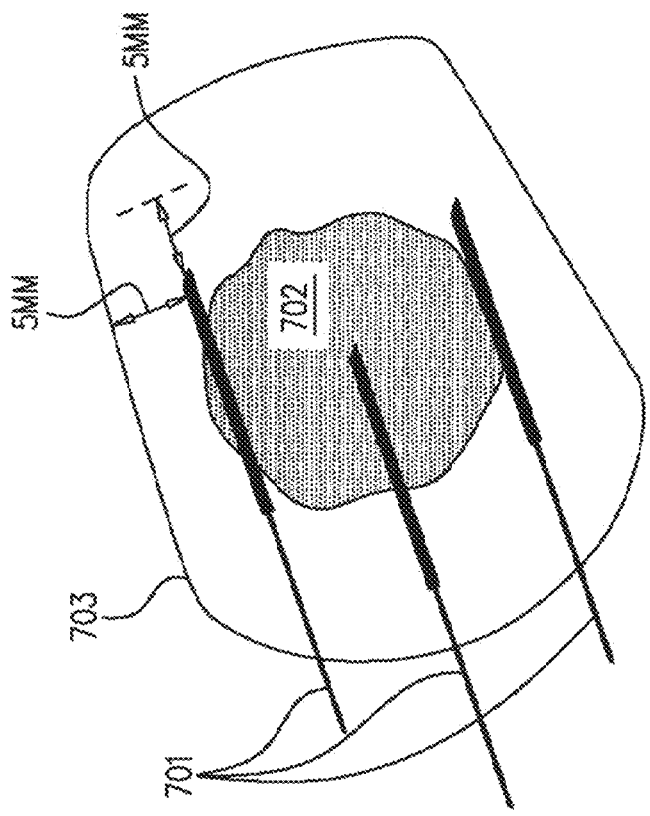
FIG. 7A is a simplified isometric line drawing illustration of needles and a tumor with a specific body volume according to an example embodiment of the invention.

Reference is now made to FIG. 7A, which is a simplified isometric line drawing illustration of needles and a tumor with a specific body volume according to an example embodiment of the invention.

An example embodiment illustrated by FIG. 7A may be a procedure of Irreversible Electroporation (IRE), which potentially benefits from parallelism and similar/identical depth of needles, with an accuracy of 1 mm.

FIG. 7A depicts the needles 701, the tumor 702 and the specific body volume 703 as viewed from a surgeon's viewpoint.

FIG. 7A depicts an example embodiment of a CGH image of the tumor 702 and the specific body volume 703, co-registered and displaying a CGH image of the needles 701 at a planned location.

Reference is now made to FIG. 7B, which is a simplified isometric line drawing illustration of needles and a tumor with a specific body volume according to yet another example embodiment of the invention.

FIG. 7B depicts the needles 705, the tumor 702 and the specific body volume 703 as viewed from a surgeon's viewpoint, in an actual CGH image, displaying the actual needles 705 at their actual location, as acquired by a 3D image acquisition system.

FIG. 7B depicts an example embodiment of a CGH image of the tumor 702 and the specific body volume 703, in some embodiments not necessarily co-registered with any other image, since FIG. 7B depicts a CGH image optionally produced based on a single 3D data set, optionally acquired by one data acquisition system. However, in some embodiments the CGH image is co-registered with the patient's body (not shown), and shown at its actual location in real space.

It is noted the in embodiments involving an IRE procedure, it is desired that the needles be parallel, that tips of the needles form a plane, and that the tips be approximately equally spaced from a metastasis or tumor.

The example embodiment depicted in FIGS. 7A and 7B potentially enable a physician to visually confirm that the needles 705 and the needle tips are at a desired location, rather than estimating the location of the needles and needle tips based, for example, on measuring their depth into the patient body. The physician potentially saves time in the procedure, potentially shortening the procedure, which can potentially benefit the patient and the physician. The patient may be saved from excess radiation by viewing needle tips at their location within the body, rather than performing x-ray imaging to verify the needle tip location(s).

Kidney Transplant, Laparoscopic Kidney Removal or Laparoscopic Nephrectomy

In some embodiments, such as embodiments involving pre-surgical planning, markers are optionally placed on a donated kidney. Internal markers are optionally placed on an artery that supplies blood to kidneys, and optionally on the vein that carries blood away from the kidney. Optionally, external markers are placed on the recipient's chest, by way of some non-limiting examples by screws to the ribs or stickers on the abdomen.

The CGH image display system and the 3D acquisition system optionally detect the markers on the recipient. Image registration of the image is optionally obtained using some or all of the above-mentioned the markers.

The 3D image acquisition system optionally detects the internal markers within the recipient as well as the markers on a transplanted kidney, once the kidney is in the recipient's body. The internal markers and markers on the kidney optionally assist a physician using 3D see-through vision in positioning the kidney.

An Example Clinical Application Method

In some embodiments, 3D see-through vision is used to support methods and tools to enable direct rapid puncture during lung biopsy surgical procedures, potentially reducing needle related pleural damage, improving biopsy quality and requiring less imaging time, hence potentially less radiation.

In some embodiments, a method of using 3D see-through vision in clinical applications includes the following steps:
  Apply markers: to the patient and/or organs and or additional tools
  Image the patient and markers with a 3D data acquisition system
  Co-Register the CGH image to the patient location
  Plan the surgical activities
  Proceed with the plan The above method potentially enables direct rapid puncture, potentially reduces needle related pleural damage, potentially improves biopsy quality and potentially requires less imaging time, hence potentially reduces radiation.

In some embodiments image guided therapies such as, by way of some non-limiting examples, lung biopsy, ablation therapies and minimally invasive spinal surgery use 3D see-through vision. The above-mentioned example image guided therapies optionally include navigations on co-registered images with a LPS and GPS tracking system, where a potentially significant aspect is true depth registration allowing for a wide viewing orbit to visualize and plan point and direction of entry, and/or optionally tracking the intervention until a correct depth is achieved, while being able to view the spatial relationships.

In some embodiments, in order to visualize and visually track the needle in the holographic image as it is navigated to the target tissue, real-time automatic registration of the needle to custom fiducial markers positioned onto the surface of a patient, abdomen or thorax or other area, as relevant for the procedure, is optionally used.

In some embodiments real time registration is used to accommodate for physiological motion of organs, e.g. the abdomen. A patient is optionally imaged with a 3D imaging modality while the patient has fiducial markers positioned onto the body. The fiducial markers optionally remain fixed to the body during the procedure and will optionally be used to register and fuse a 3D see-through image onto the patient's anatomy.

In some embodiments a biopsy needle navigation is tracked, during a procedure, in a 3D see-through image that is generated, optionally by an electromagnetic (or similar) tracking system. In an electromagnetic tracking system a local electromagnetic field is optionally generated around an operating table and the needle tip optionally includes a coil that can be tracked within the electromagnetic field. The holographic image system is optionally able to track the movement of the needle and present the location of the needle at any given time and at any given location within a holographic image. The holographic image may be a 3D see-through image or a 3D holographic image that is displayed floating above the patient.

Example Methods

An example embodiment method for displaying an interference based holographic image of an inner body organ within a body, providing both eye convergence and eye focus accommodation cues is now described.

Figure 8A:
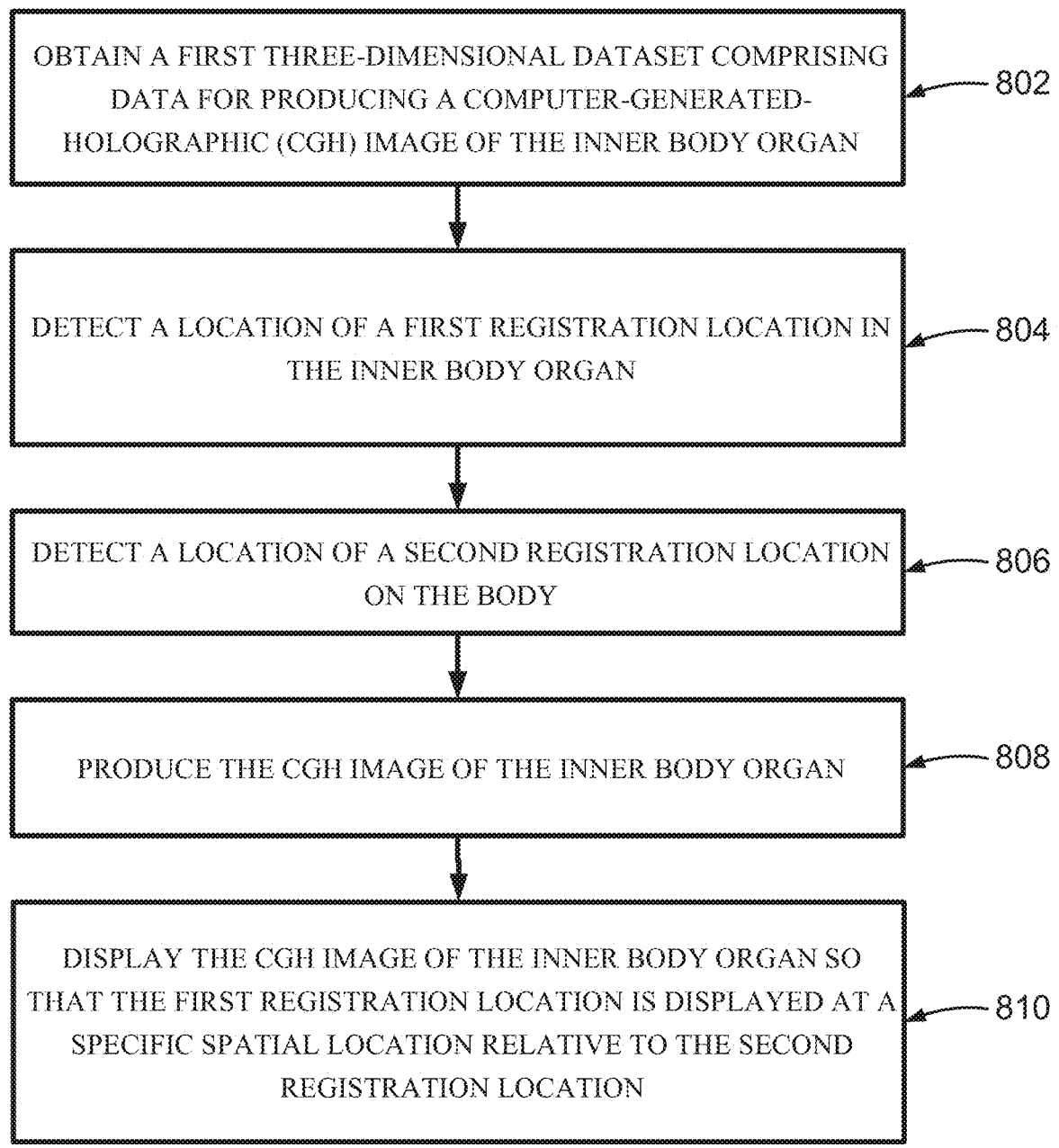
FIG. 8A is a simplified flow chart illustration of a method for displaying an interference based holographic image of an inner body organ within a body, providing both eye convergence and eye focus accommodation cues, according to an example embodiment of the invention.

Reference is now made to FIG. 8A, which is a simplified flow chart illustration of a method for displaying an interference based holographic image of an inner body organ within a body, providing both eye convergence and eye focus accommodation cues, according to an example embodiment of the invention.

The method depicted by FIG. 8A includes:
  obtaining a first three-dimensional dataset comprising data for producing a computer-generated-holographic (CGH) image of the inner body organ (802);
  detecting a location of a first registration location in the inner body organ (804). In some embodiments the detecting the location of the first registration location includes detecting the location of the first registration location in the 3D dataset;
  detecting a location of a second registration location on the body (806). In some embodiments the detecting the location of the second registration location on the body includes detecting by a CGH projection unit. In some embodiments a relative location of the first registration location with respect to the second registration location is known. In some embodiments the CGH image is calculated so that the location of the first registration location with respect to the second registration location is co-registered;
  producing the CGH image of the inner body organ (808); and
  displaying the CGH image of the inner body organ (810);
    wherein the displaying the CGH image of the inner body organ comprises displaying the CGH image of the inner body organ so that the first registration location is displayed at a specific spatial location relative to the second registration location. In some embodiments the first registration location is optionally detected in or on the first three-dimensional dataset.

In some embodiments the order of detecting the location of the second registration location (806) and the producing the CGH image of the inner body organ (808) may optionally be reversed.

In some embodiments the second registration location on the body is optionally detected in or on the body by a system for displaying the CGH image of the inner body organ, and/or by a detection system co-registered with the system for displaying the CGH image of the inner body organ.

In some embodiments a relative position and/or orientation of the first registration location and the second registration location is known.

In some embodiments the location of the first registration location with respect to the second registration location in known by at least one the following methods:
  1. Both registration locations are part of a single solid body with known geometry.
  2. Both registration locations are located by a monitoring system using sensors such as acoustic and/or mechanical and/or electromagnetic sensors.

In some embodiments aligning the CGH image of the inner body organ to the body is performed by a viewer translating and/or rotating and/or scaling the CGH image to align to the body. The translating and/or rotating and/or scaling are optionally performed using man-machine-interface commands, the viewer optionally judging alignment by eye, viewing both the CGH image and the real body, and optionally acting on depth cues such as eye convergence and eye focus.

Figure 8B:
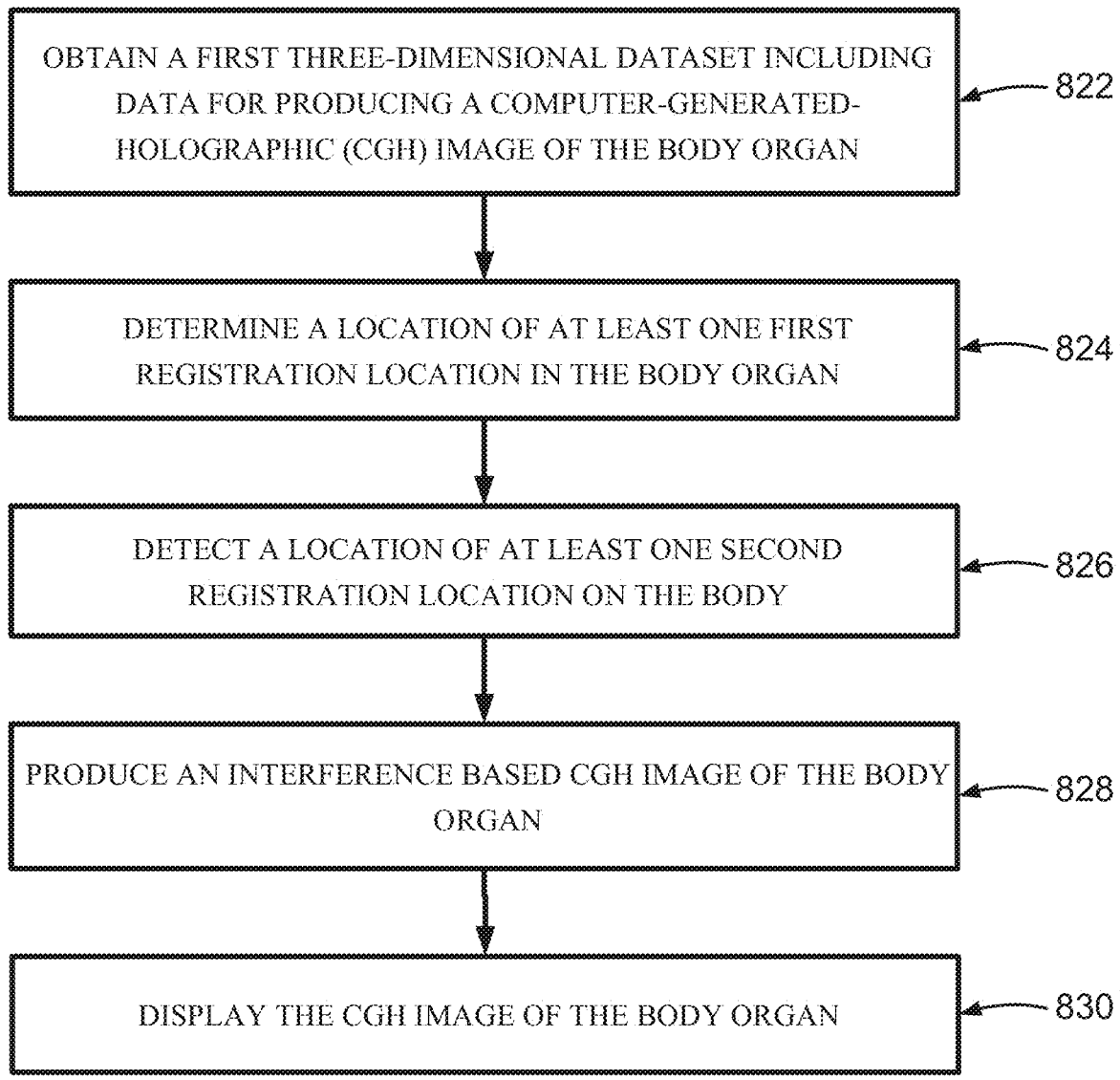
FIG. 8B is a simplified flowchart illustration of a method for displaying a holographic image of a body organ at a correct location of the body organ within a body, according to an example embodiment of the invention.

Reference is now made to FIG. 8B, which is a simplified flowchart illustration of a method for displaying a holographic image of a body organ at a correct location of the body organ within a body, according to an example embodiment of the invention.

The method of FIG. 8B, includes:
  obtaining a first three-dimensional dataset including data for producing a computer-generated-holographic (CGH) image of the body organ (822);
  determining a location of at least one first registration location in the body organ (824);
  detecting a location of at least one second registration location on the body (826);
  producing an interference based CGH image of the body organ (828); and
  displaying the CGH image of the body organ (830).

In some embodiments the above method optionally includes knowing a relative distance and/or orientation between the first and second registration markers.

In some embodiments the displaying the CGH image of the body organ is a displaying of the CGH image of the body organ so that the first registration location is displayed at a specific spatial location relative to the second registration location, so that the CGH image of the body organ is aligned and located in a correct place of the body organ relative to the body.

In some embodiments the CGH image of the body organ provides a viewer with both eye convergence and eye focus depth cues.

An example embodiment method for displaying an interference based holographic image of a first object behind or within a visually obstructing second object, providing both eye convergence and eye focus accommodation cues is now described.

Figure 9:
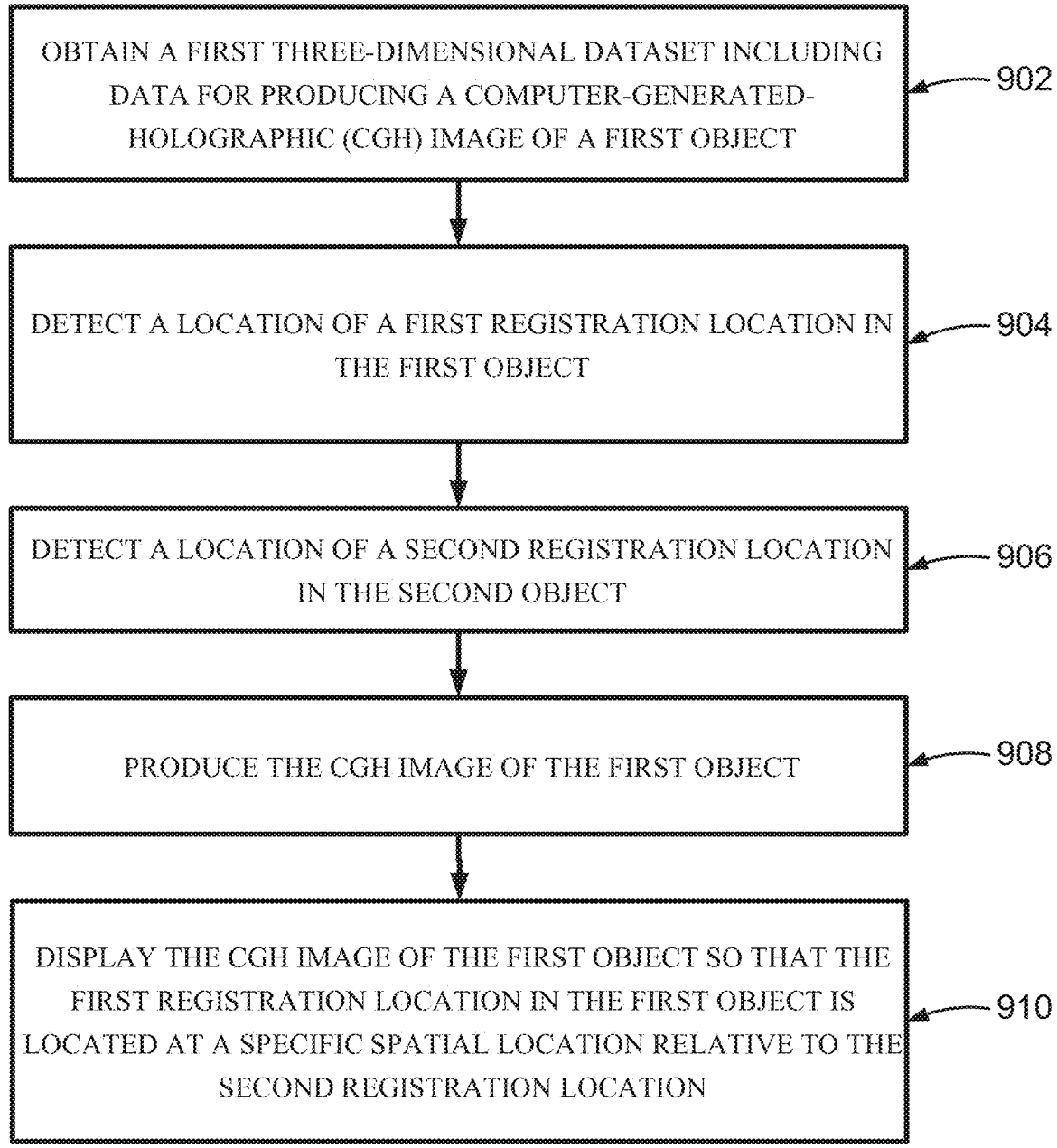
FIG. 9 is a simplified flow chart illustration of a method for displaying an interference based holographic image of a first object behind or within a visually obstructing second object, providing both eye convergence and eye focus accommodation cues, according to an example embodiment of the invention.

Reference is now made to FIG. 9, which is a simplified flow chart illustration of a method for displaying an interference based holographic image of a first object behind or within a visually obstructing second object, providing both eye convergence and eye focus accommodation cues, according to an example embodiment of the invention.

The method depicted by FIG. 9 includes:
  obtaining a first three-dimensional dataset comprising data for producing a computer-generated-holographic (CGH) image of the first object (902);
  detecting a location of a first registration location in the first object (904). In some embodiments the first registration location is part of the three-dimensional dataset for producing the CGH image of the first object. In some embodiments the location of a first marker optionally includes orientation;
  detecting a location of a second registration location in the second object (906). In some embodiments the location of a second marker optionally includes orientation. In some embodiments the detecting the location of a second registration is optionally performed using a detection sensor as part of a CGH projection unit;
  producing the CGH image of the first object (908); and
  displaying the CGH image of the first object (910);
  wherein the displaying the CGH image of the first object comprises displaying the CGH image of the first object so that the first registration location in the first object is located at a specific spatial location relative to the second registration location.

In some embodiments the first registration location is optionally detected in a three-dimensional dataset for producing a CGH image of the first object.

In some embodiments the second registration location on the body is optionally detected in or on the second object by a system for displaying the CGH image of the first object, and/or by a detection system co-registered with the system for displaying the CGH image of the first object.

In some embodiments a relative position of the first registration location and the second registration location is known.

In some embodiments a relative location and/or orientation of a first marker with respect to a second marker is detected by a detection unit using one of the mentioned sensory technologies.

Figure 10:
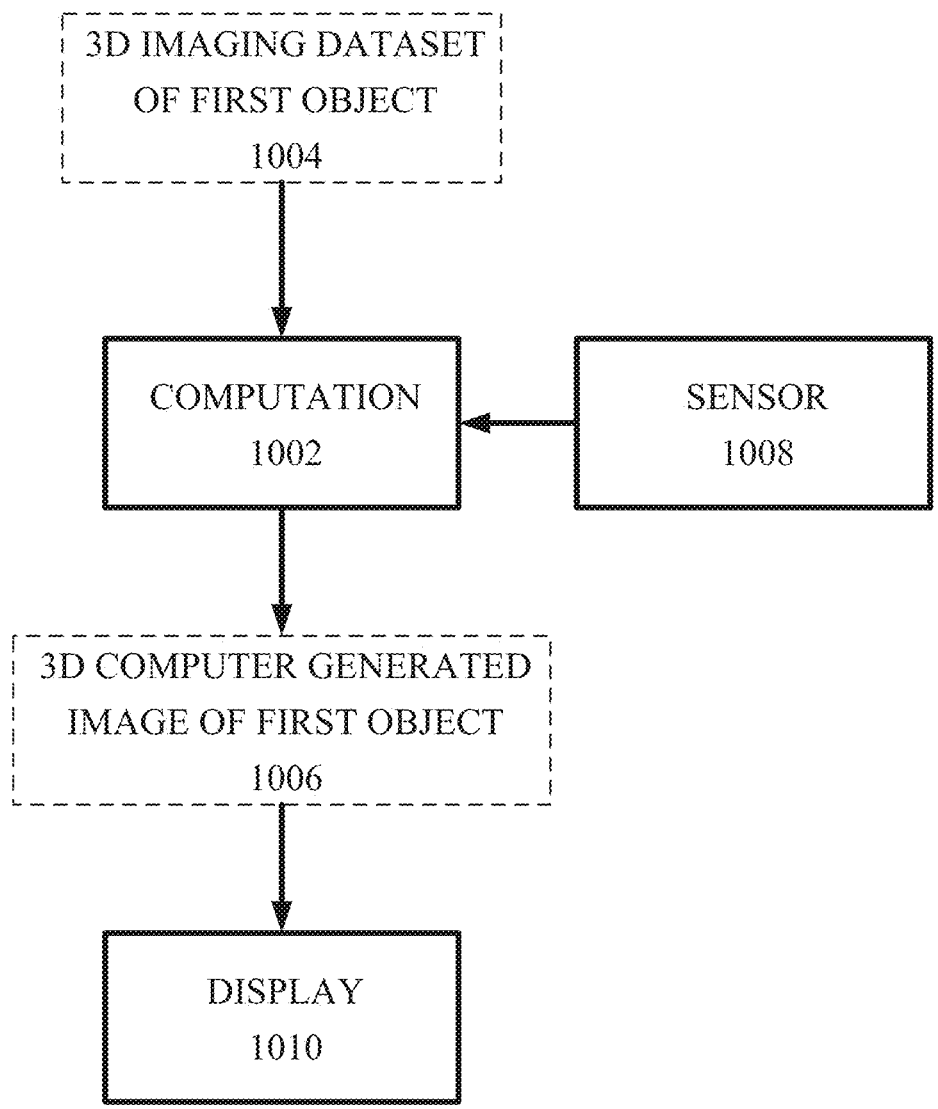
FIG. 10 is a simplified block diagram illustration of apparatus for displaying an interference based holographic image of a first object behind or within a visually obstructing second object, providing both eye convergence and eye focus accommodation cues, according to an example embodiment of the invention.

Reference is now made to FIG. 10, which is a simplified block diagram illustration of apparatus for displaying an interference based holographic image of a first object behind or within a visually obstructing second object, providing both eye convergence and eye focus accommodation cues, according to an example embodiment of the invention.

FIG. 10 depicts a computation unit 1002 receiving a first three-dimensional dataset 1004 including data for producing a computer-generated-holographic (CGH) image 1006 of the first object. In some embodiments the computation unit 1002 optionally receives a location of a first registration location in the first object.

In some embodiments the computation unit 1002 optionally detects a location of a first registration location in the first object, and produces the CGH image 1006 of the first object. As mentioned above, in some embodiments the computation unit 1002 optionally receives the location of a first registration location in the first object.

FIG. 10 also depicts a sensor 1008 for detecting a location of a second registration location in the second object, and a CGH image display 1010 for displaying the CGH image of the first object.

In some embodiments, the relative location of second registration location in the second object with respect to the first registration location in the first object is known to the computation system. In some embodiments, the two registration locations markers are detected by an additional detection system (not shown) and the relative location is sent to the computation system.

In some embodiments the displaying the CGH image of the first object optionally includes displaying the CGH image of the first object so that the first registration location in the first object is located at a specific spatial location relative to the second registration location.

In some embodiments, the specific spatial location optionally includes displaying the CGH image of the first object at its actual spatial location relative to the second object, in a way which appears that the first object appears to a viewer to be inside, within, or behind the second object.

Figure 11:
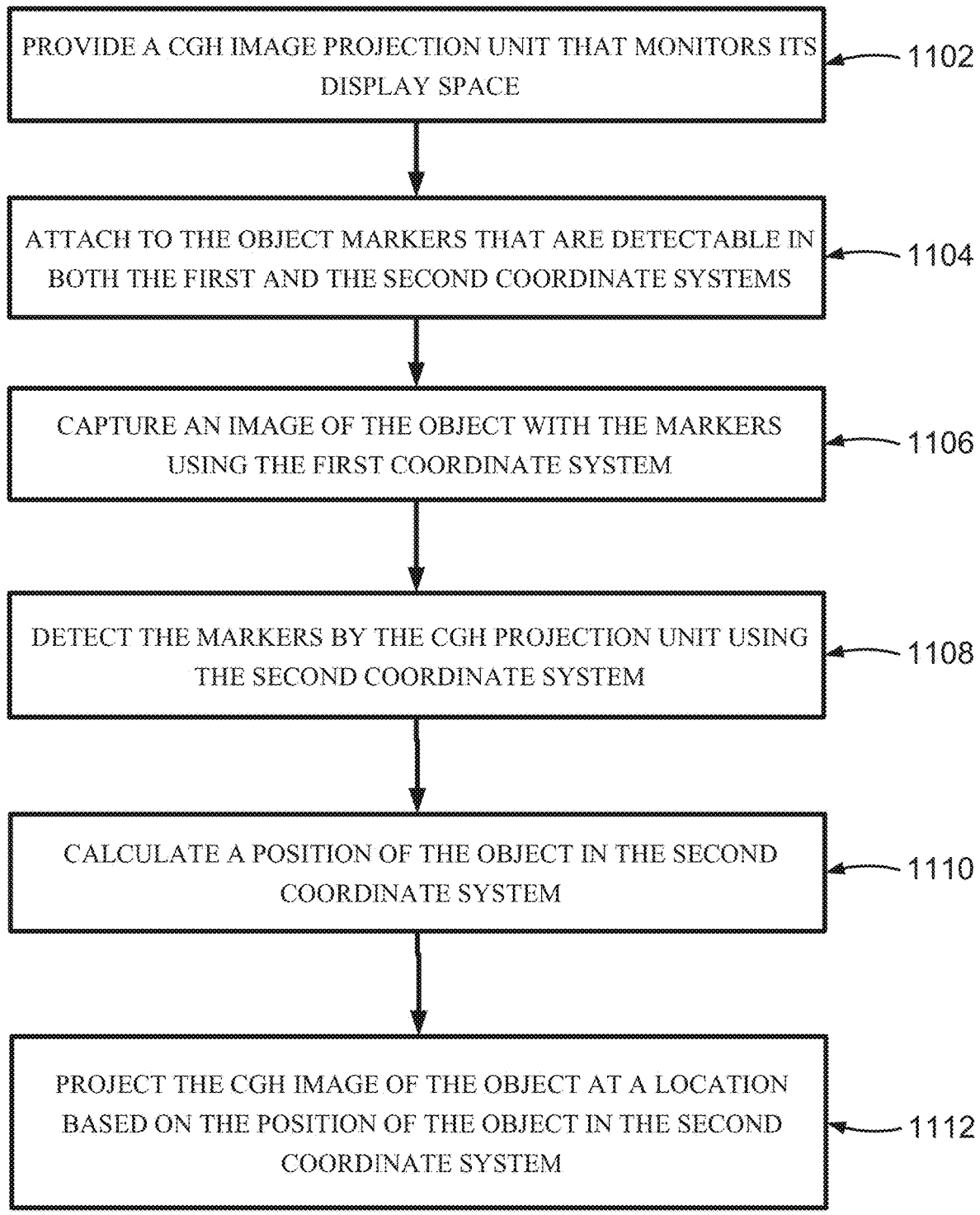
FIG. 11 is a simplified flow chart illustration of a method for displaying an image of an object acquired using a first coordinate system by a CGH projection unit using a second coordinate system co-registered to the first coordinate system according to an example embodiment of the invention.

Reference is now made to FIG. 11, which is a simplified flow chart illustration of a method for displaying an image of an object acquired using a first coordinate system by a CGH projection unit using a second coordinate system co-registered to the first coordinate system according to an example embodiment of the invention.

The method of FIG. 11 includes:
  a. providing a CGH image projection unit that monitors its display space (1102);
  b. attaching to the object markers that are detectable in both the first and the second coordinate systems (1104);
  c. capturing an image of the object with the markers using the first coordinate system (1106);
  d. detecting the markers by the CGH projection unit using the second coordinate system (1108);
  e. calculating a position of the object in the second coordinate system (1110), and
  f. projecting the CGH image of the object at a location based on the position of the object in the second coordinate system (1112).

Figure 12:
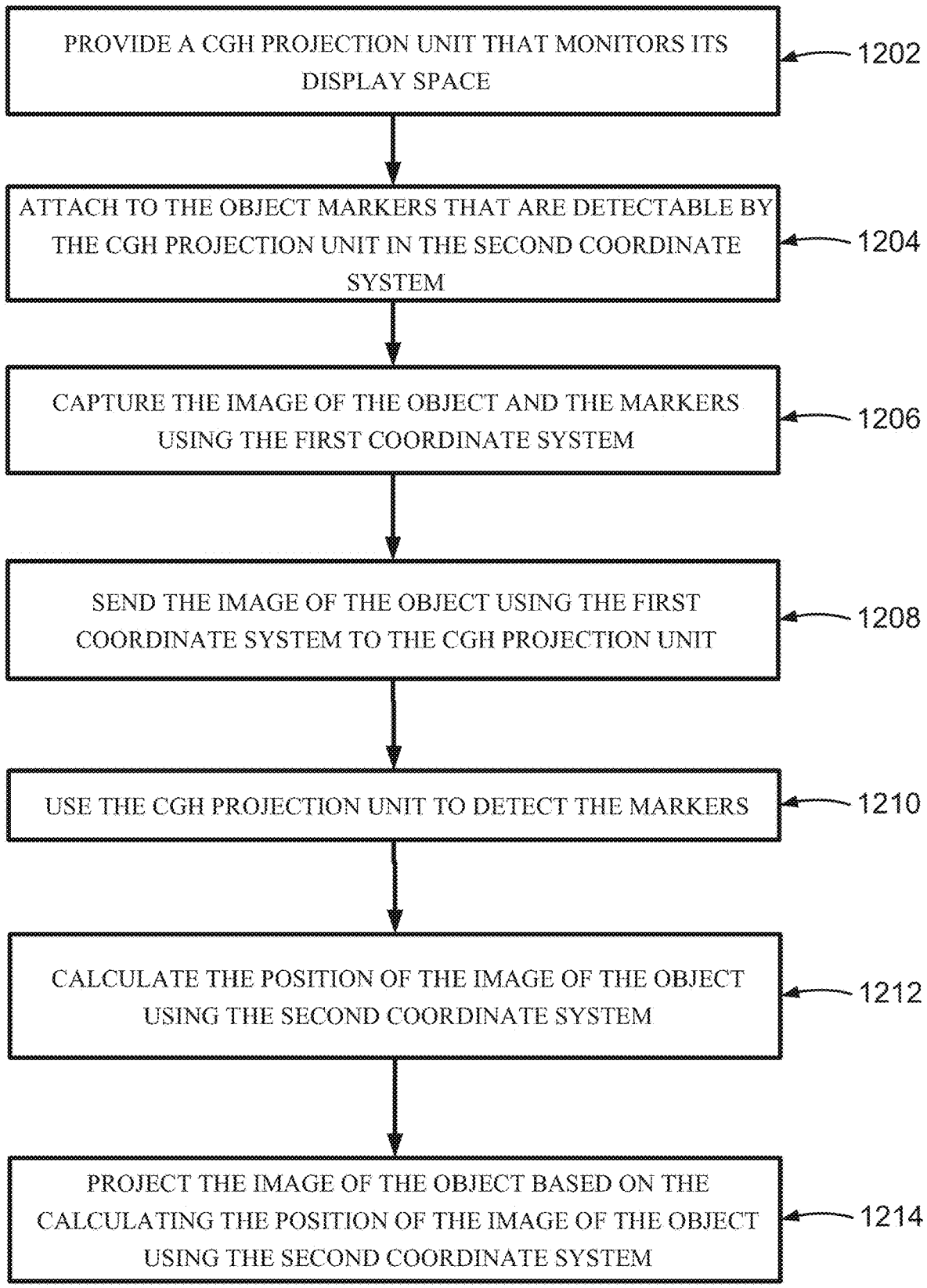
FIG. 12 is a simplified flow chart illustration of a method for co-registration of an image of an object acquired at a first coordinate system to a CGH projection unit at a second coordinate system according to an example embodiment of the invention.

Reference is now made to FIG. 12, which is a simplified flow chart illustration of a method for co-registration of an image of an object acquired at a first coordinate system to a CGH projection unit at a second coordinate system according to an example embodiment of the invention.

The method of FIG. 12 includes:
  a. providing a CGH projection unit that monitors its display space (1202);
  b. attaching to the object markers that are detectable by the CGH projection unit in the second coordinate system (1204);
  c. capturing the image of the object and the markers using the first coordinate system (1206);
  d. sending the image of the object using the first coordinate system to the CGH projection unit (1208);
  e. using the CGH projection unit to detect the markers (1210);
  f. calculating the position of the image of the object using the second coordinate system (1212); and g. projecting the image of the object based on the calculating the position of the image of the object using the second coordinate system (1214).

In some embodiments a shape and location of an additional object such as a tool, a robot's arm, a catheter, an endoscope are also sent to the CGH projection unit, using either the first coordinate system or the second coordinate system, or even some other coordinate system.

It is expected that during the life of a patent maturing from this application many relevant image acquisition systems will be developed and the scope of the term image acquisition system is intended to include all such new technologies a priori.

It is expected that during the life of a patent maturing from this application many relevant holographic image display systems will be developed and the scope of the term holographic image display system is intended to include all such new technologies a priori.

As used herein the term "about" refers to ±10%.

The terms "comprising", "including", "having" and their conjugates mean "including but not limited to".

The term "consisting of" is intended to mean "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a unit" or "at least one unit" may include a plurality of units, including combinations thereof.

The words "example" and "exemplary" are used herein to mean "serving as an example, instance or illustration". Any embodiment described as an "example or "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A method for producing an image comprising visual representations of a real internal organ of a patient and a real medical tool which are at least partially hidden from view in the real-world by the patient's body, the image depicting the internal organ and the medical tool as visible, and further as located in space at the same real-world positions as the respective real internal organ and the real medical tool relative to a body of the patient, the method comprising:
   (a) obtaining, by a circuitry, a dataset comprising a three-dimensional (3D) location and orientation in space of the following:
      i. an imaging device relative to a display;
      ii. at least a portion of an internal organ of a patient
   (b) tracking, by the circuitry, a location and orientation in space of the medical tool;
   (c) generating, by the circuitry, locations of the internal organ and the medical tool relative to the display, based on the dataset and the tracked location of the medical tool;
   (d) generating the visual representations of the at least a portion of the internal organ and the portion of the medical tool that are hidden from view;
   (e) producing an image which includes the visual representations positioned based on the generated locations; and
   (f) displaying, on the display, the image such that the visual representations appear in co-registration with their respective real-world internal organ and medical tool;
   wherein the displaying comprises displaying the visual representation of the portion of the medical tool that is hidden from view as an extension of a portion of the real medical tool that is not hidden;

wherein the displaying comprises displaying with depth cues comprising eye focus accommodation corresponding to: a first depth within the real internal organ, and a second depth within the real medical tool.

2. A method according to claim 1, wherein obtaining the dataset comprises measuring the 3D location in space of the imaging device relative to the display by a measuring unit comprised in the display.

3. A method according to claim 2, wherein measuring the 3D location in space of the imaging device relative to the display comprises detecting a registration mark on the imaging device.

4. A method according to claim 1, wherein the image which displays the at least a portion of the internal organ and the portion of the medical tool is a 3D image.

5. A method according to claim 1 in which the displaying the image comprises displaying the image at least partly behind a surface of the body of the patient.

6. A method according to claim 1, wherein the displaying the image comprises providing a viewer of the image with a plurality of eye convergence depth cues.

7. A method according to claim 1, wherein the displaying the image comprises providing a viewer of the image with a plurality of eye focus depth cues.

8. A method according to claim 1, wherein the displaying the image comprises providing a viewer of the image with a plurality of both eye convergence and eye focus depth cues.

9. A method according to claim 1 wherein the display is configured to display a plurality of different points in the image as focused at a plurality of respective different distances from the display.

10. A method according to claim 1, wherein the imaging device comprises an ultrasound imaging device.

11. A method according to claim 1, wherein the displaying the image comprises displaying using a mobile display.

12. A method according to claim 1, wherein the tracking is in real-time, while displaying the image which displays the at least a portion of the internal organ and the portion of the medical tool.

13. A method according to claim 1, wherein the dataset is obtained in real-time, while displaying the image which displays the at least a portion of the internal organ and the portion of the medical tool.

14. A method according to claim 1, wherein:
the dataset is obtained in real-time, while displaying the image which displays the at least a portion of the internal organ and the portion of the medical tool, and
the tracking is in real-time, while displaying the image which displays the portion of the internal organ and the portion of the medical tool.

15. A method according to claim 1, wherein generating the visual representations comprises aligning the visual representations to the respective real-world internal organ and medical tool including location, orientation, size and scale.

16. A system for producing an image comprising visual representations of a real internal organ of a patient and a real medical tool which are at least partially hidden from view in the real-world by the patient's body, the image depicting the internal organ and the medical tool as visible, and further as located in space at the same real-world positions as the respective real internal organ and the real medical tool, the system comprising:
  a. a display for displaying an image;
  b. a circuitry adapted to:
    i. obtain a three-dimensional (3D) location in space of an imaging device relative to a display, and at least a portion of an internal organ of a patient;
    ii. track a location and orientation in space of a medical tool;
    iii. generate locations of the internal organ and the medical tool relative to the display, based on the dataset and the tracked location of the medical tool;
    iv. generate the visual representations of the at least a portion of the internal organ and the portion of the medical tool that are hidden from view; and
    v. produce the image including the visual representations positioned based on the generated locations;
    vi. providing instruction to the display to display the image: such that the visual representations appear in co-registration with their respective real-world internal organ and medical tool; the visual representation of the portion of the medical tool that is hidden from view appears as an extension of a portion of the real medical tool that is not hidden; and
      with depth cues comprising eye focus accommodation corresponding to: a first depth within the real internal organ, and a second depth within the real medical tool.

17. A system according to claim 16, wherein the circuitry is adapted to obtain the 3D location in space of the imaging device relative to the display by measuring the 3D location in space of the feature relative to the display by a measuring unit comprised in the display.

18. A system according to claim 16 in which the display is a 3D display.

19. A system according to claim 16, wherein the imaging device comprises an ultrasound imaging device.

20. A system according to claim 16, wherein the display comprises a display selected from a group consisting of:
  a Head Mounted Display (HMD);
  a mobile display; and
  a display on an adjustable arm.

* * * * *